(12) United States Patent
Hakim

(10) Patent No.: US 9,971,979 B2
(45) Date of Patent: May 15, 2018

(54) SYSTEM AND METHOD FOR PROVIDING UNIFIED AND INTELLIGENT BUSINESS MANAGEMENT APPLICATIONS

(71) Applicant: DEUM CORPORATION, Montreal (CA)

(72) Inventor: Malek Hakim, Toronto (CA)

(73) Assignee: ROSEBOARD INC., Roswell, GA (US)

( * ) Notice: Subject to any disclaimer, the term of this patent is extended or adjusted under 35 U.S.C. 154(b) by 390 days.

(21) Appl. No.: 14/638,809

(22) Filed: Mar. 4, 2015

(65) Prior Publication Data

US 2015/0302303 A1 Oct. 22, 2015

Related U.S. Application Data

(60) Provisional application No. 61/947,792, filed on Mar. 4, 2014.

(51) Int. Cl.
*G06N 3/04* (2006.01)
*G06Q 10/06* (2012.01)

(52) U.S. Cl.
CPC ......... *G06Q 10/063* (2013.01); *G06N 3/0427* (2013.01)

(58) Field of Classification Search
CPC ............ G06N 5/02; G06N 5/04; G06N 5/048; G06N 7/005
See application file for complete search history.

(56) References Cited

U.S. PATENT DOCUMENTS

2012/0016678 A1\* 1/2012 Gruber ................ G06F 17/3087
 704/275
2014/0310053 A1\* 10/2014 Liu .................... G06Q 10/0633
 705/7.27

\* cited by examiner

*Primary Examiner* — Paulinho E Smith
(74) *Attorney, Agent, or Firm* — Norton Rose Fulbright Canada LLP

(57) ABSTRACT

There is provided systems and methods for generating suggestions integrated into business applications. Parameters for generating suggestions relating to the plurality of business applications are stored in a dynamic database. At least one suggestion relating to a business currently being used by a user is generated, the at least one suggestion generated using the parameters stored in the dynamic database. The at least one suggestion is integrated into the user interface of the given business application. Input of the user into the given business application is monitored, including input reflecting whether the at least one suggestion has been actioned by the user; and the parameters stored in the dynamic database are updated based on the monitored input so that generation of future suggestions may be refined.

20 Claims, 75 Drawing Sheets

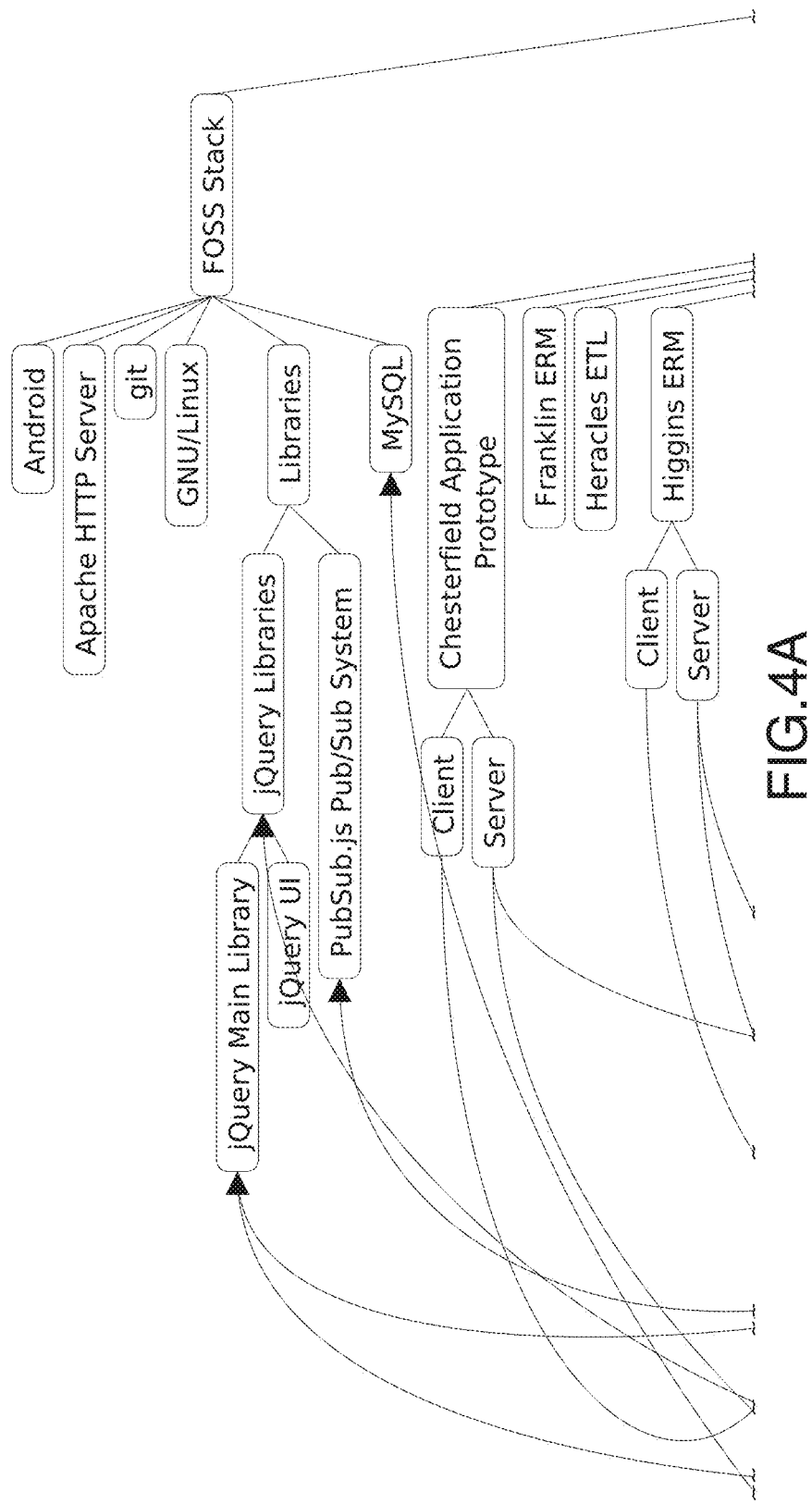

C: Classes

C: Classes

FIG. 6

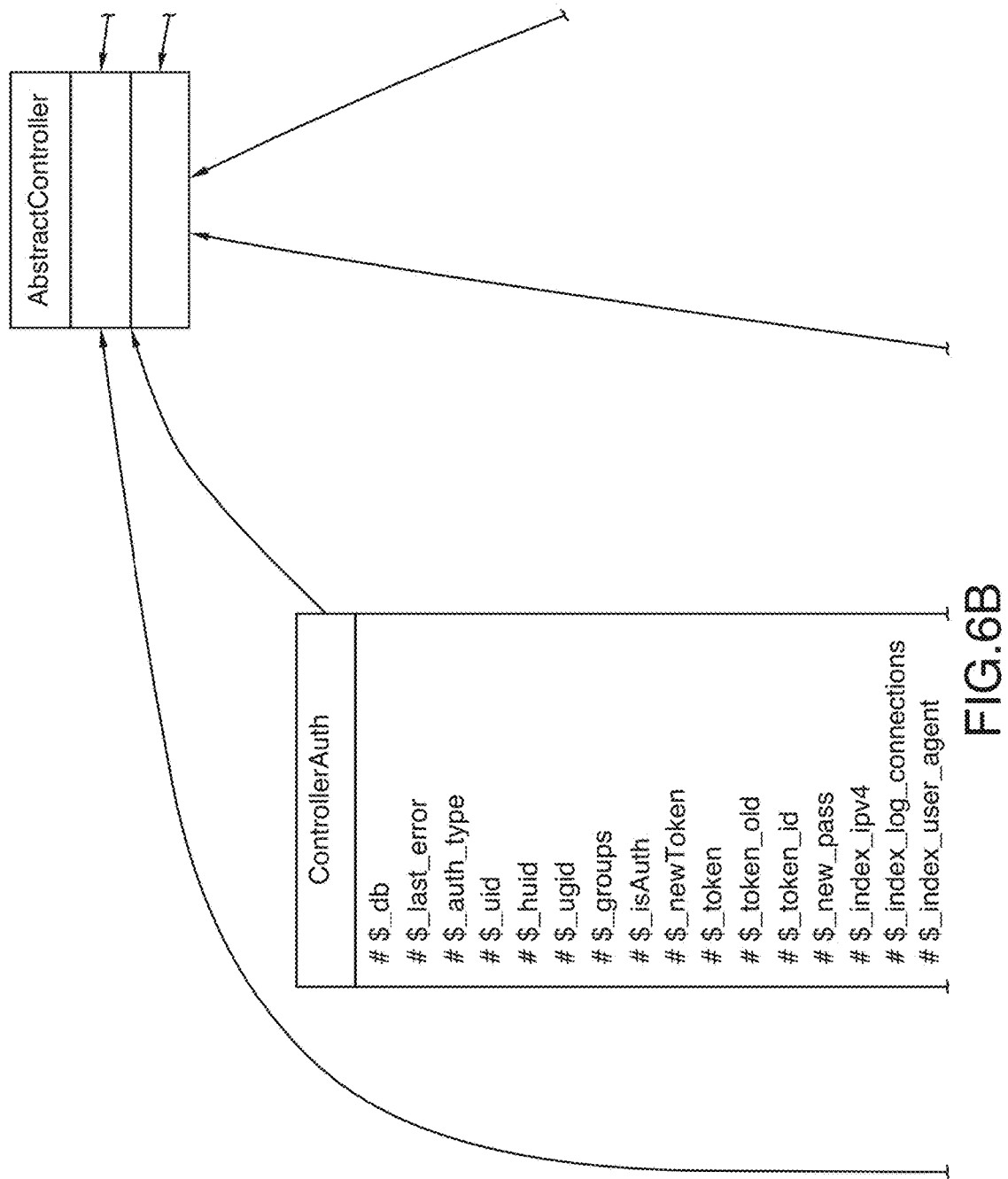

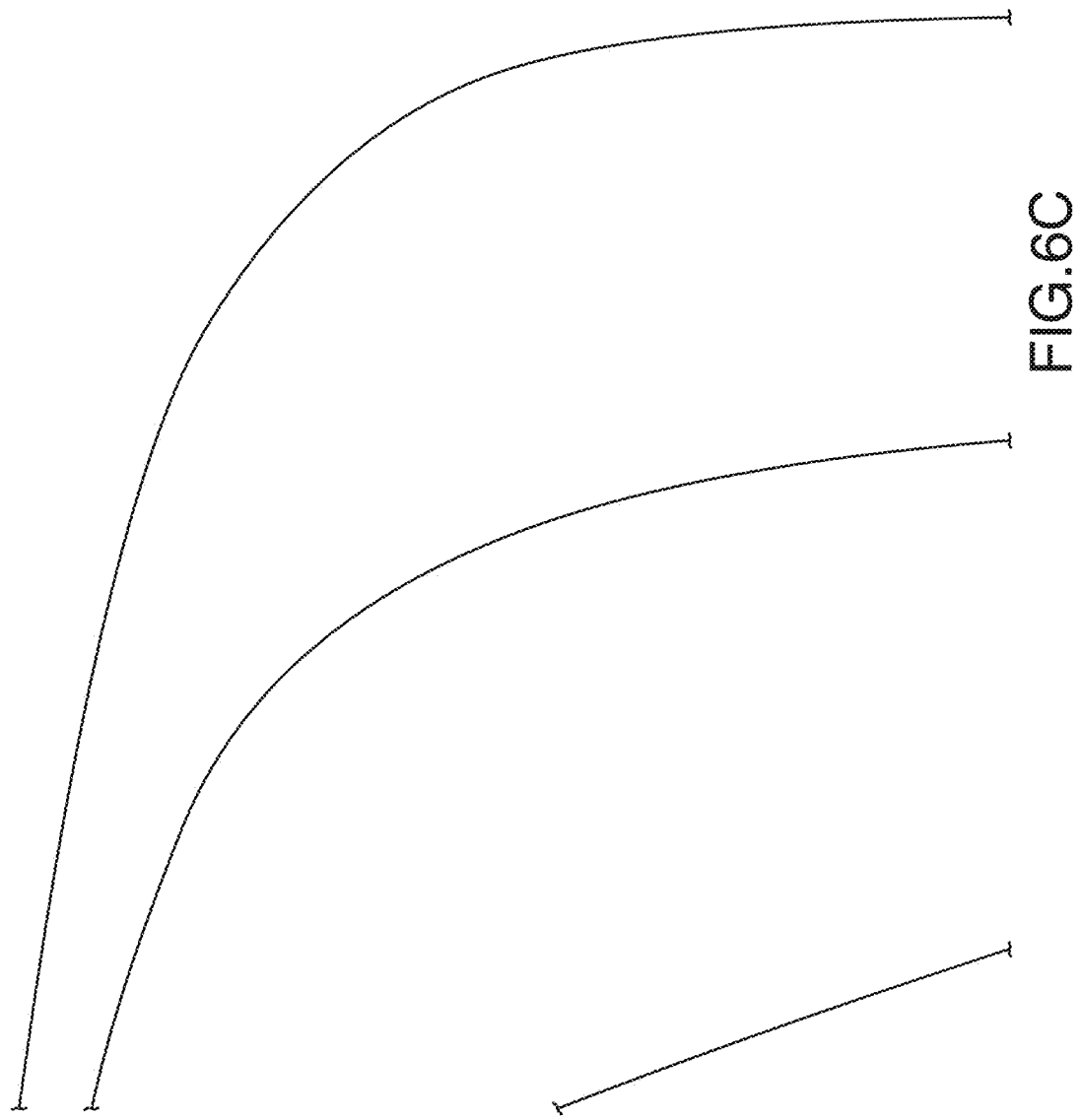

FIG.6D

ControllerConnection

- # $_db
- # $_index_http_referer
- # $_index_http_referer_uri
- # $_index_ipv4
- # $_index_user_agent
- # $_index_log_connections
- # $_isHTTPS

- + getIPv4()
- + getUserAgent()
- + getLogConnection()
- + __construct()
- # __getSet()
- # __getSetIPv4()
- # __getSetUserAgent()
- # __getSetHTTPReferer()
- # __logConnection()
- # __getSetHTTPRequestURI()

---

- # $_new_flag
- # $_use_cookie
- # $_session_timeout
- # $_session_domain
- # $_session_name_session
- # $_session_name_token
- # $_session_path
- # $_is_session_secure

- + setNewPassword()
- + getDBParamRead()
- + getDBParamWrite()
- + getDBParamInsert()
- + getDBParams()
- + getUser()
- + isAuth()
- + getUserHID()
- + getGroups()
- + getToken()
- + getSessionID()
- + getTokenID()
- + setupCookie()
- + __destruct()
- + __construct()
- # __getSQLGIDs()
- # __getUIDFromHUID()

---

ControllerApp

- # $_view
- # $_dm
- # $_requested_app
- # $_view_obj
- # $_modules_obj
- # $mods_html
- # $mods_css
- # $mods_js

- + __construct()
- + getRender()
- # _initModules()
- # _homer()

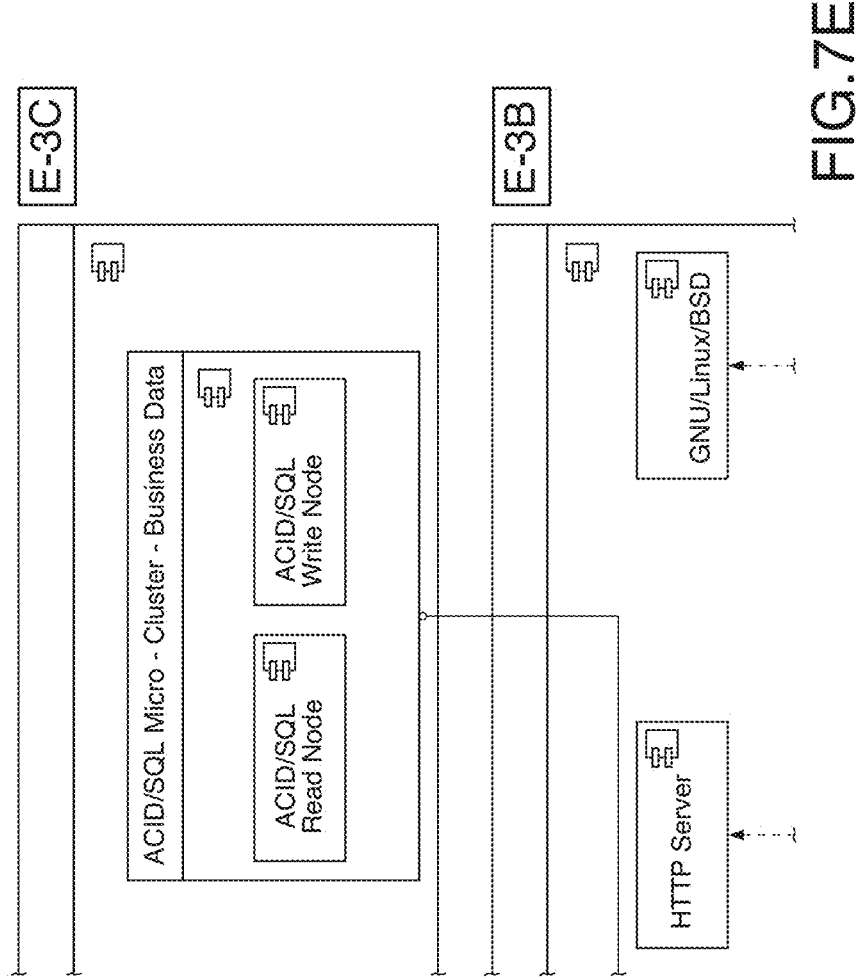

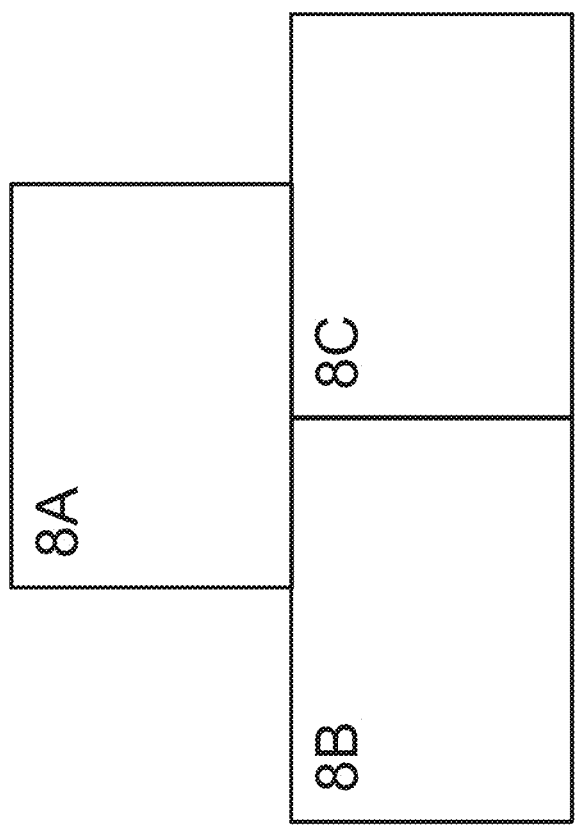

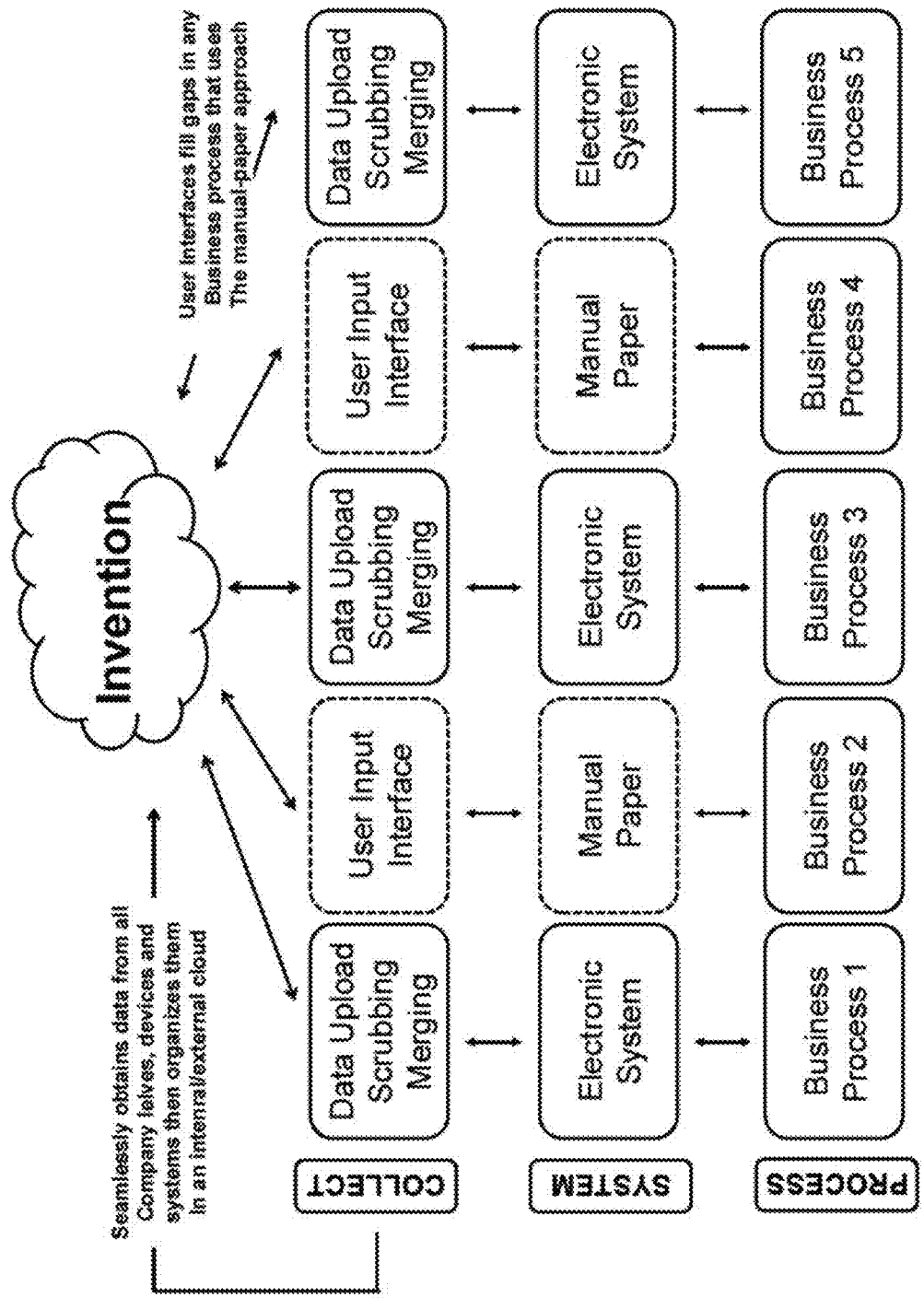

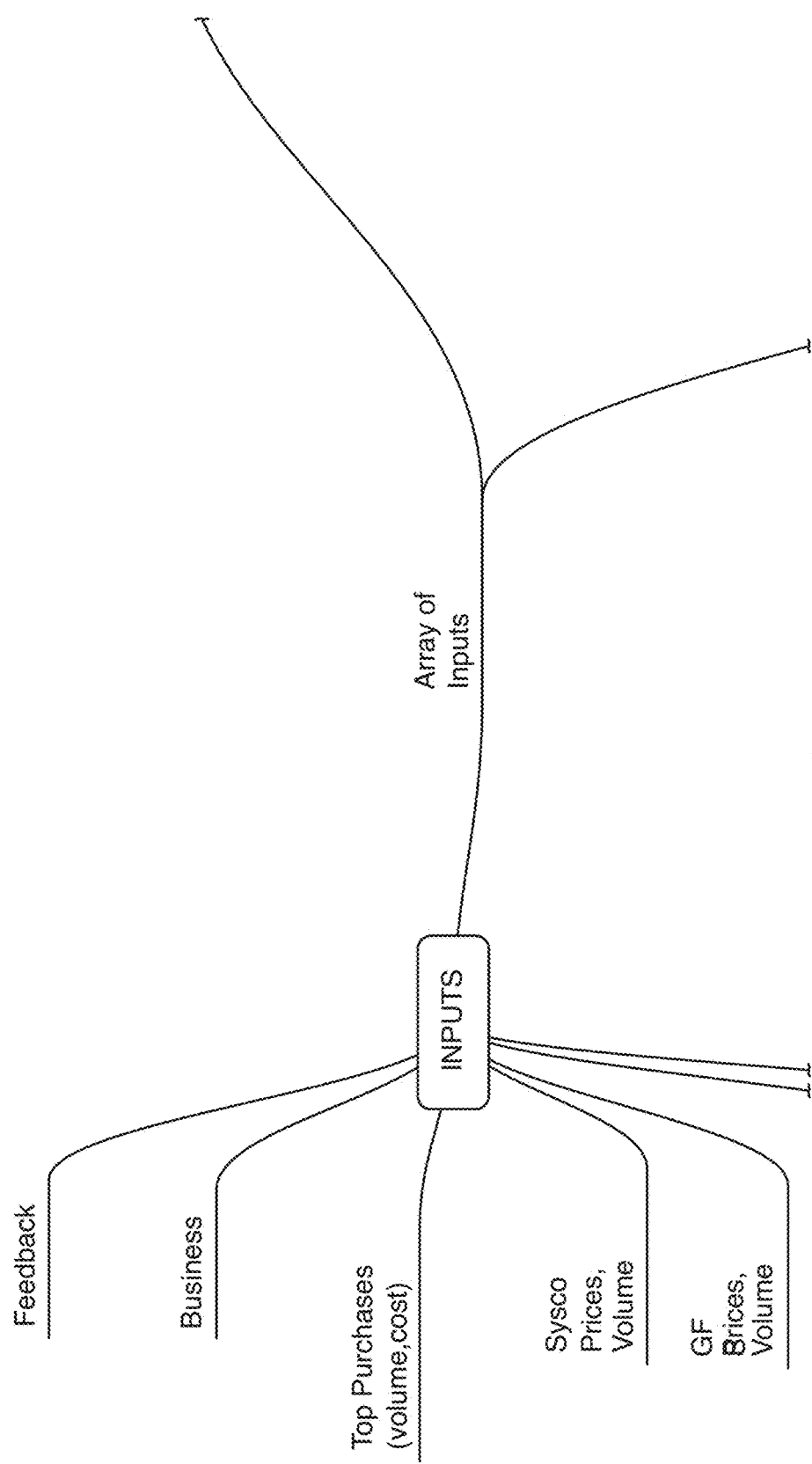

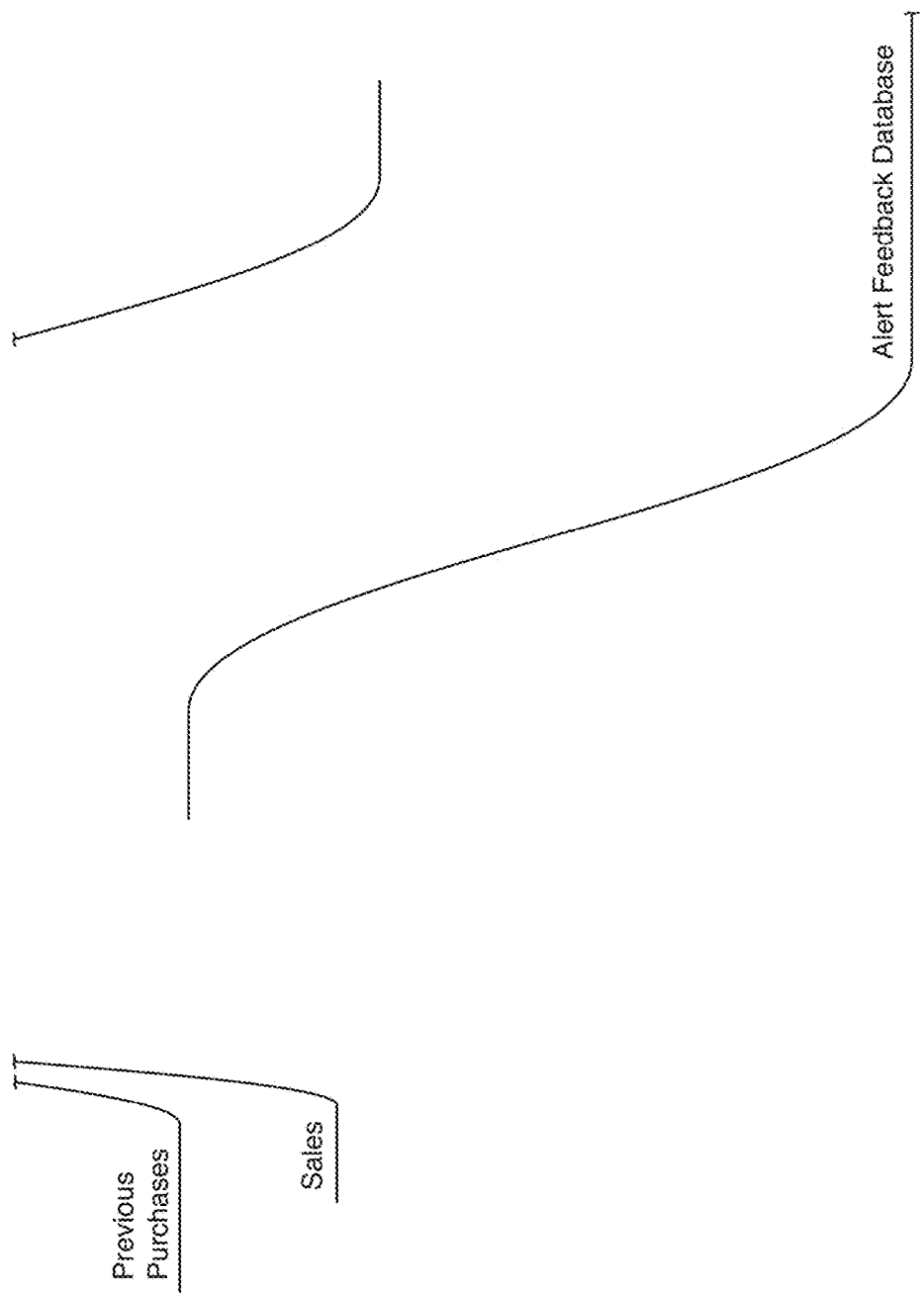

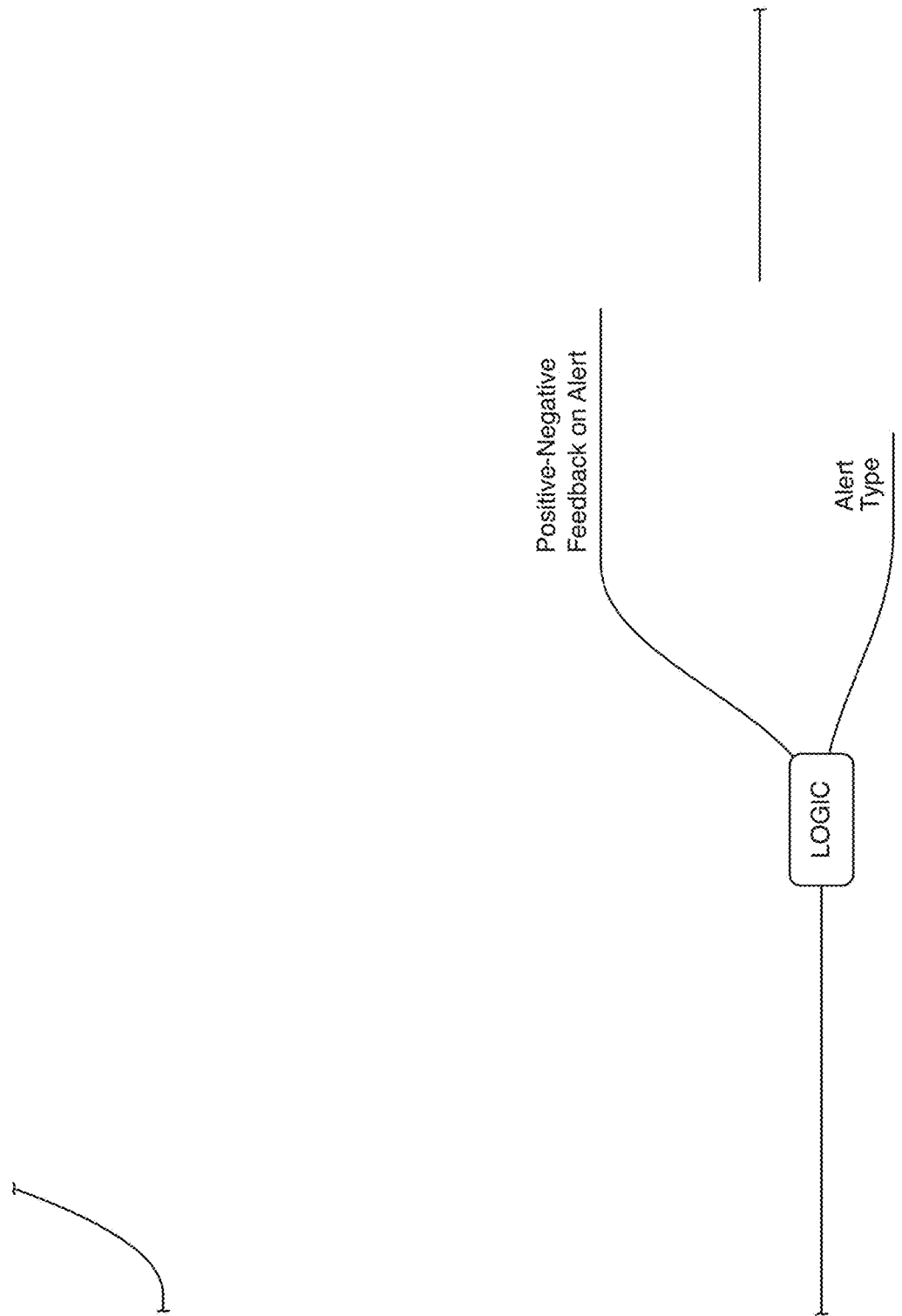

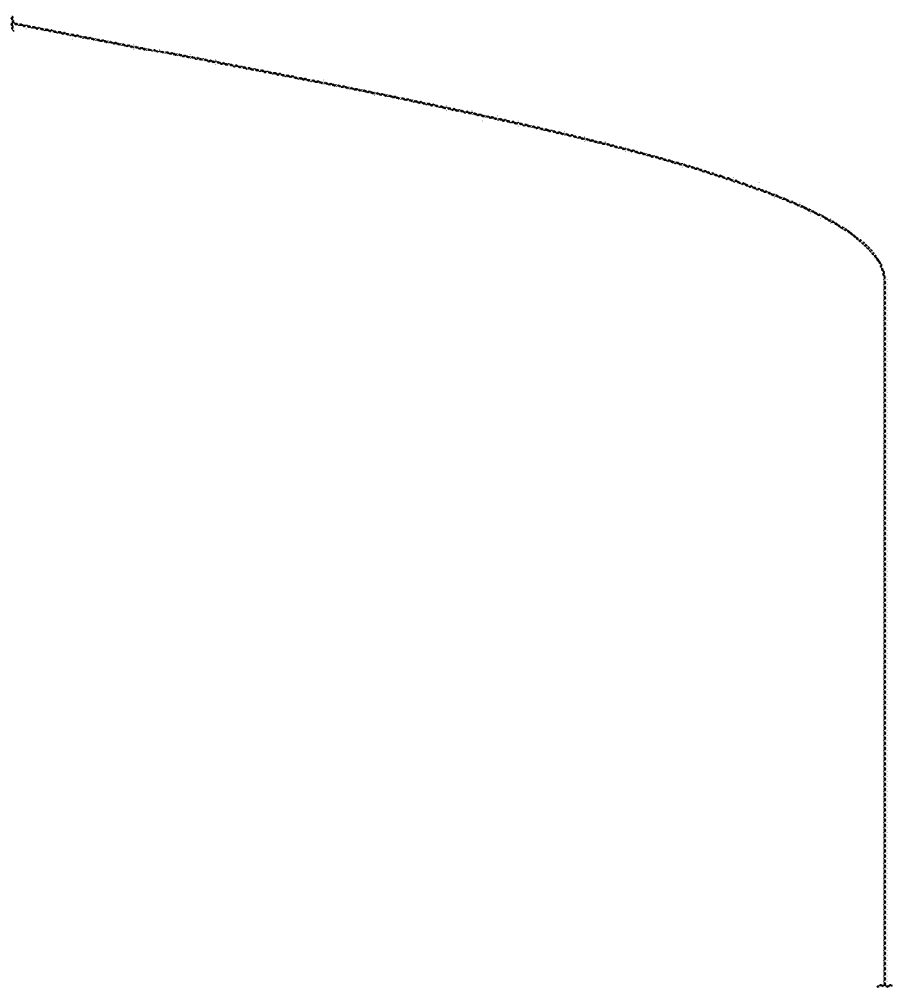

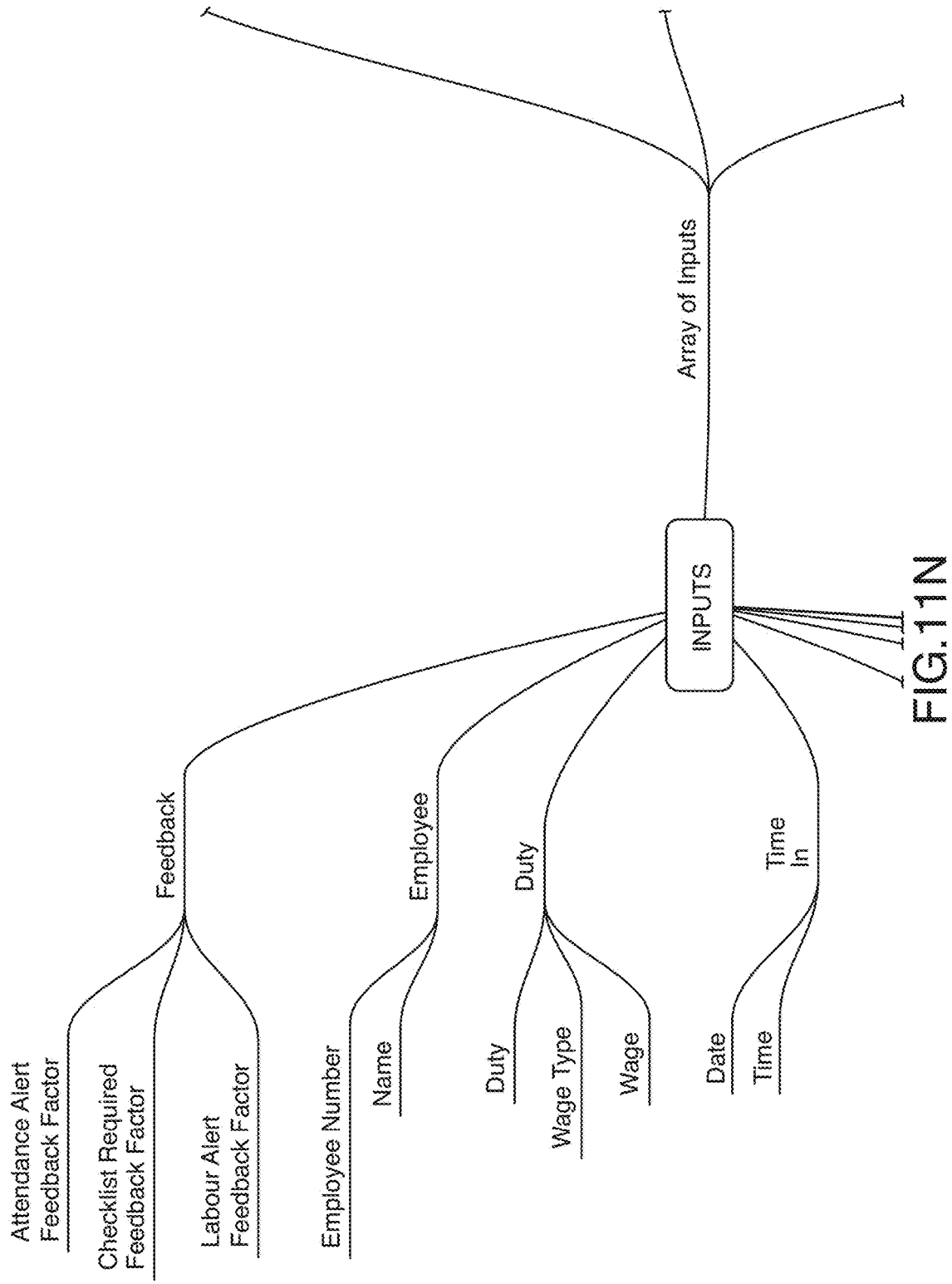

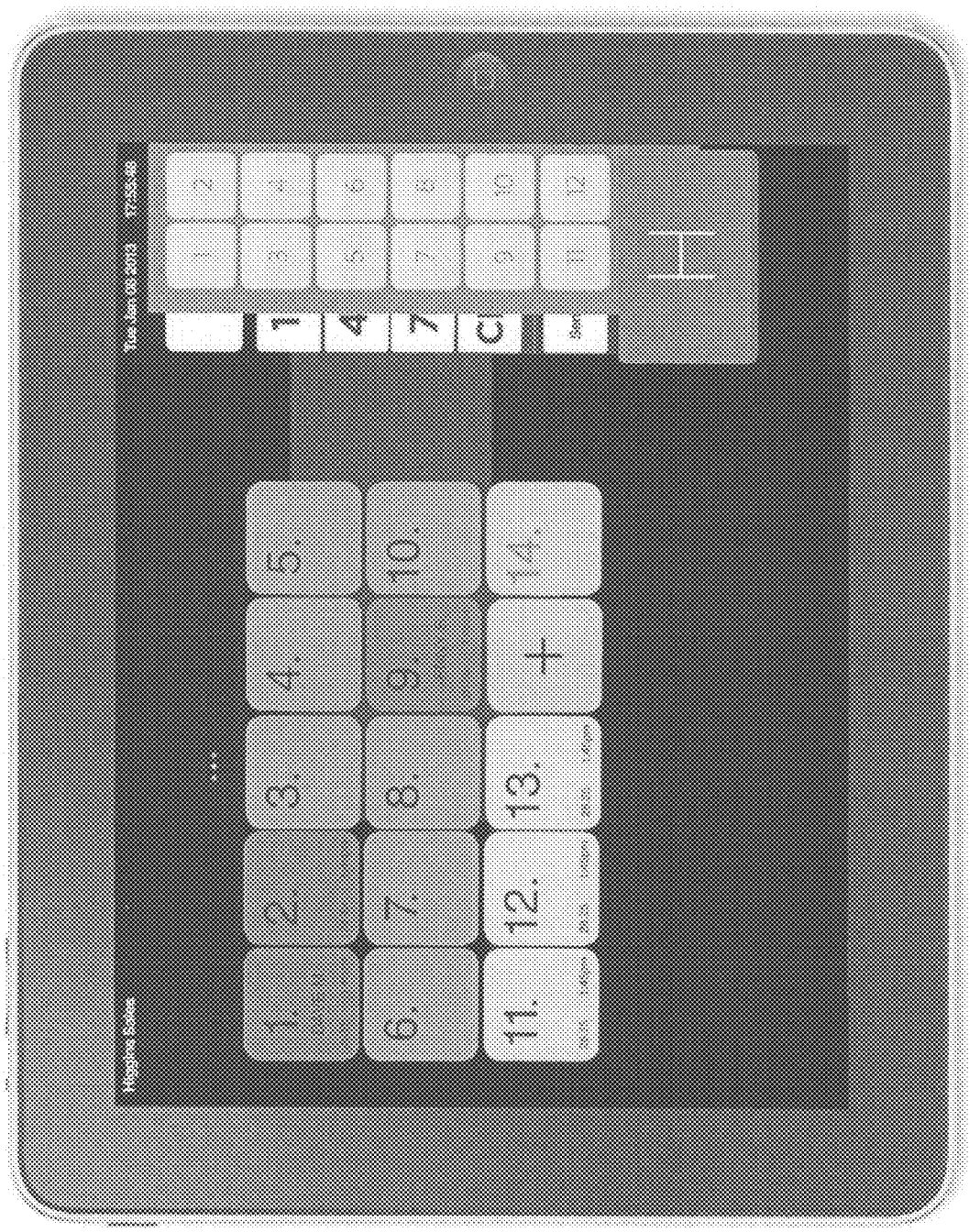

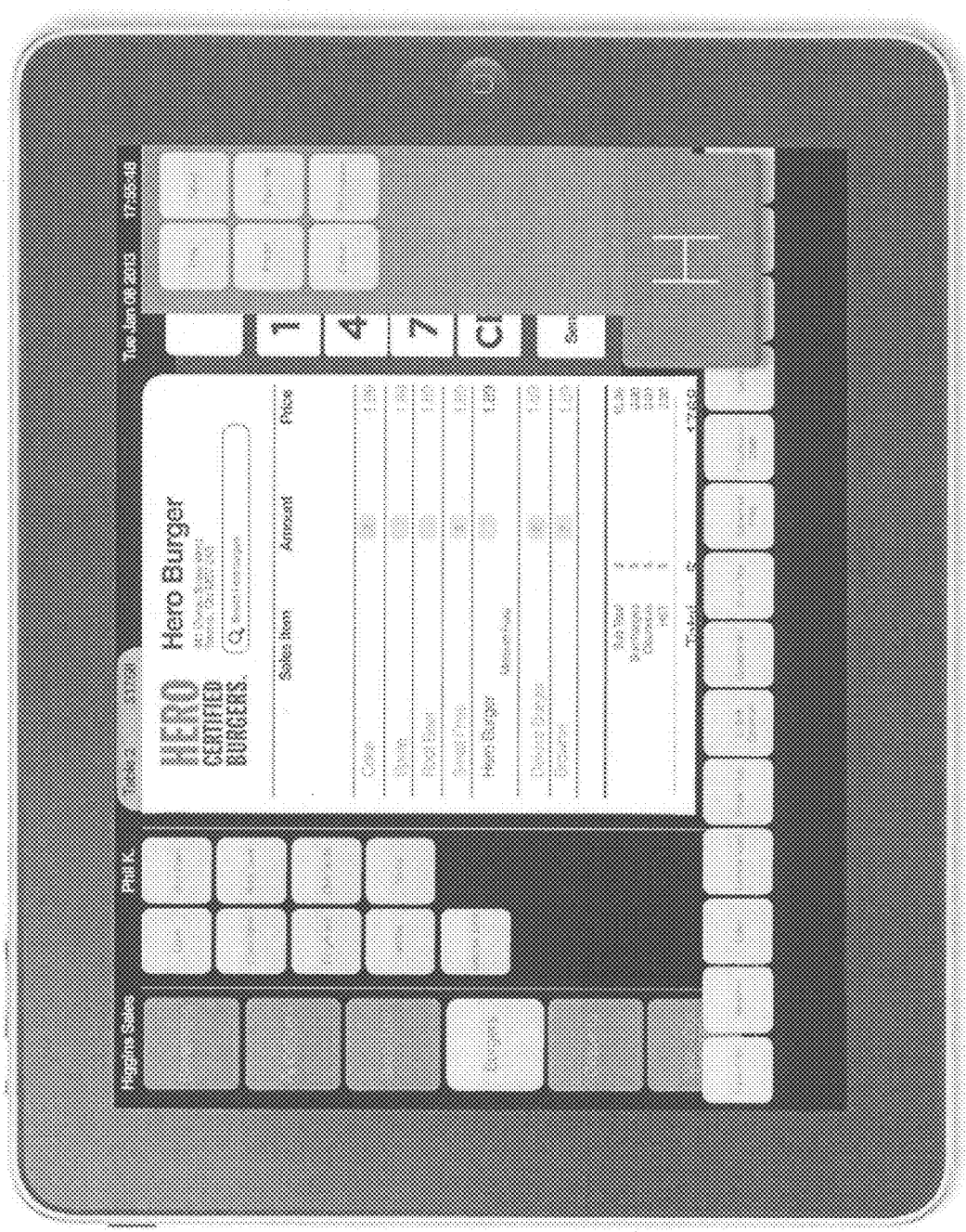

SYSTEM AND METHOD FOR PROVIDING UNIFIED AND INTELLIGENT BUSINESS MANAGEMENT APPLICATIONS

CROSS-REFERENCED TO RELATED APPLICATIONS

This application claims the benefit of U.S. Provisional Application No. 61/947,792, filed Mar. 4, 2014.

FIELD

This invention relates generally to business management technology solutions and platforms. This invention further relates to technology platforms with artificial intelligence features.

BACKGROUND

Various business management applications are known. In most business sectors, in order to access computerized operations covering most or all business processes of a business, the business is required in general to use more than one business management application. This results in an increased cost of acquiring technology, and training costs associated with training users to use different business management applications. Also, additional time is required in completing business processes because a business process or related business processes are generally distributed across different platforms requiring that users use more than one application. Often integration of applications is required for example to obtain a unified view of business operations. Accessing valuable analytics through fragmented applications can be complicated, and as a result is very costly and therefore generally not available to small and medium sized enterprises (SMEs) in particular.

Also, the costs of acquiring such business systems, which are generally designed for larger enterprises, can be prohibitive for SMEs.

Also, different clients, and different user groups within clients, may require different subsets of features of a larger platform. Many users can get lost finding the features that they need within a larger platform. This can be mitigated using training but it is hard to find the time and money for training in some business environments.

All of these factors reduce compliance with processes implemented using business management applications, which can contribute to loss of productivity, and reduced financial performance.

There is a need therefore for a computer network implemented system, a computer network implemented method, and a computer network architecture that addresses the challenges referred to above.

SUMMARY

In one aspect, there is provided a computer system for generating suggestions integrated into business applications. The system comprises: an application repository comprising a plurality of business applications; a dynamic database storing parameters for generating suggestions relating to the plurality of business applications; at least one processor coupled to the application repository and the dynamic database, the at least one processor configured to: generate at least one suggestion relating to a given business applications of the plurality of business applications currently being used by a user, the at least one suggestion generated using the parameters stored in the dynamic database; integrate the at least one suggestion into the user interface of the given business application; monitor input of the user into the given business application, including input reflecting whether the at least one suggestion has been actioned by the user; and update the parameters stored in the dynamic database based on the monitored input so that generation of future suggestions may be refined.

In another aspect, there is provided a computer-implemented method for generating suggestions integrated into business applications. The method comprises: storing, in a dynamic database, parameters for generating suggestions relating to a plurality of business applications; generating at least one suggestion relating to a business application currently being used by a user, the at least one suggestion generated using the parameters stored in the dynamic database; integrating the at least one suggestion into the user interface of the given business application; monitoring input of the user into the given business application, including input reflecting whether the at least one suggestion has been actioned by the user; and updating the parameters stored in the dynamic database based on the monitored input so that generation of future suggestions may be refined.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE DRAWINGS

Embodiments will now be described, by way of example only, with reference to the attached figures, wherein:

FIGS. 4, 4A, 4B, 4C, 4D, 4E, 4F, and 4G illustrate a composite structure diagram showing the internal structure of a class and its collaborations in accordance with an embodiment of the present invention;

FIGS. 5, 5A, 5B, 6, 6A, 6B, 6C, 6D, 6E, 6F, and 6G illustrate classes, their attributes, and the relationships among the classes in accordance with an embodiment of the present invention;

FIGS. 7, 7A, 7B, 7C, 7D, 7E, 7F, and 7G illustrate how the software system may be split into components, showing the dependencies among those components, in accordance with an embodiment of the present invention;

FIGS. 8, 8A, 8B, and 8C illustrate a deployment diagram in accordance with an embodiment of the present invention;

FIGS. 12 to 27 illustrate various exemplary user interface views in accordance with aspects of the present invention.

Figure 1:
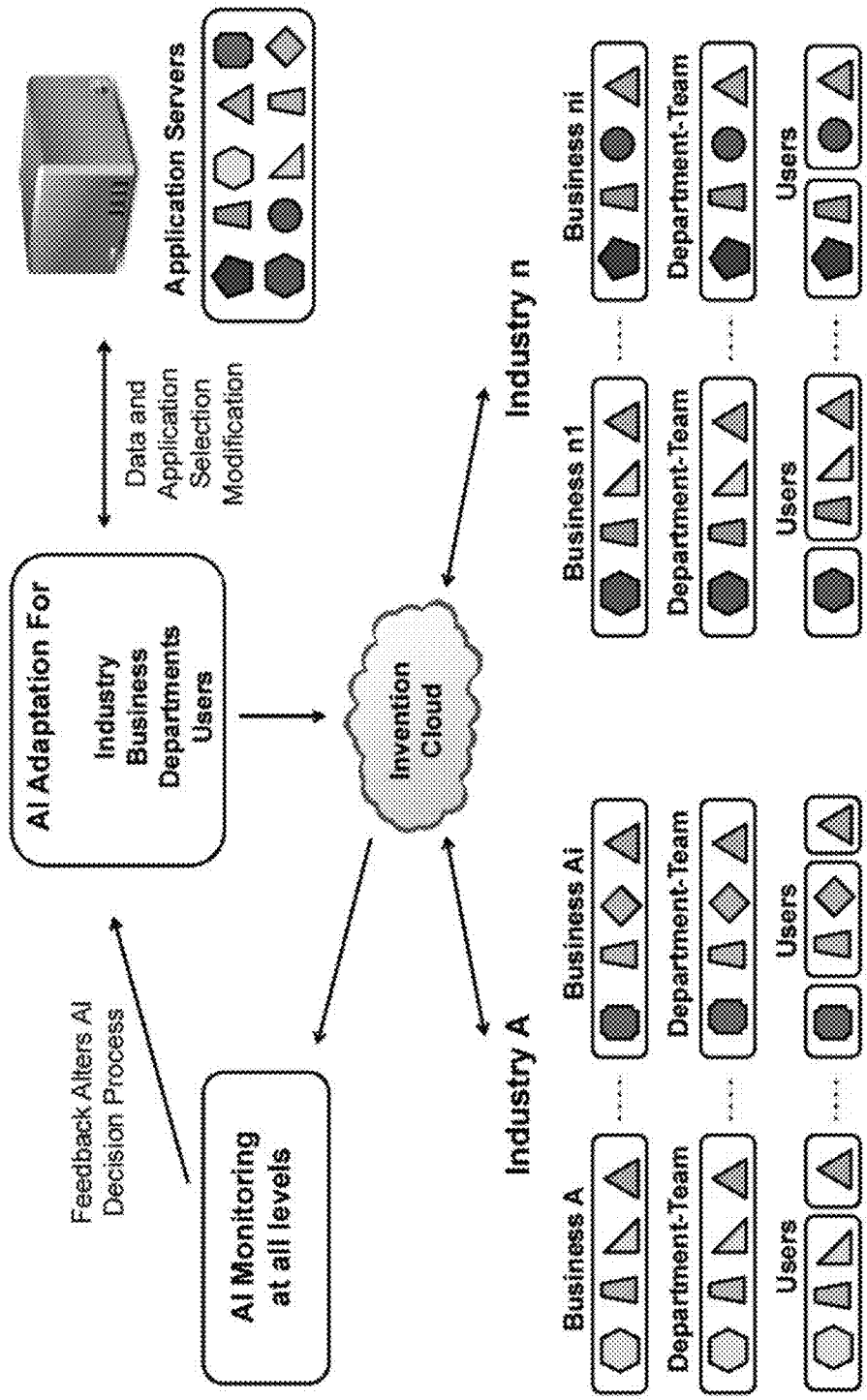
FIG. 1 depicts an exemplary system diagram illustrating the computer network architecture for implementing the present invention, in accordance with one embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Definitions

"Platform client" means an entity, such as a business or government entity, registered to use the platform of the present invention.

"User" means an individual user registered to use the platform. A platform client may have multiple users, and may assign different permissions to different users.

"Business data" is generally used to refer to the data provided by platform clients, generated by platform clients in using the platform, and also the data generated based on monitoring how platform clients use selected features or workflows of the platform.

"Business sector" means an industry, industry sector, or vertical relevant to a business or government entity. Business sectors may have sub-sectors.

"Business process" or "business processes" refers to any task, workflow or process associated with the business, operations, or practices of a platform client, or the management or analysis of these.

"Customer" or "customers" refer to the customers or clients of a platform client.

Platform

In one aspect, the present invention provides a computer network implemented system that allows platform clients to: (A) access valuable applications from the cloud, (B) store data in the cloud, (C) use the applications and the data in order to complete business processes, and (D) receive automatically analysis of business processes, or suggestions regarding business processes, that can be used by users to improve the business, operations, or practices of the platform client.

The applications (6) can be varied in nature, as detailed below with reference to example applications. In some embodiments, the applications (6) are designed to cover the key business processes of the platform clients.

FIG. 1 illustrates a solution architecture for the present invention, in accordance with one embodiment.

As shown in FIG. 1, the applications (6) may be implemented as cloud-based applications linked to an application repository stack (8) that is part of a cloud service (10). The cloud service (10) may be implemented as part of a server farm (12) that provides network-accessible services using the application repository (8). The cloud service (10) may also be implemented as a computer network implemented service that may be configured for a particular platform client or set of platform clients and provides dedicated databases for storing their data. The full advantages of the solution, across different platform clients, are however realized by implementation of the technologies and workflows described, in the cloud. The computer system and cloud service (10) of the present invention may be referred to as the platform (14).

In one aspect of the invention, the platform (14) includes an intelligent layer (26) that connects a platform's clients to its customers and suppliers, using artificial intelligence (AI).

In another aspect of the invention, the platform (14), using the intelligent layer (26) acts as a virtual agent that analyzes business data and iteratively suggests next steps, including steps based on analytical features that improve processes and improve decision-making. The platform (14) AI may provide multi-staged suggestions that improve through use of the platform (14) as the AI learns what elements are important to a user/platform client. For example, suggestions may initially be based on industry standards, and then are progressively fine-tuned to meet the requirements/preferences of a particular user or a particular platform client.

Conveniently, the platform (14) AI serves as a virtual consultant that processes volumes of data that is beyond the capabilities of manual processing. However, final decisions, as aided by suggestions provided by the platform (14) are left to human operators. In this way, based on the choices made the human operator (e.g., whether the suggestion is actioned), the AI learns how to improve the suggestions.

In yet another aspect of the invention, the platform (14) may be configured to provide advanced business management operations at all levels from research, design, manufacturing, marketing, regulatory, admin and sales. The platform (14) may be configured to perform all operations with necessary quality and design control requirements within each of these segments.

In one possible implementation, the platform (14) integrates a context-based decision support system (CBDSS) into a business management platform that provides varied applications for addressing a variety of business functions. The platform (14) is configured to close the usual gap that exists between the operations of business management technologies and solutions (such as ordering suppliers, managing inventor, payment of supplies), and reporting or analytics based on these activities. Using prior art solutions, a business management platform processes operations, may extract data from the operations, and the system or a separate system may generate reports. However, tying the data and the results of the analysis, or a specific subsection of that relevant to a particular operation that a user is initiating or about to initiate, was not previously possible. The CBDSS may integrate into a consumer management platform that may have limited low level access to the business management system. This allows for improved business-consumer interaction, e.g., by way of software and/or devices used by the consumer. In turn, operational efficiency may be improved. For example, operational efficiency may be improved in such an implementation by: quickly being alerted to rebates and sales, place orders from anywhere, interact more closely with business, collect loyalty dollars, etc.

Figure 11:
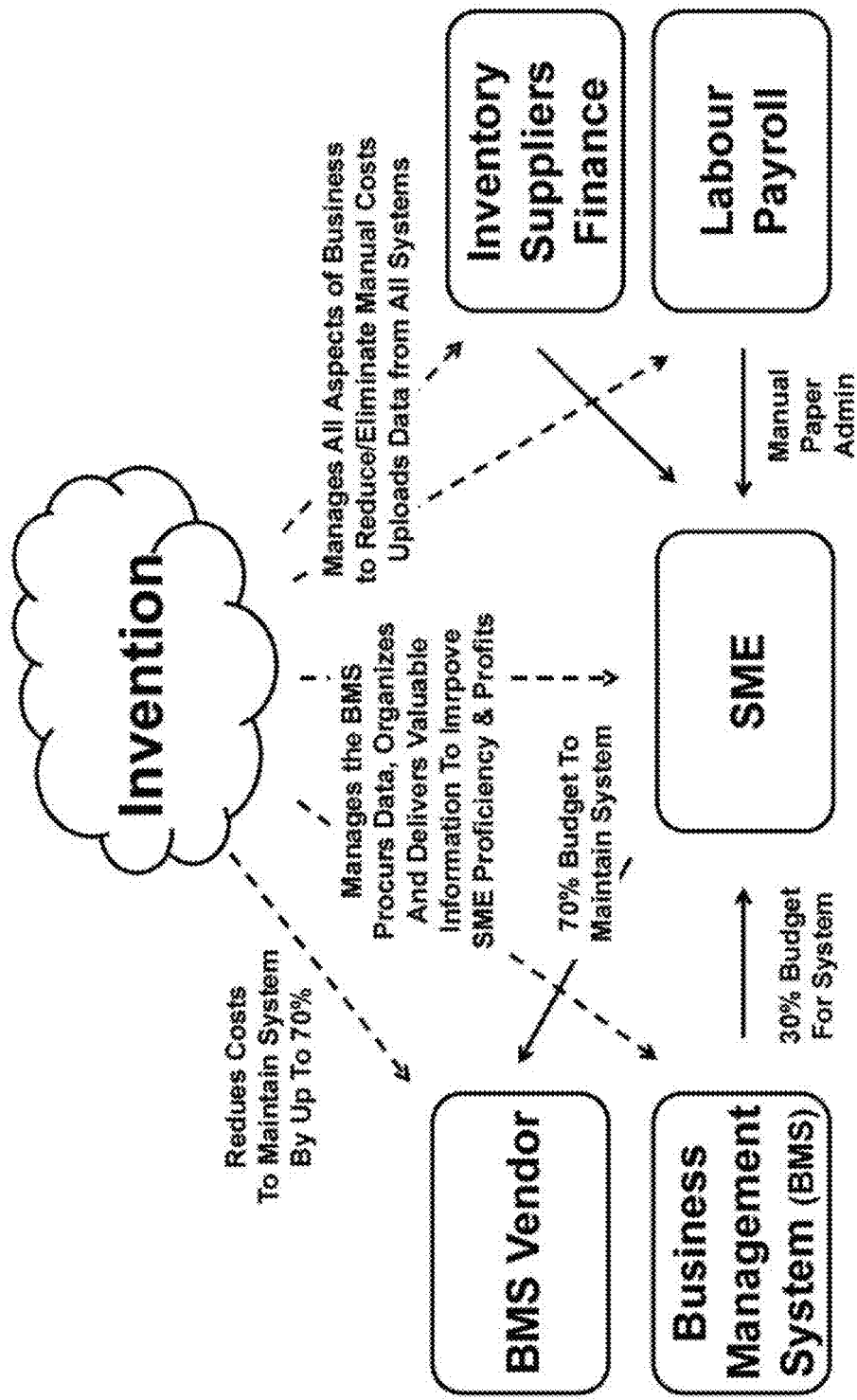
FIGS. 11, 11A, 11B, 11O, 11D, 11E, 11F, 11G, 11H, 11I, 11J, 11K, 11L, 11M, 11N, 11O, 11P, 11Q, 11R, 11S, 11T, and 11U illustrate activity diagrams outlining business and operational workflows of components of the system of the present invention, in accordance with an embodiment of the present invention.

In some embodiments, the CBDSS includes an AI-based database that is dynamically updated as inputs are provided (e.g., in the form of user clicks). In one implementation, this AI-based database is implemented in association with a plurality of AI nodes, as detailed below with reference to FIG. 11*d* and FIG. 11*e*.

The applications (6) may cover a range of business sectors such, as for example, service industry; biotechnology; stock market; and real estate. Examples usage of platform (14) in such varied business sectors is detailed below.

The applications (6) may be implemented to provide computerized functionality for completing all or most business processes for a particular business sector.

For example in the service industry, with a platform client such as a restaurant, the key business processes or features including: buying from suppliers; inventory management; processing customers' orders and payments; scheduling employees; managing employees; and paying employees. As between different business sectors (or sub-sectors) there can be differences in requirements of platform clients to run their business from other business sectors (or sub-sectors) as well as similarities.

In one aspect of the platform (14), various discrete applications are configured and linked to the application repository (8). At an initial stage, for example at sign up, information may be obtained for a platform client in order to determine the applications (6) that are likely to be relevant for their business. For example, a platform client that is a restaurant is likely to need a particular sub-set of the applications (6), e.g., employee payroll applications, supplier ordering applications, etc. The operator of the platform (14) may determine the relevant applications (6) by surveying platform clients in different business sectors regarding their business processes and the type of technology solutions they use or would like to use. The information regarding the requirements or choices of a platform client may be obtained using a survey form, for example, presented dynamically by an administrative utility of the platform (14). The administrative utility may analyze data provided in one or more fields by a user, to then determine the next fields/questions to be presented by the system. Once a survey routine has been executed, the administrative utility generates a profile, which is provided to a profile manager of the platform (14).

The profile manager may be implemented by the cloud service (10) and maintains profiles for the various platform clients, and also their users, and may enhance the profile iteratively to make platform more responsive to the needs or requirements of the users.

In some embodiments, the profile manager is configured to adaptively transform one or more applications (6) to personalize the applications (6) for a particular user. For example, the interface of an application (6) may be transformed to add/remove functions, or operations, or access to screens based on a particular user's privileges. The interface may also be transformed to optimize performance of a particular user (e.g., by re-sizing, repositioning buttons, displays, etc.). For example, operations that the user has privileges to use but does not use very often may be made less prominent (e.g., a button associated with such an operation may be made smaller or moved to a less prominent location). Conversely, operations that the user uses often may be made more prominent (e.g., the button associated with such an operation may be made larger or moved to a more prominent location).

Further, the platform (14) and suggestions provided by the platform (14) AI are integrated into the operations. In this way, suggestions are provided in an integrated manner in the operations, rather than being in a separate and/or intrusive part. For example, suggestions are incorporated into the tasks being performed by the users, and can be ignored or implemented by users without distracting them from their task at hand.

To this end, in some embodiments, the platform (14) presents application interfaces that provide at least one or more of: (i) application interfaces that allows a user to perform entire task-operation in one screen, (ii) no pop-ups (e.g., for suggestions), (iii) suggestions that are actionable with one touch/click; (iv) what you see is what you get (WYSIWYG) content editing; (v) suggestions that are presented in the same area and change with the operations allowed in that screen.

For example, in a supplier order application, suggestions for items to order are presented in the order screen (with the entire list of items that can be ordered) while suggestions for items to count are presented in the inventory screen (along with the list of the entire items that can be counted).

The administrative utility may also be used by a manager of the platform client to populate the platform (14) with information regarding the various personnel who will be users of the platform (14), and the permissions that they will have in using the platform (14). For example, a consumer may use an application to place and pay orders from anywhere, and the order is received and printed in the place of business (see http://higgins.ai or https://vimeo.com/88015947, the entirety of each of which is incorporated by reference).

Another initial step may be to upload to the platform (14) certain information required for executing business processes such as, for example, contact information for various suppliers or customers of the business, key documents or agreements (such as purchase order forms, agreements entered into with customers of the platform client), logos used by the business, certain business rules such as payment terms expected of customers and timeline for sending reminders to customers who have not paid yet etc. Further examples of information that may be on-boarded to the platform (14) and tools for on-boarding such information are now provided.

The application repository (8) may include one or more data import utilities. The platform (14) may feature an API that allows other services to "plug in" to it. For example, software services including scheduling, labour management, reservations, accounting, and any value-added service to consumers or businesses utilities may plug in to the platform.

In some embodiments, the platform (14) may be configured to help users establish links in a supply chain, e.g., connecting supplier to distributor to seller to reseller to customer to owner. For example, the platform (14) may provide AI-generated suggestions regarding particular links in the supply chain to help establish the supply chain. In this way, onboarding of platform clients may be improved in efficiency.

In some embodiments, the platform (14) may be configured for ready integration and interoperation with other platforms (e.g., third party platforms) along a supply chain. For example, the platform (14) may be configured to communication with such other platforms using one or more APIs exposed by those other platforms.

Conveniently, the use of cloud-based resources such as, e.g., cloud services (10), allows intercommunication and cooperation between applications executing on different operating systems, including those on third-party platforms.

Further, the extractor component (24) may be configured to obtain data from various disparate systems including those on third-party platforms. In this way, the platform (14)

may link the various disparate systems and thereby provide continuity of data flow and user experience throughout the platform.

In some cases, the on-boarding of a platform client will already result in the provision of significant amounts of business data. Data may be stored to a cloud-based database, which may be implemented as a cloud-based data centre. Various data storage services may be provided by the operator of the platform (14) to platform clients for example a dedicated, private cloud-based data service which may be used to secure the data in accordance with a platform client's particular requirements. The cloud-based database however may be implemented using best practices for segregating access to information to only those users with the required access profile, as established using the profile manager.

Other business data, such as data regarding the use of functions or workflow of platform by particular platform clients may be generated by an extractor component (24). The extractor (24), for example, monitors use of different applications, and transitions between applications, to log data that may be analyzed for example by the platform (14) to determine platform client business processes as they evolve, or user preferences, for example to improve the business of the platform client and make its users more efficient.

In certain implementations, the extractor (24) may include the following features or functions. In a possible aspect, the application gathers rebates and sales from businesses and passes along relevant information to the particular consumer in the area they happen to be and to the tastes that they have exhibited in the mobile system. In another possible aspect, the application gathers inventory data from businesses and searches for rebates from suppliers in the system. Such data is added to inventory reports to communicate it to business owners who can then purchase the items.

In another possible implementation of the present invention, the extractor (24) may be configured to look for additional information regarding a platform client or a user from external data sources such as external libraries or directories, the Internet, or the social web. This information may be used in order to enhance the profile for the platform client or the user and provide further data foundation for generating the intelligent layer (26) to generate its insights.

In another possible aspect, the platform (14) may be configured to be money driven and acts on even relatively small opportunities to save money or increase revenue. One or more filters may be adjusted using the administrative utility, however, the platform (14) is designed to be "frugal".

Significantly, in one aspect of the platform, the system is designed such that the various business data of the platform clients is analyzed in the background. The platform (14) is configured to continuously collect information and analyze information, and use this information in a number of unique and innovative ways, as described in this disclosure.

Applications may be delivered to clients from different verticals, including businesses, organizations, and consumers. The hierarchy of the group is followed unless it is a sole user. The platform may be tuned to each business, department, and user across a plurality of verticals. Each client may be assigned one or more application(s) and function(s) specific to the client. The selection may be tuned by the AI component of the platform that dictates what applications each user obtains as well as providing alerts and interfaces specific to the Role of the user. The manner in which the user interacts with the platform may be monitored at various levels. The feedback may be sent to the AI processing unit to develop an individualized repository of user habits. This may be used to help the AI improve its interactions with the Users and provide a more engaging environment.

Figure 2:
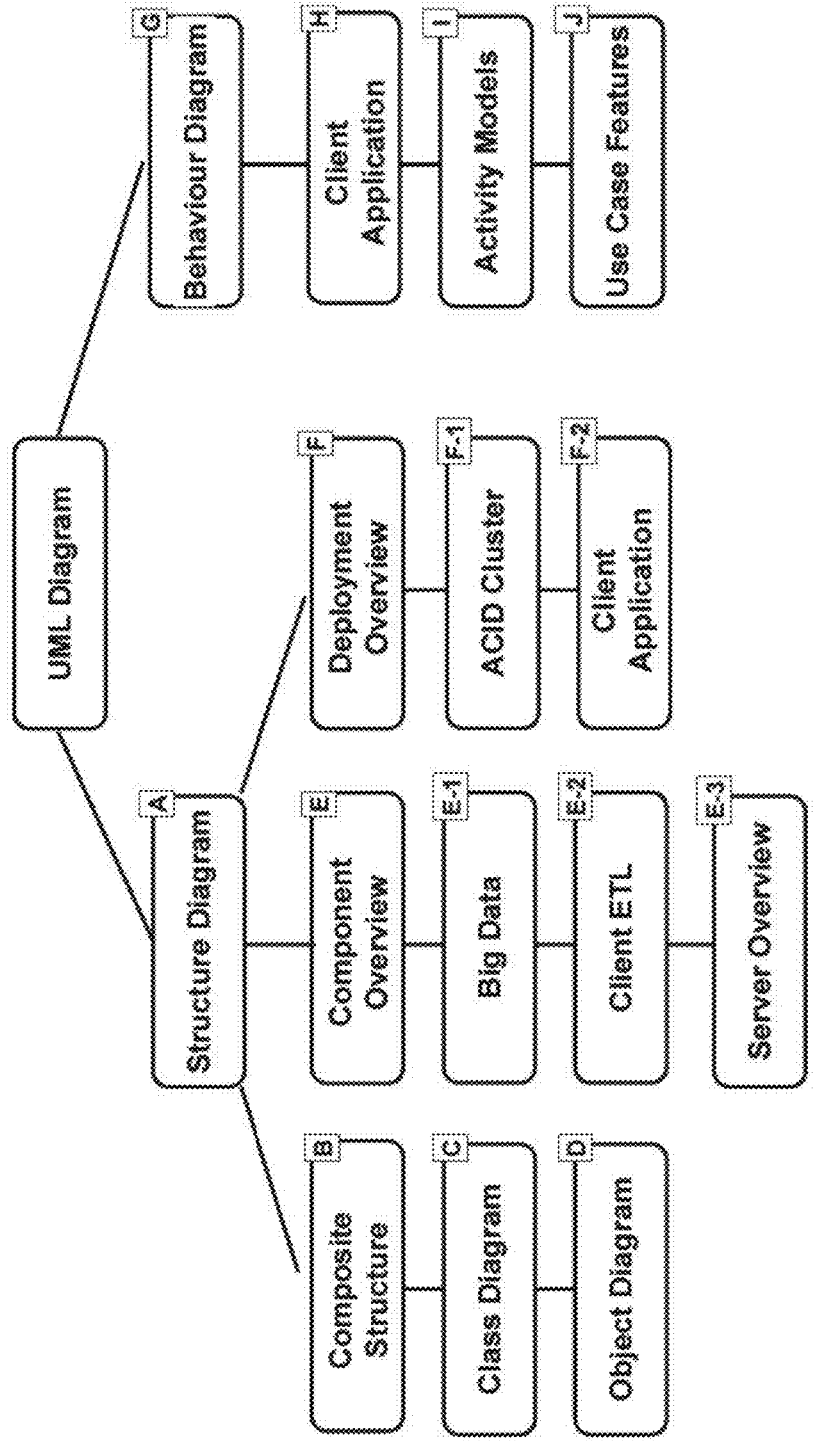
FIG. 2 illustrates a Unified Model Language (UML) diagram of an embodiment of the present invention showing some elements of the invention represented in FIGS. 3 to 11e.
Figure 3:
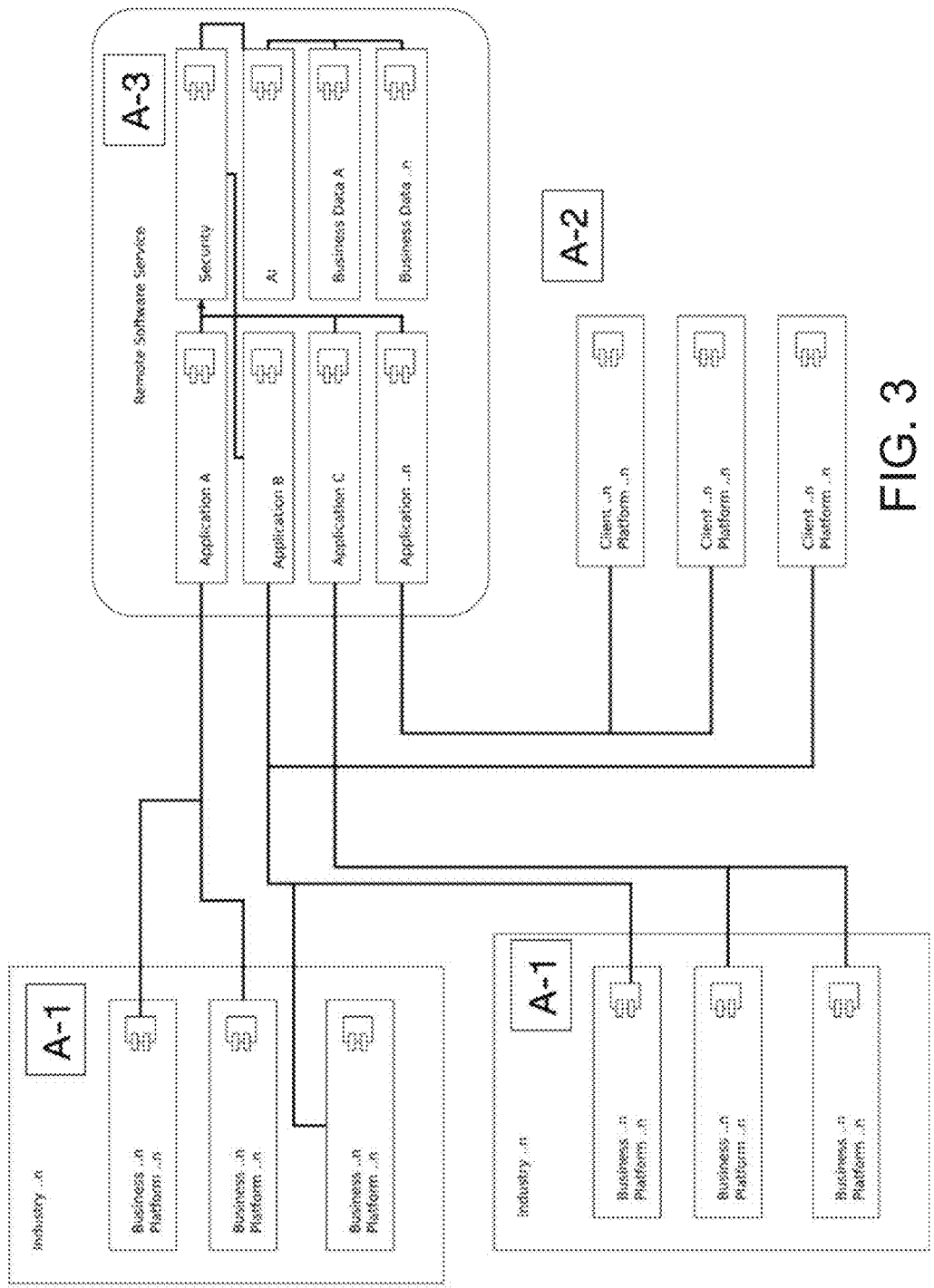
FIG. 3 illustrates a structure diagram showing the overall architecture of an embodiment of the platform of the present invention.
Figure 4:
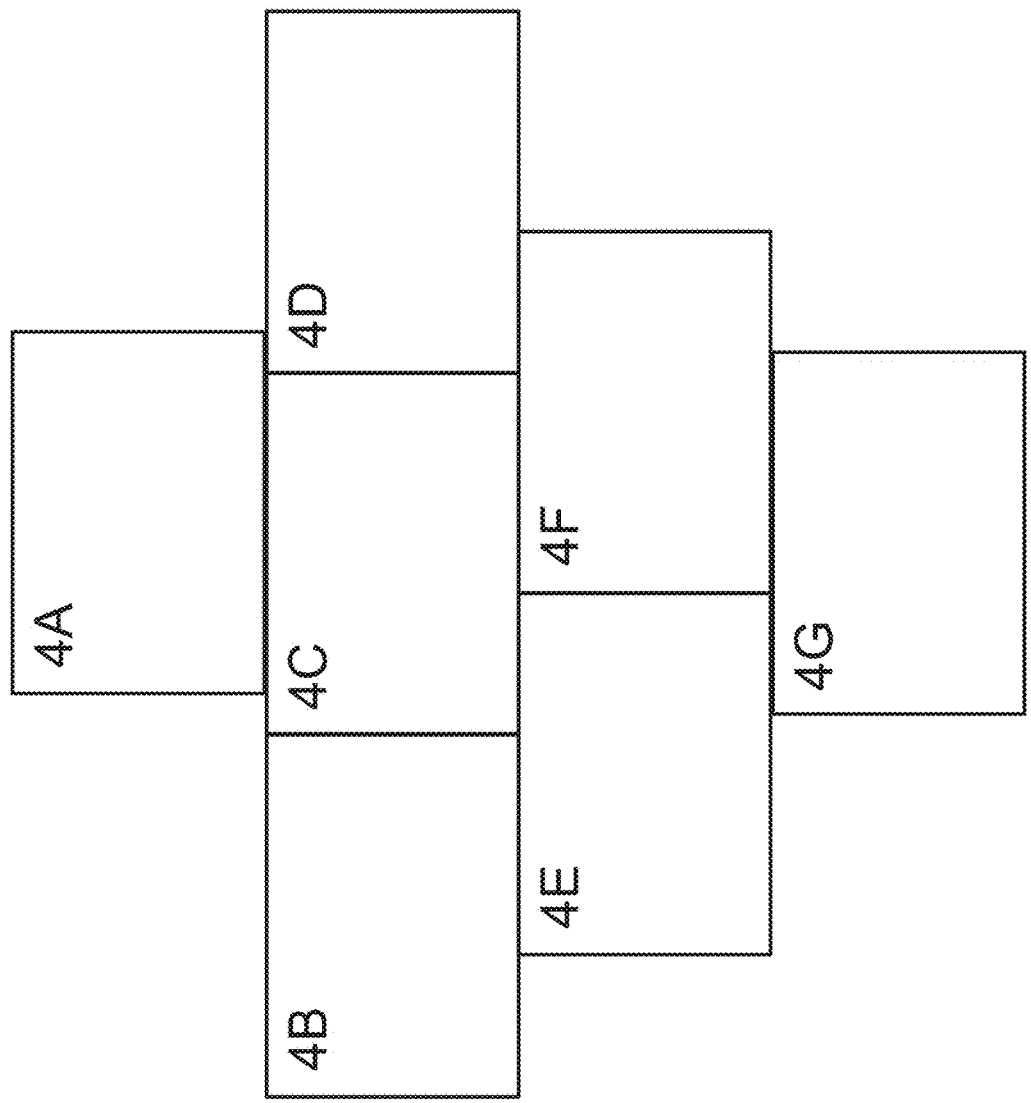
Figure 4B:
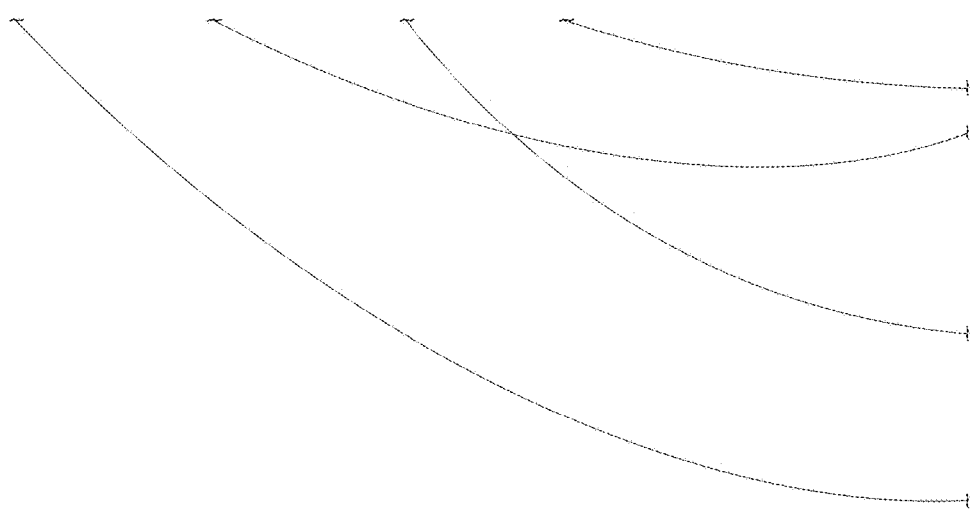
Figure 4C:
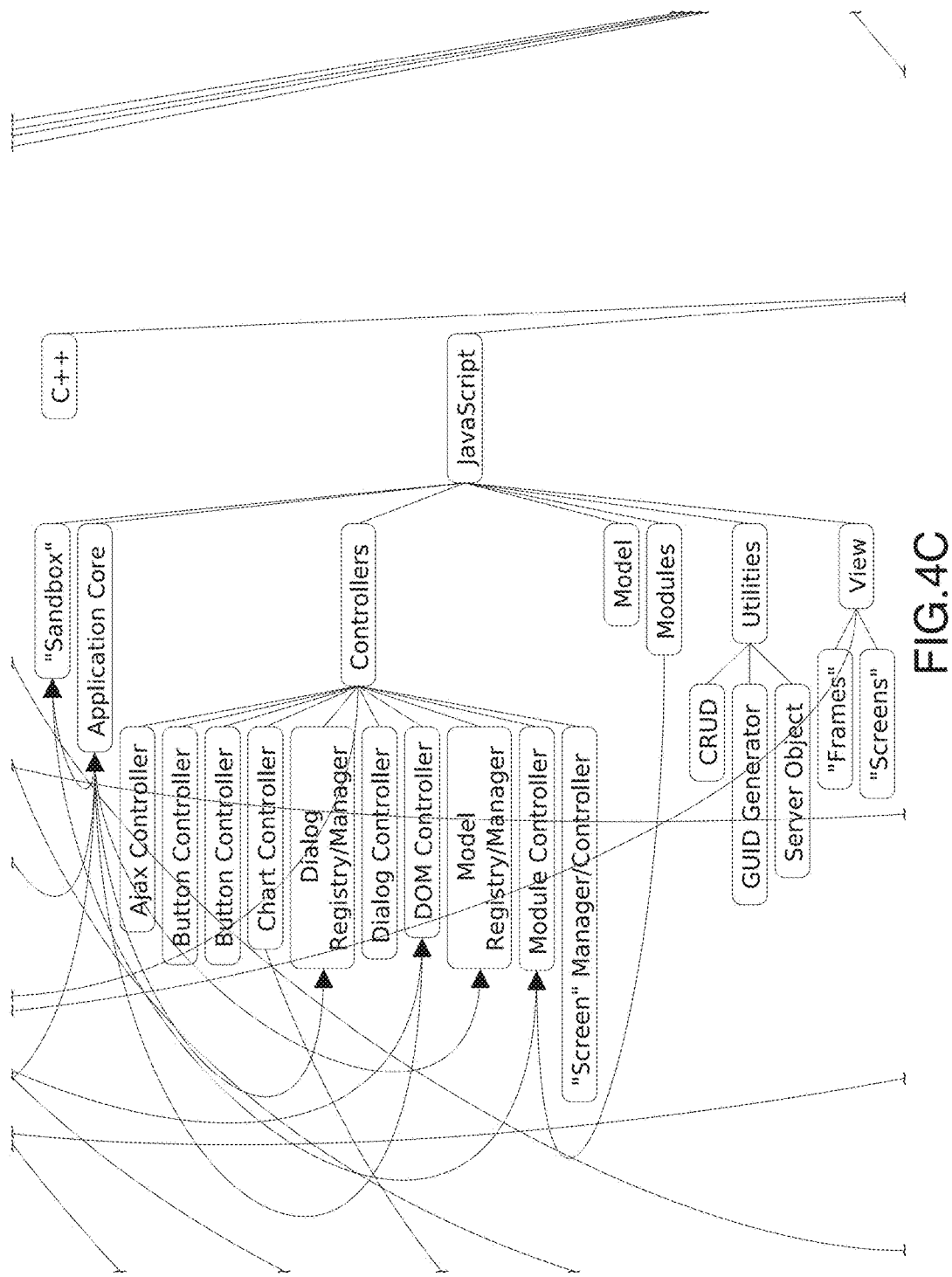
Figure 4D:
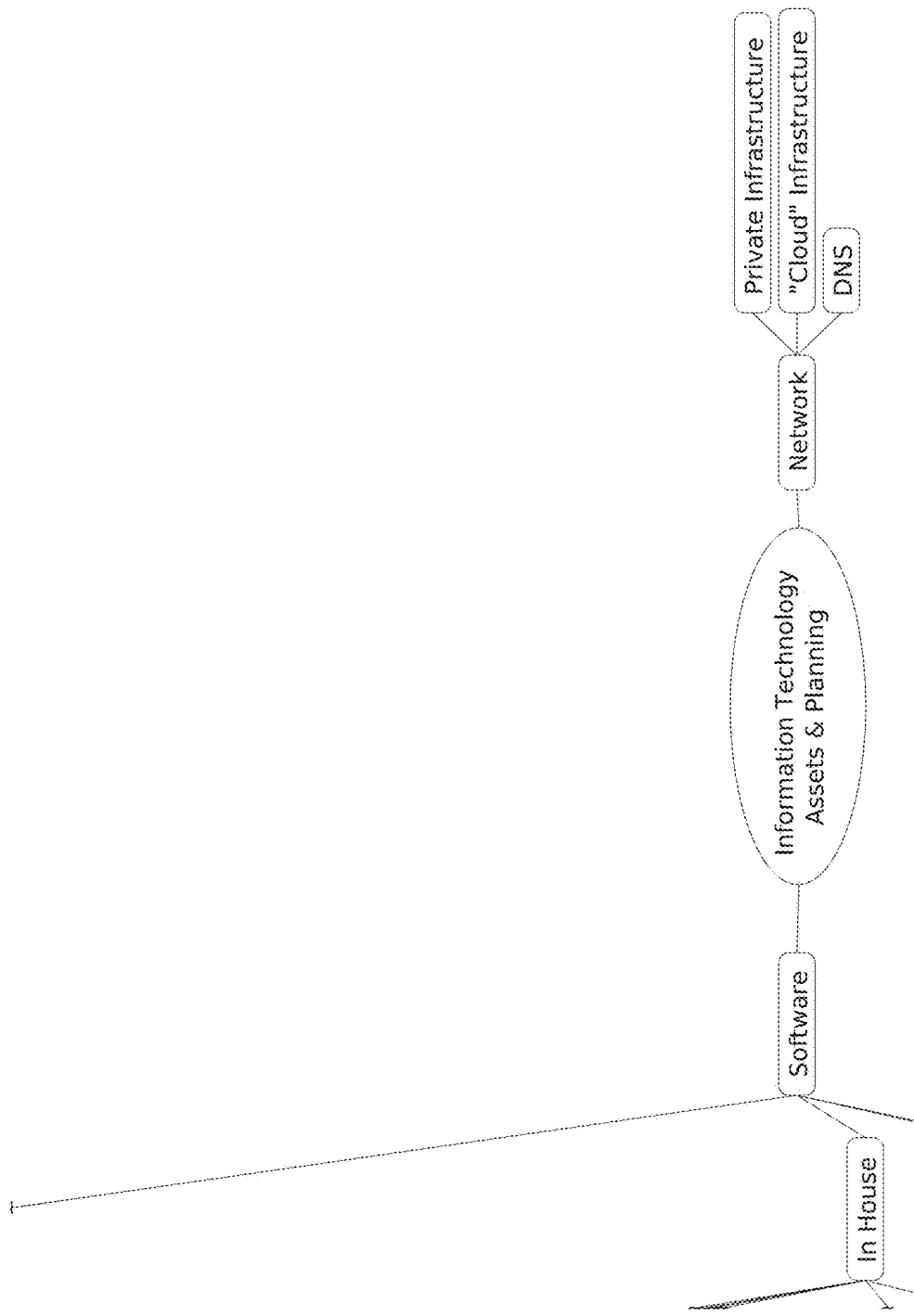
Figure 4E:
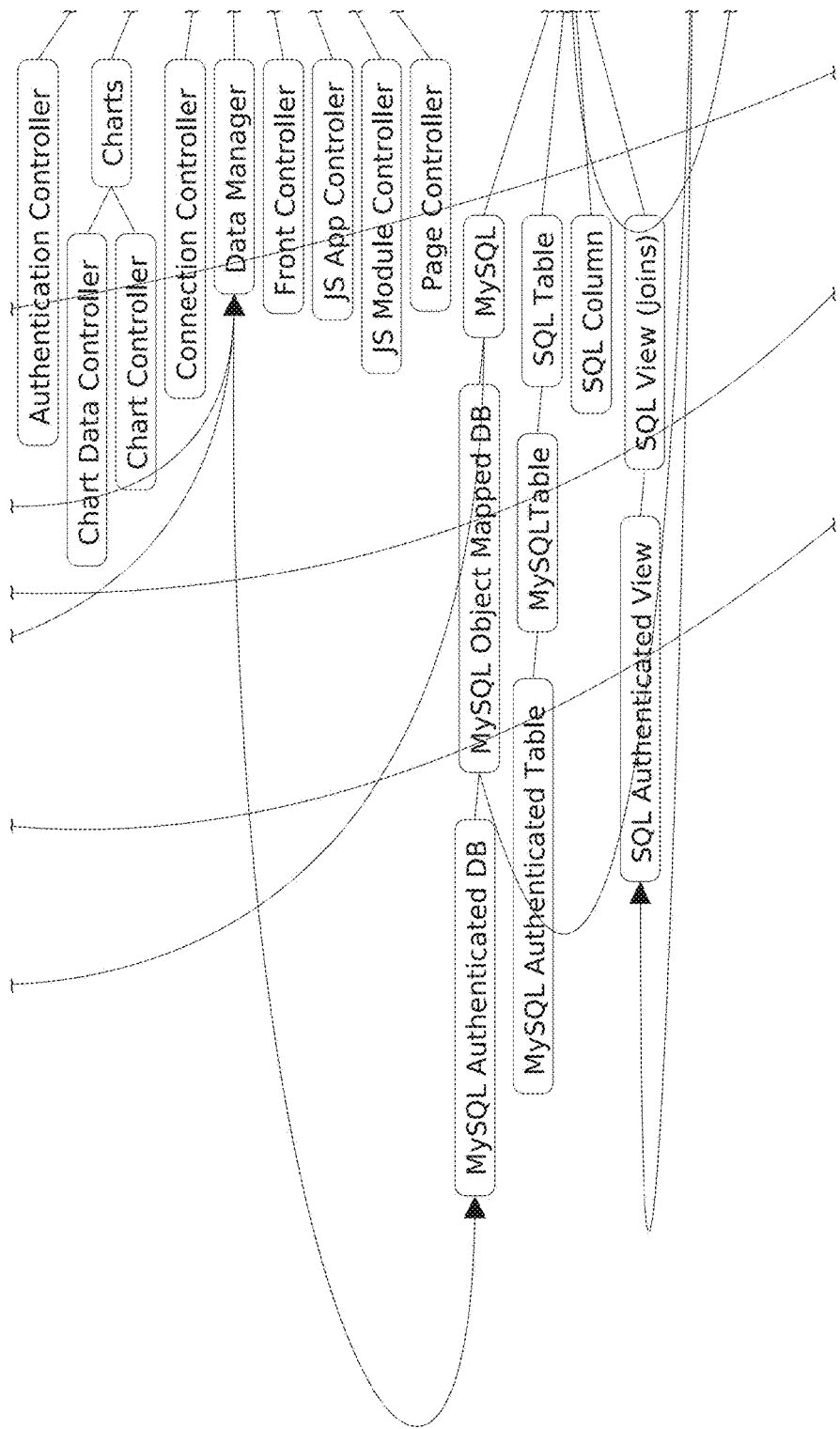
Figure 4F:
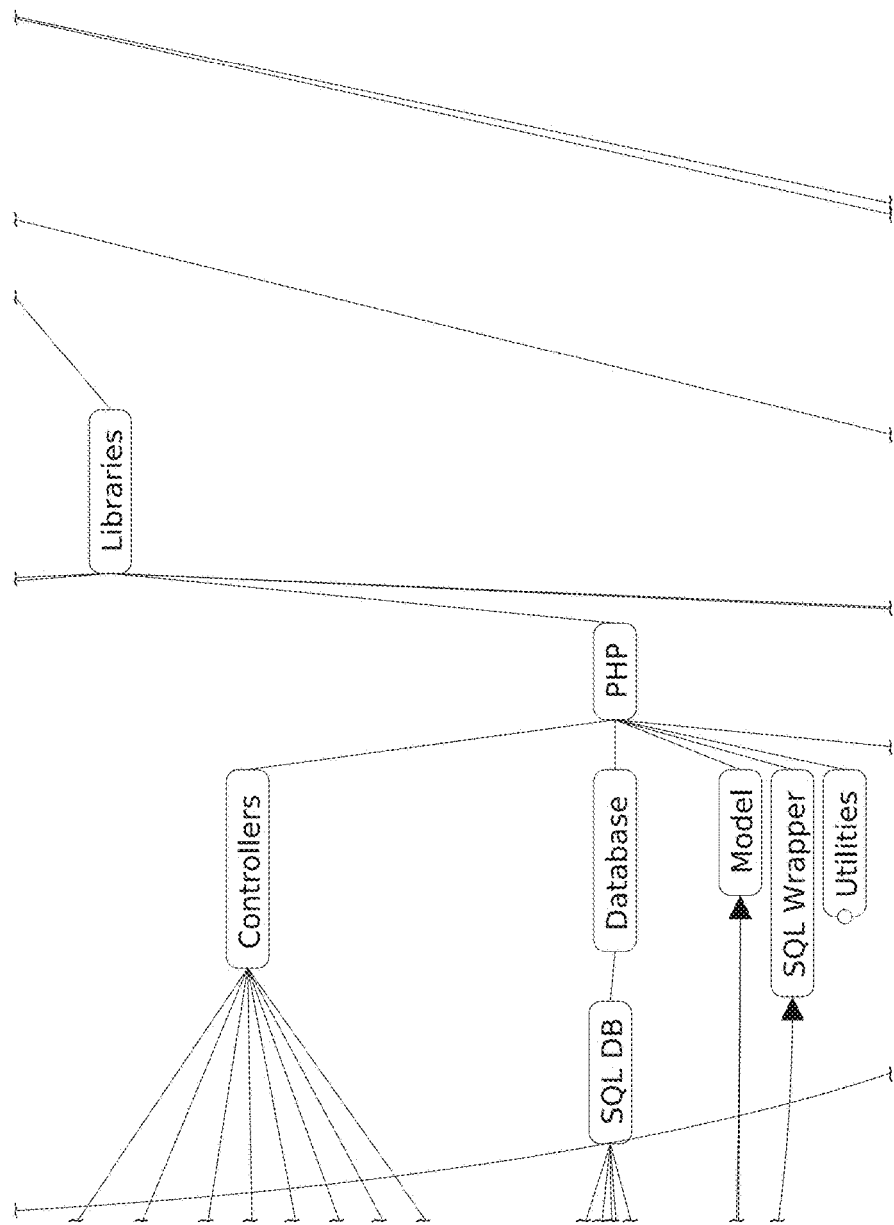
Figure 4G:
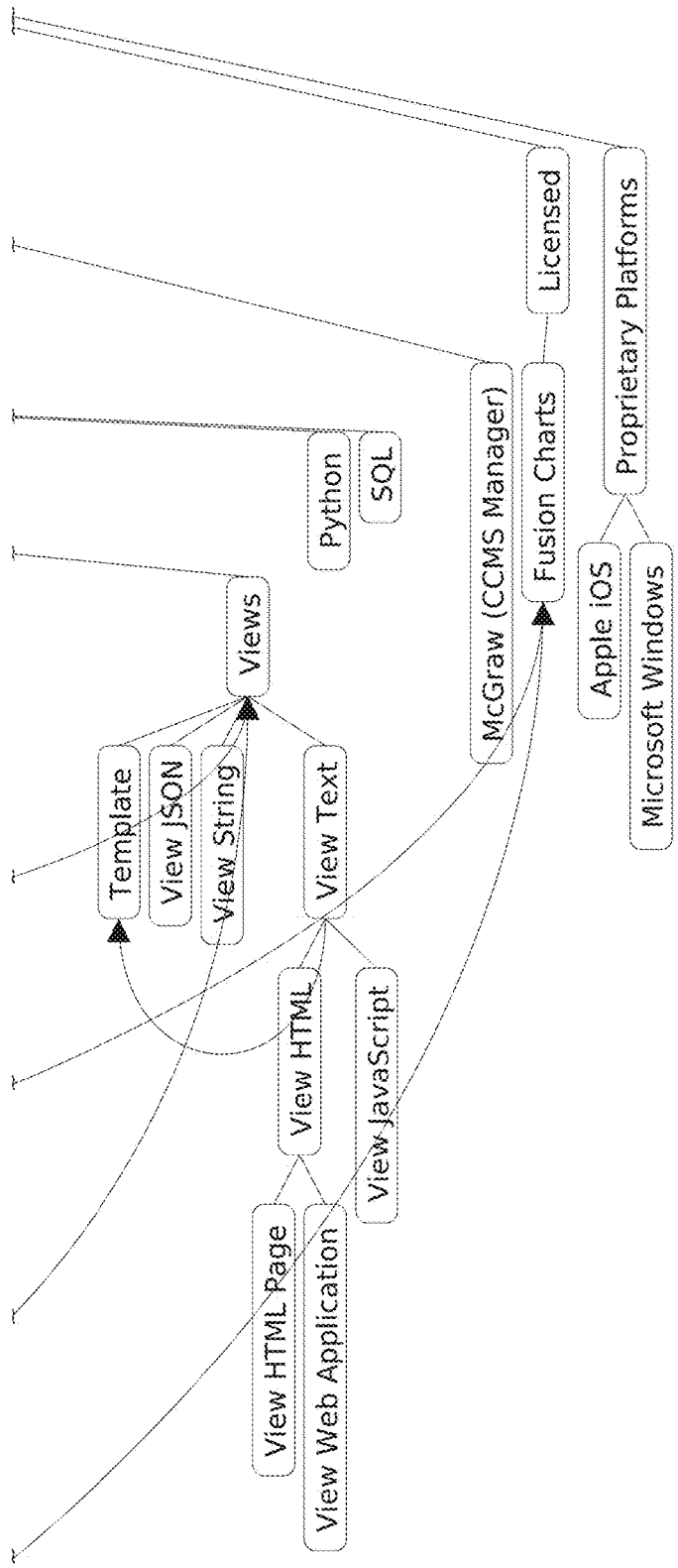
Figure 5:
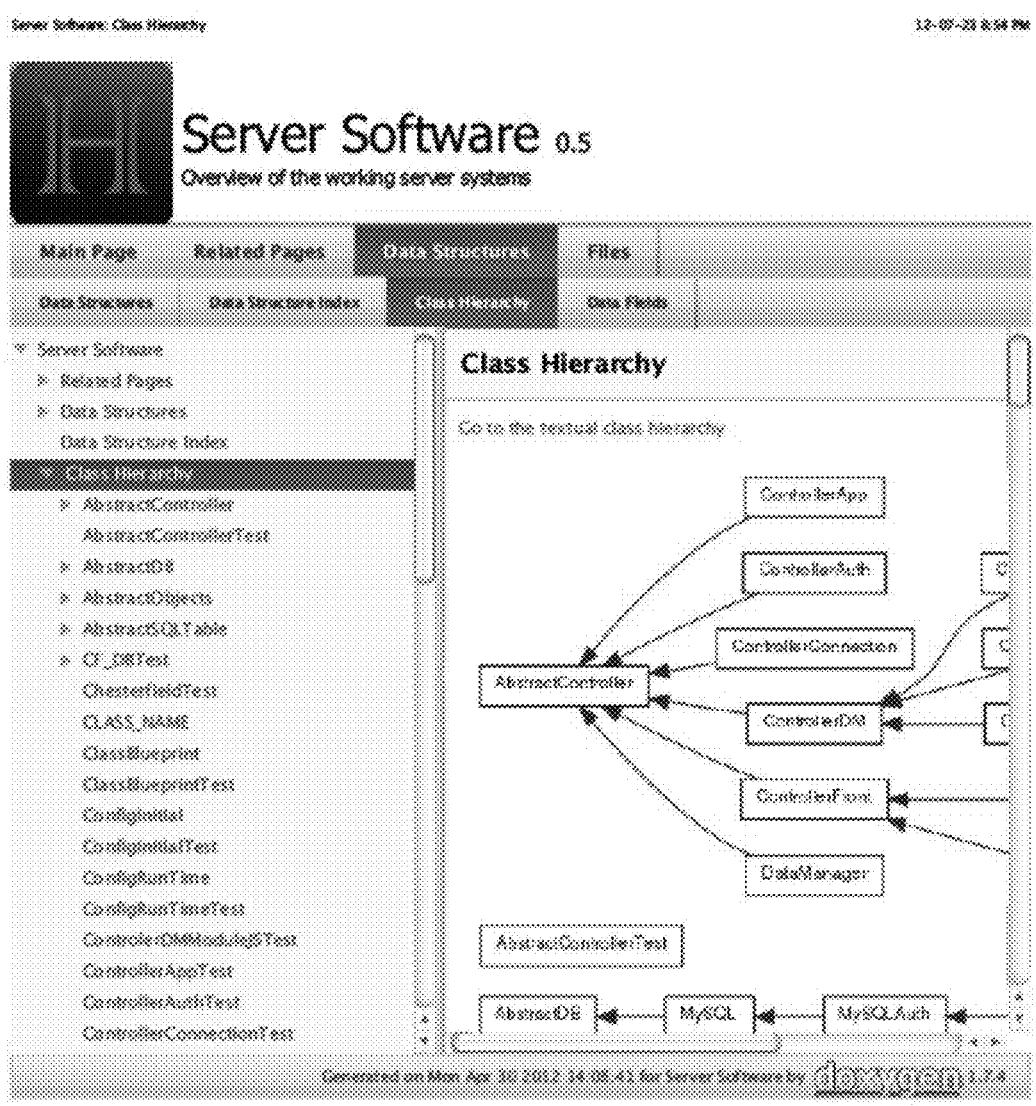
Figure 5A:
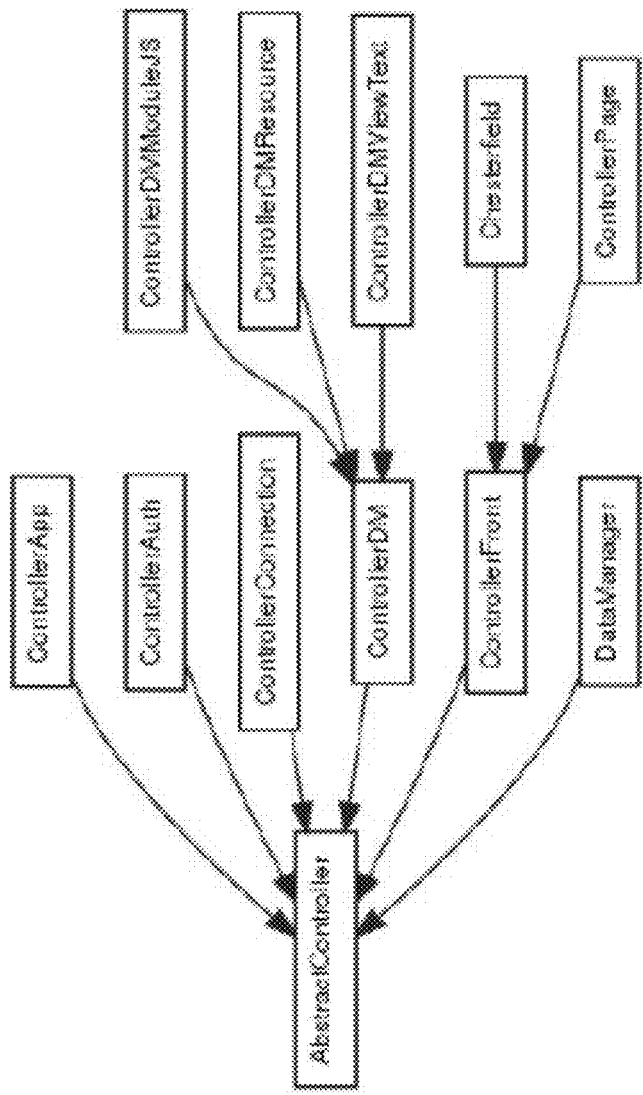
Figure 5B:
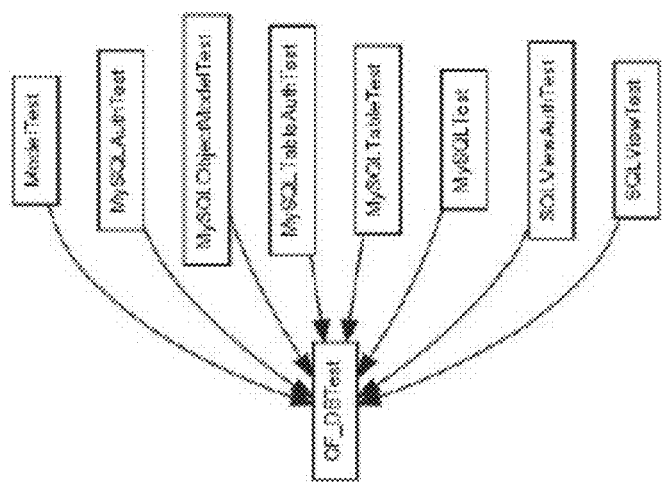
Figure 6:
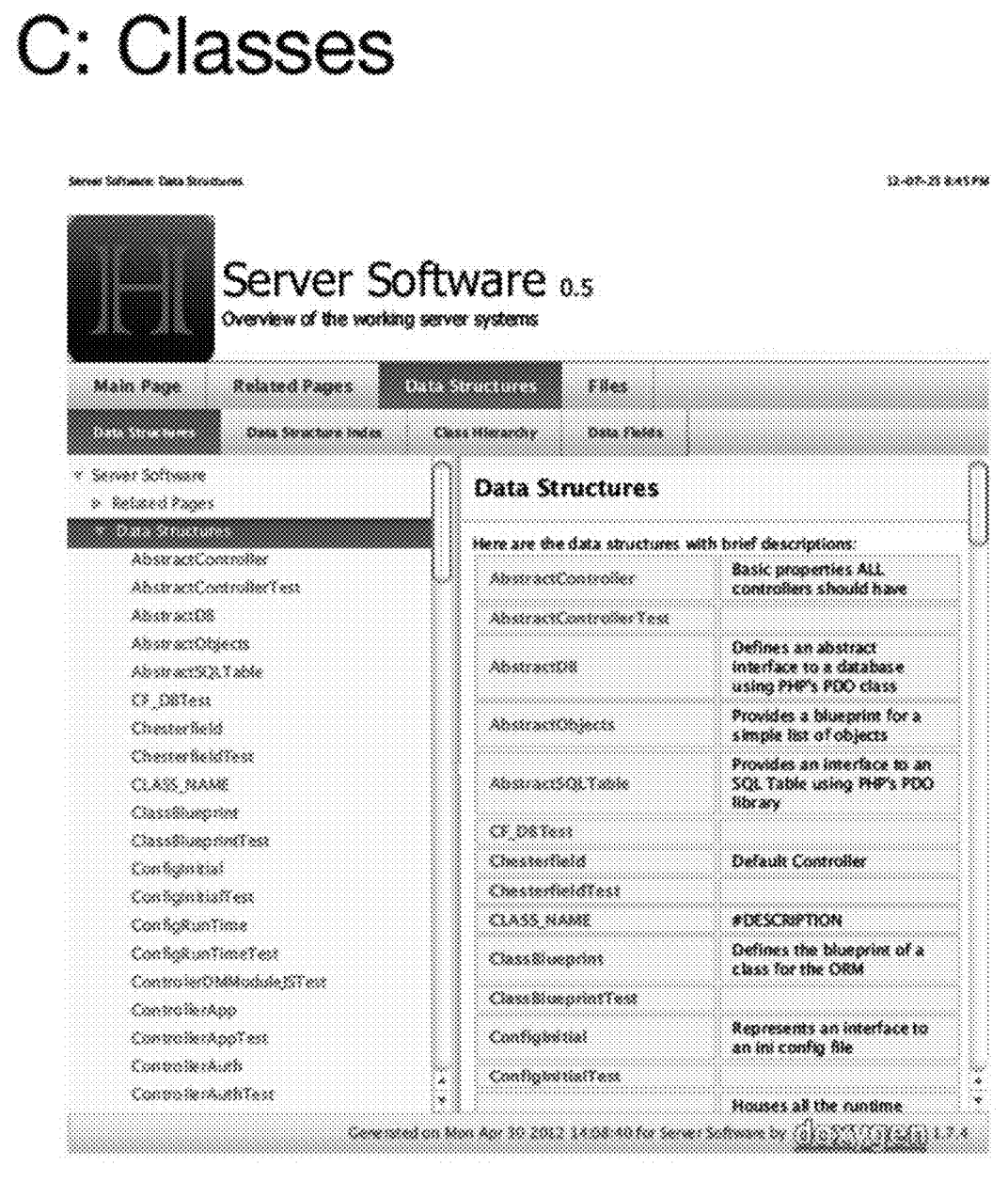
Figure 6A:
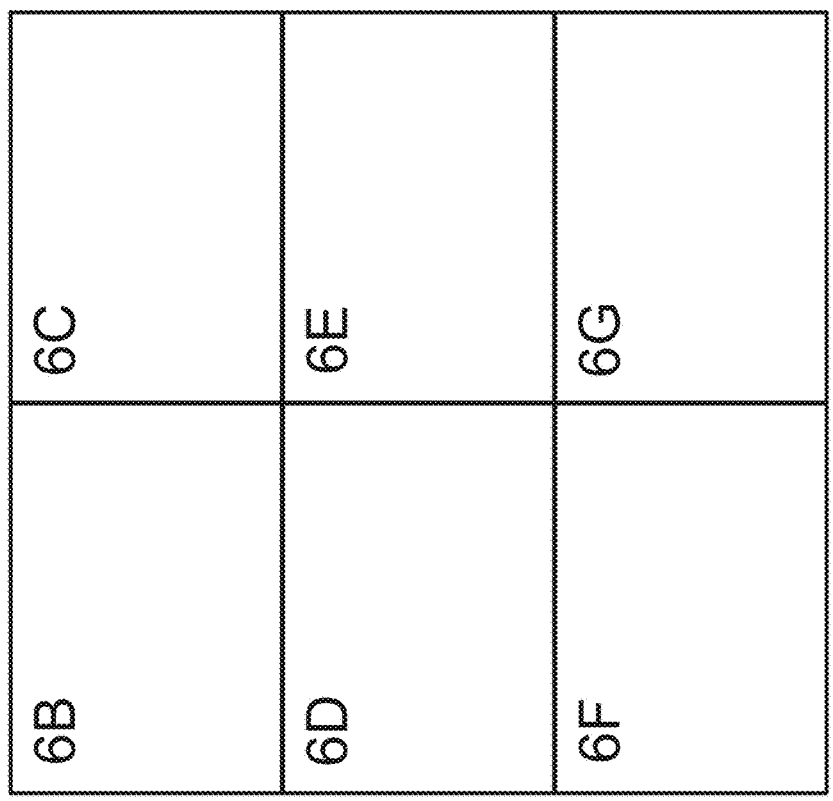
Figure 6E:
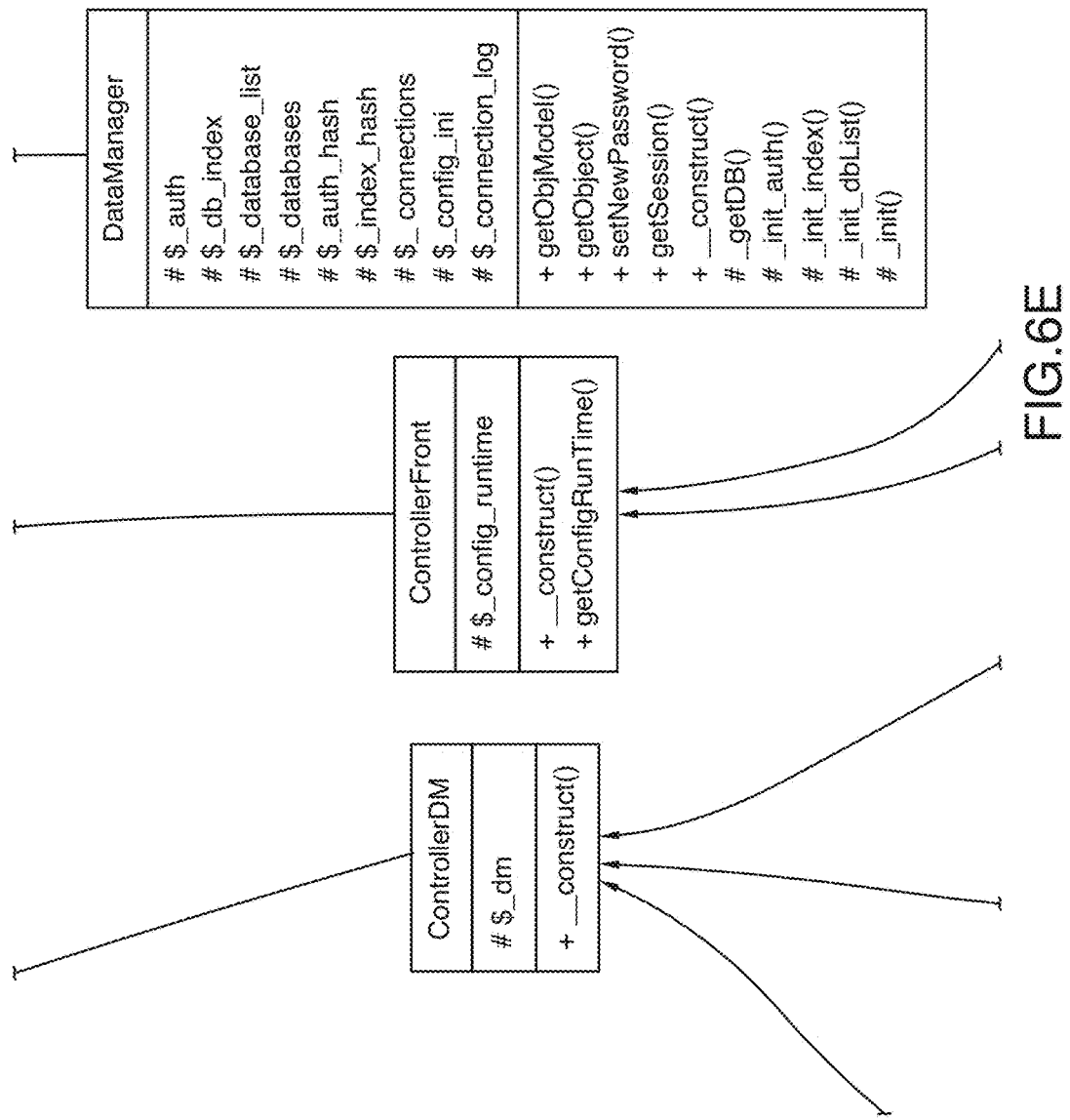
Figure 6F:
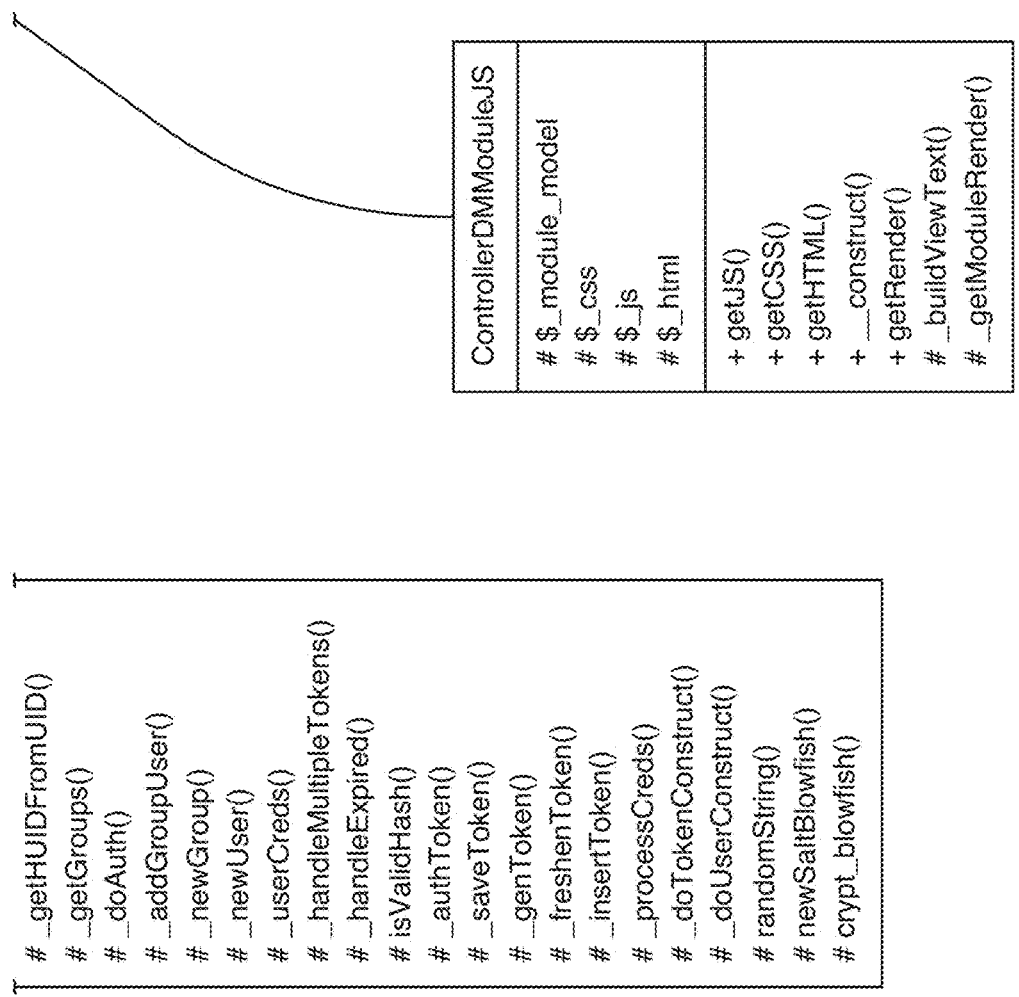
Figure 6G:
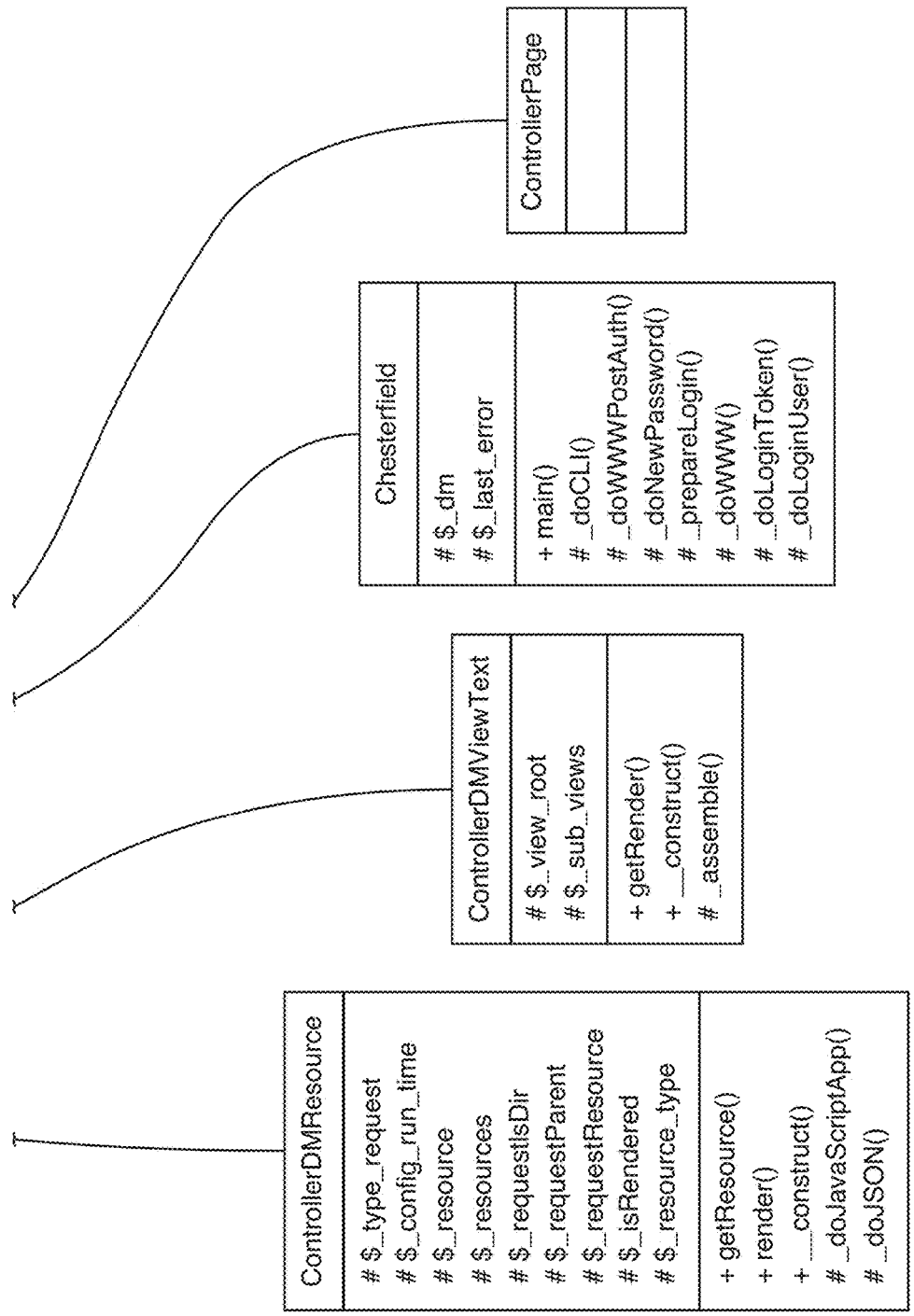

FIG. 2 shows a Unified Model Language (UML) diagram of the present invention showing some elements of the invention which are represented in FIGS. 3 to 11e.

The Structure Diagram (A, FIG. 3) shows the overall architecture of the platform. Embodiments of the invention may be implemented for any industry (A-1) that contains any number of businesses and any number of platforms (different types of systems) that the invention can link to in the business. Embodiments may also be implemented for consumers identified as Clients in A-2 and can use a variety of platforms and devices. One or more locations of a single business or consumers can simultaneously access the Ecosystem (A-3) that behaves like a remote software service that includes any number of applications. The platform may include a security component, artificial intelligence processing along with business and consumer data including a big data repository.

The Composite Structure Diagram (B, FIGS. 4, 4A, 4B, 4C, 4D, 4E, 4F, and 4G) shows the internal structure of a class and its collaborations.

The Class Diagrams (C, FIGS. 5, 5A, 5B, 6, 6A, 6B, 6C, 6D, 6E, 6F, and 6G) show the system's classes, their attributes, and the relationships among the classes.

The Component Diagram (E, FIGS. 7, 7A, 7B, 7C, 7D, 7E, 7F, and 7G) shows the software system is split up into components and shows the dependencies among these components.

In an implementation of the invention, the platform backend is made up of the following Components: Big Data Cluster (E-1); ACID/SQL Cluster (E-2); and Application Server Cluster (E-3).

The Big Data Cluster (E-1, FIGS. 7a, 7f, 7g, and 7h) includes several clusters that manage the big data repository and analysis. These include the Artificial Intelligence (AI) cluster with client geared neural network processing; Server software for running the cloud network; Security cluster to keep Big Data separate from main platform; ACID-compliant (atomicity, consistency, isolation, and durability) SQL Database storage with its own authentication cluster; and DHT (Distributed Hash Tables) cluster that is a temporary store of data and accelerates process. The Big Data Cluster may server to speed up analysis rates for each request. This may improve performance of processing data on the web making it comparable or better in performance then if the data was stored on the client's device. It also may improve security as all Data and requests are encrypted and secured in the cloud rather than a device's storage. In addition the data is backed up on the cloud so it stays with User regardless of the device.

The Big Data Cluster may include several clusters that manage the big data repository and analysis. Big data may be defined as the agglomeration of all business data from several businesses and industries. The Big Data Cluster may include: a Firewall Gateway Cluster (E-1A); Server Software (E-1B); Deployed ACID Micro Clusters (E-1C); and DHT Cluster (E-1D).

The Firewall Gateway Cluster (E-1A) may be provided as an additional wall of protection so only high Level DEUM corporation staff can access the big data information. This is not for client access. The firewall may include its own logging cluster that may require user key identification and is allowed on company approved devices (MAC address known). The Firewall Gateway Cluster may include a NIDS (Network Intrusion Detection System) which may be configured to fight off attacks and actively protects the component.

The Server Software (E-1B) is for running the cloud network. The Server Software may include fetch agents that take requests from the External Request Handler and combine AI component processing with various work nodes specific to businesses, industries and any type of AI processing. As an analogy, the AI Component is the basic brain matter while the work nodes are specific AI knowledge of specific business, industry or any analysis. Processing performed by the Server Software may include, for example, sales analysis for pharmaceuticals, inventory management for service industry, etc. A C&C (Control and command) service may be provided to manage all or some of the sub-component communication with the cluster.

The Deployed ACID Micro Clusters (E-1C) component may include all or some of the derived data from the permanent ACID compliant SQL storage. This may include the Artificial Intelligence (AI) with neural network processing and any industry data that contains all the businesses.

The DHT (Distributed Hash Tables) Cluster (E-1D) component may provide rapid AI data processing performance.

Figure 7:
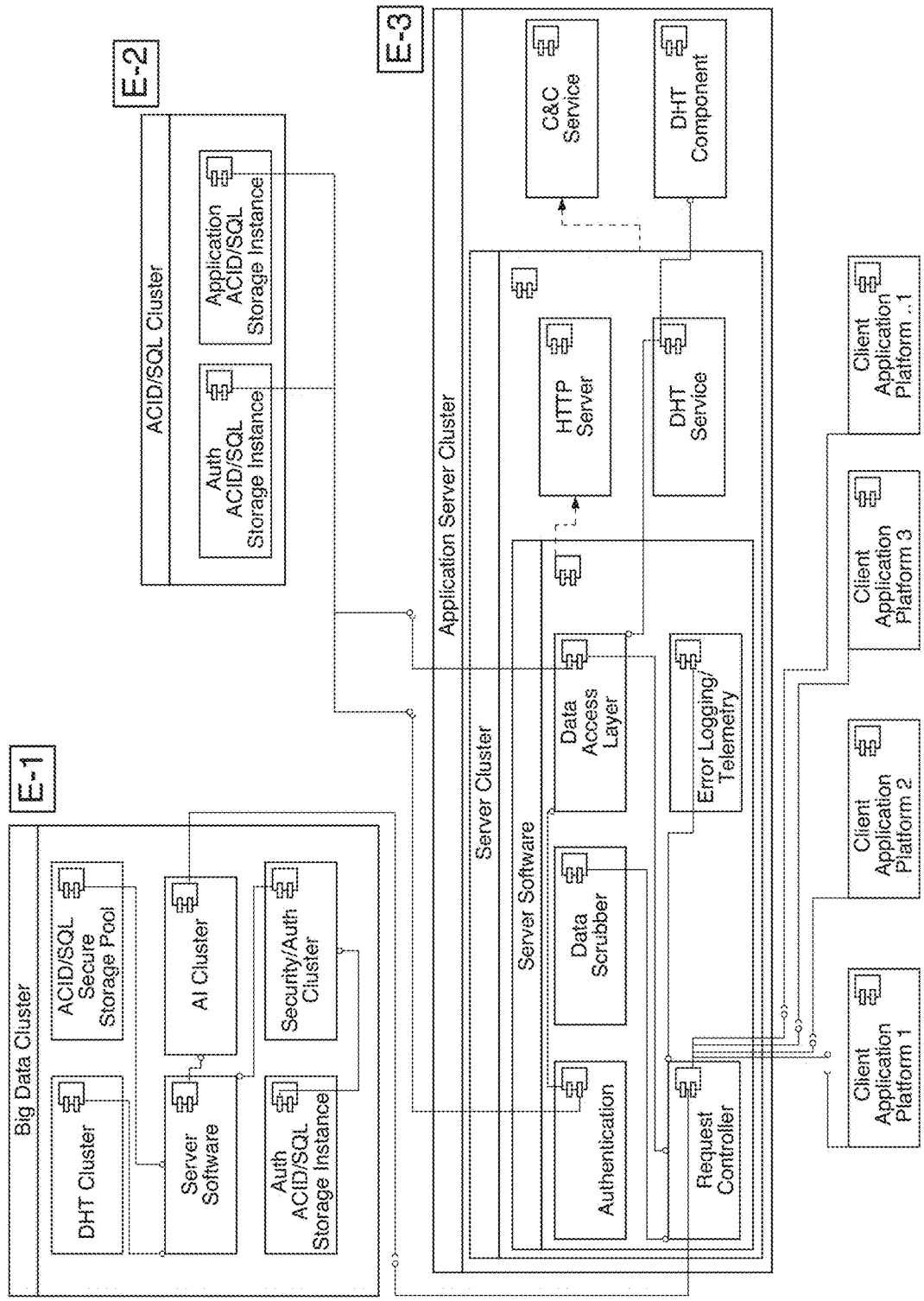
Figure 7A:
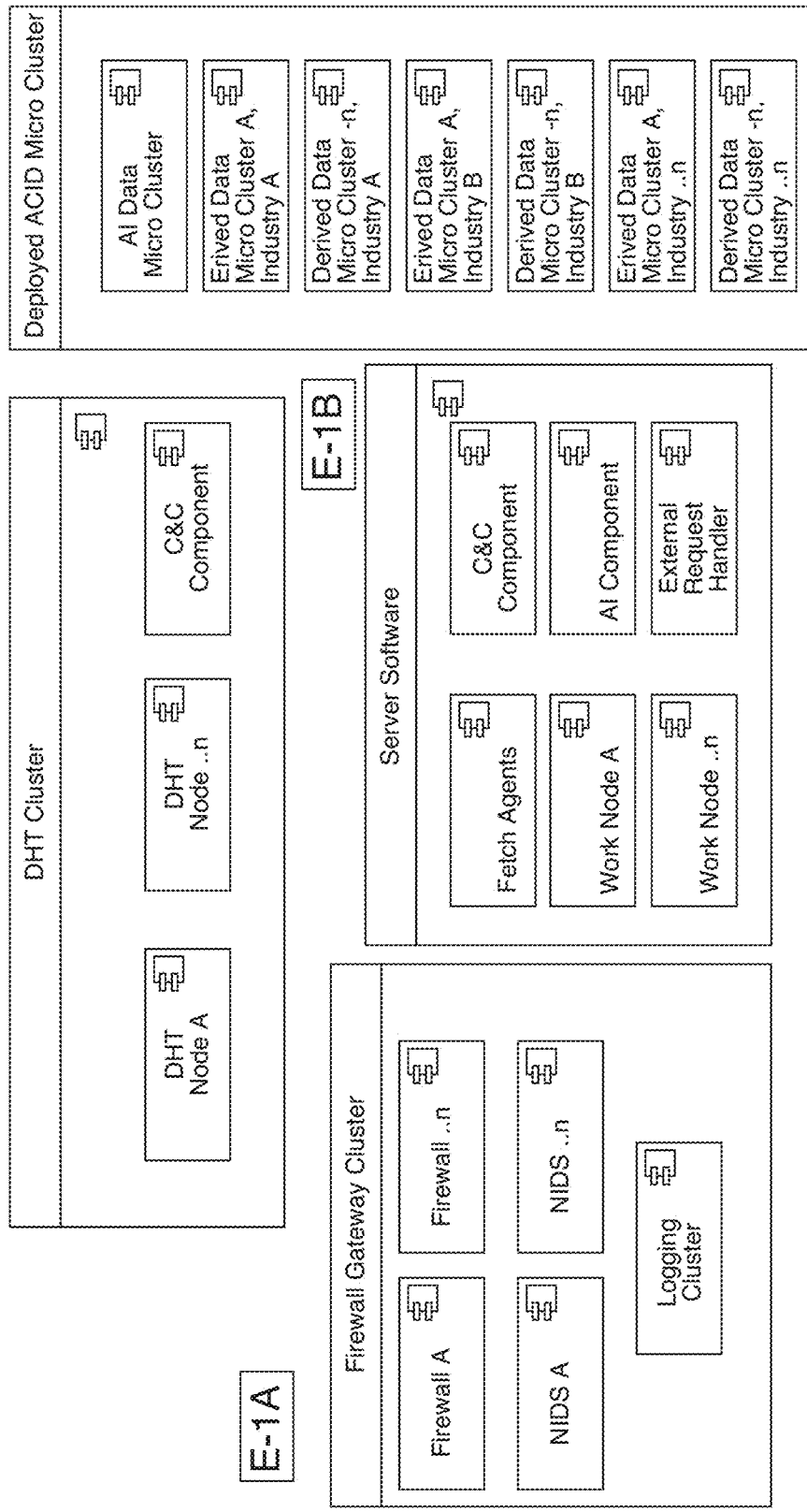
Figure 7B:
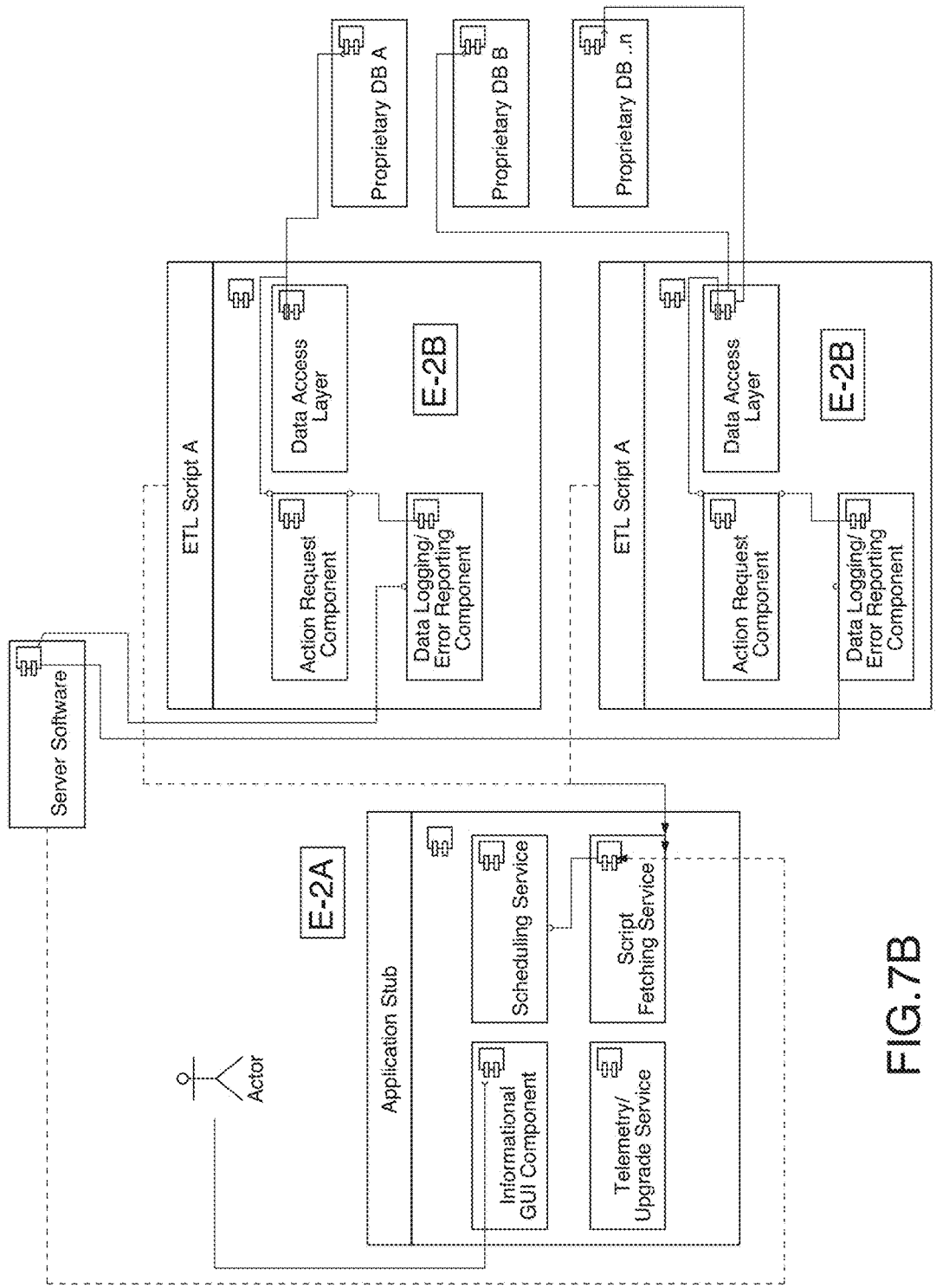
Figure 7C:
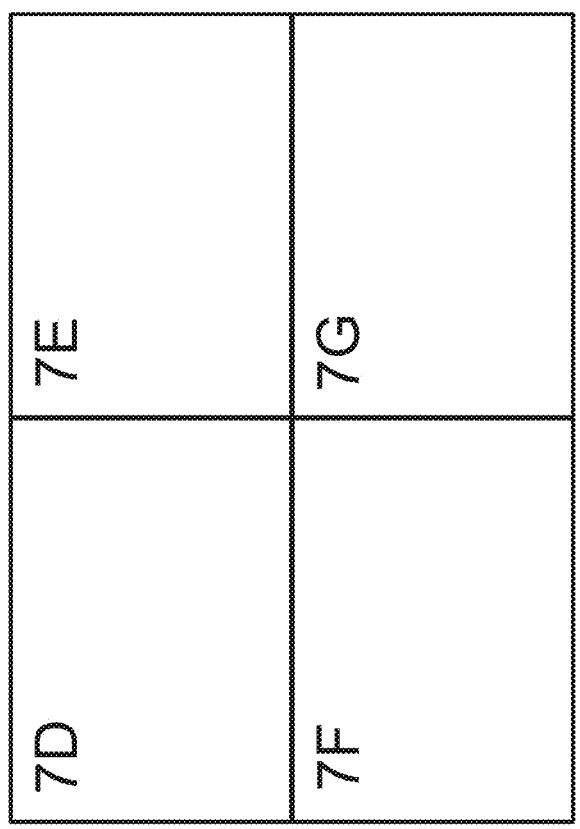
Figure 7D:
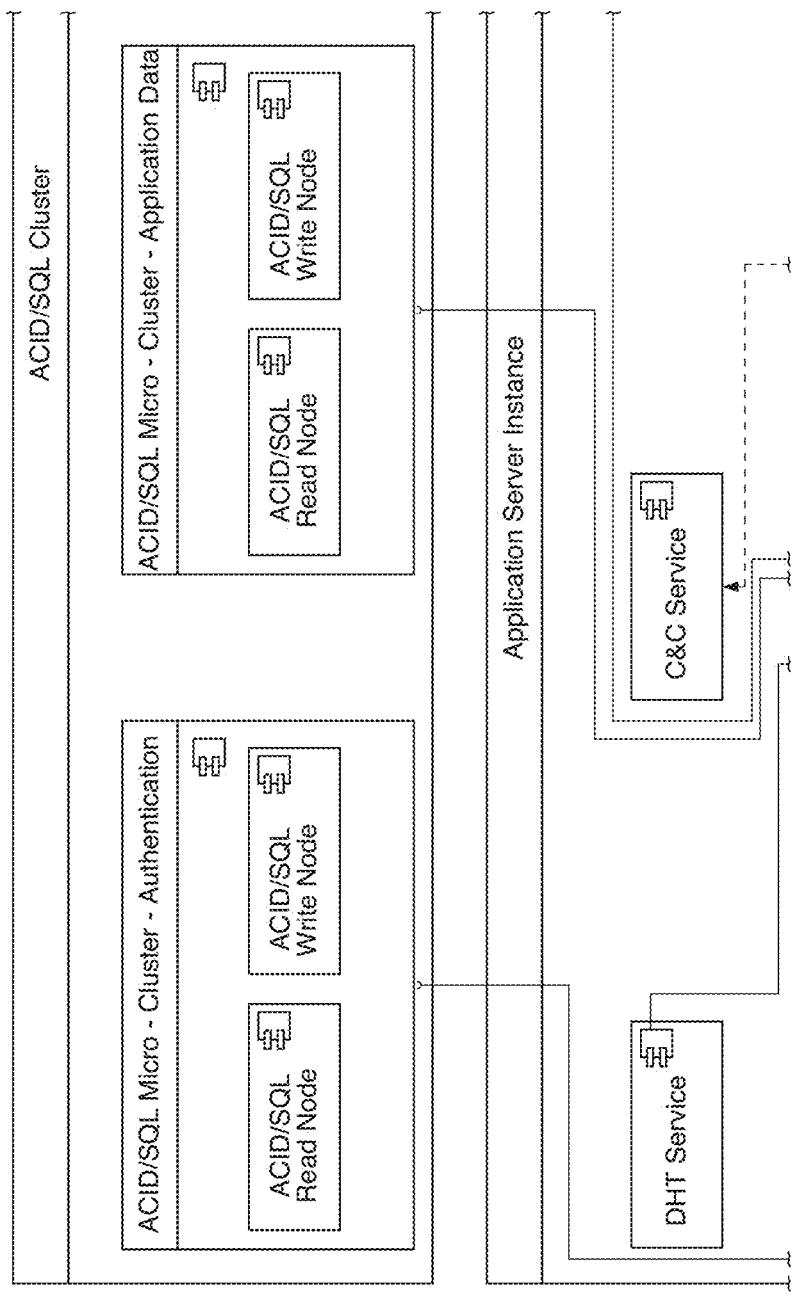
Figure 7F:
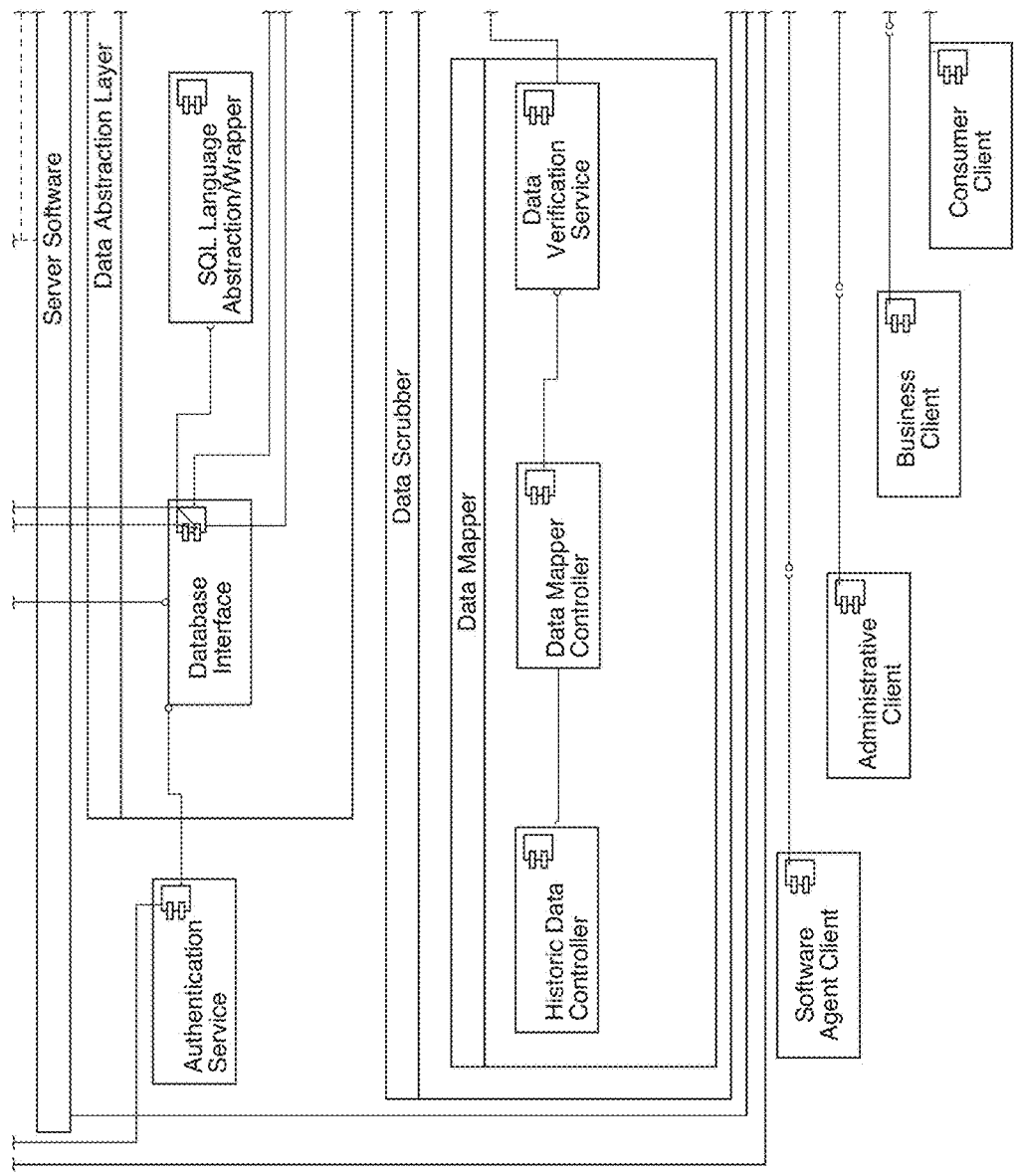
Figure 7G:
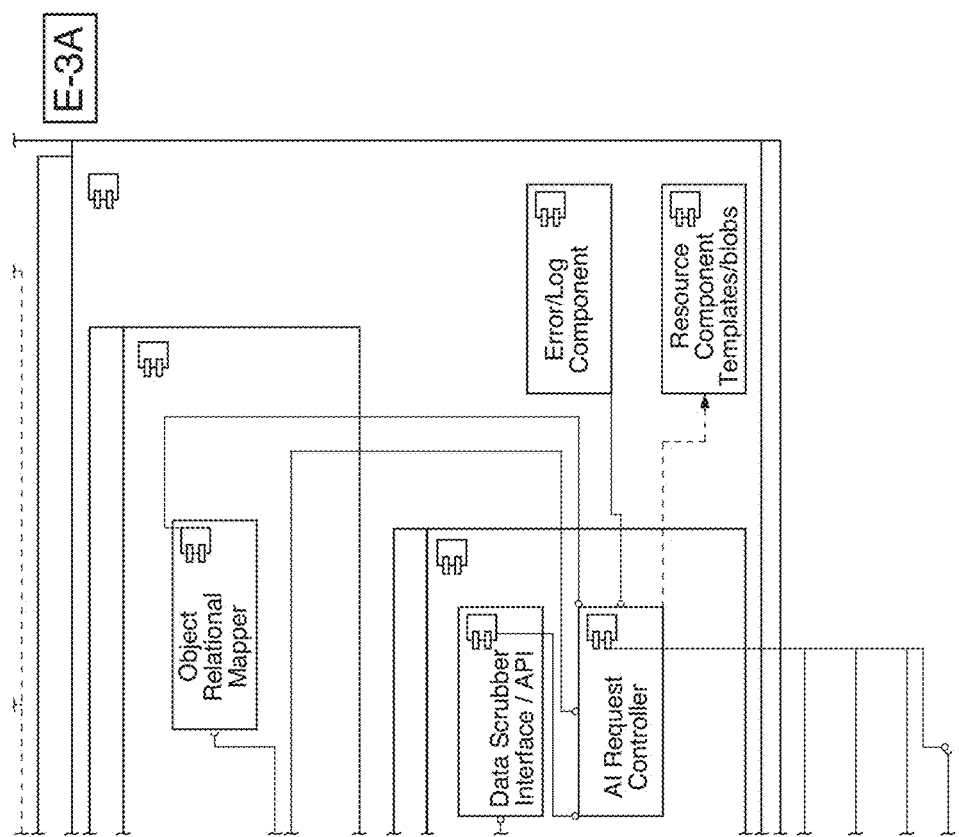

The ACID/SQL Cluster (E-2, FIGS. 7b, 7i, 7j, and 7k) holds the main business data. FIG. 7b shows how the software system is split up into components and shows the dependencies among these components. The client ETL (electronic transfer link) component of the invention is made up of several clusters that obtain data from client sites and other systems. This may allow the invention to access exiting client System, organize the data and produce relevant Information through the graphical user interface (GUI). The Application Stub (E-2A) is installed on the client server and provides a GUI for users to access it. This is largely invisible to the clients. A telemetry services monitor the client actions (i.e. clicks, times using app) and also provides upgrades. A scheduling service initiates data collection through the Script Fetching Service (as managed by server Software in the cloud). The ETL Scripts (E-2B) prompts several ETL Scripts that obtain data from one or more proprietary database using the Action Request Component through the Data Access Layer. The Data Logging/Error Reporting Component obtains the data and sends to the Serve Software in the Cloud.

The Application Server Cluster (E-3, FIGS. 7c, 7l, and 7m) contains the application server and software. Every client application for any platform communicates with the request control that forwards messages to data scrubber to clean data, perform sanity. The Application Server Cluster also may perform the following functions: checks to verify if data is reasonable; errors are logged and messages sent back if necessary; cleaned data is sent over to the data access layer that communicates with the ACID/SQL cluster through the authentication module in the server. The Applicant Server Cluster may also implement a HTTP server providing web access and DHT Service-component (for request processing performance). A C&C (Control and command) service may manage all the components communication within the system. The Application Server Cluster (E3) may be made up of one or more server clusters, and may be split up into components, including Server Software (E-3A); Application Server Instance (E-3B); and ACID/SQL Cluster (E-3C). The Server Software (E-3A) may communicate with various client agents (e.g. software, business, administrative, consumer, etc.). The requests and data may be checked and cleaned through a data scrubber that organizes it through a data mapper. The data is abstracted In the Data Abstraction Layer so that it may be integrated with historical data in the cloud. The Application Server Instance (E-3B) may include server software that is encapsulated in an instance. There may be one or more instances for different regions, industries, businesses and users). This may provide for an instance of any number of servers with the same basic architecture but running independently in order to improve speed and performance. The application server instances may store and obtain Data from the ACID compliant SQL Servers (E-3C) that also have their internal (server-to-server) authentication.

Figure 8A:
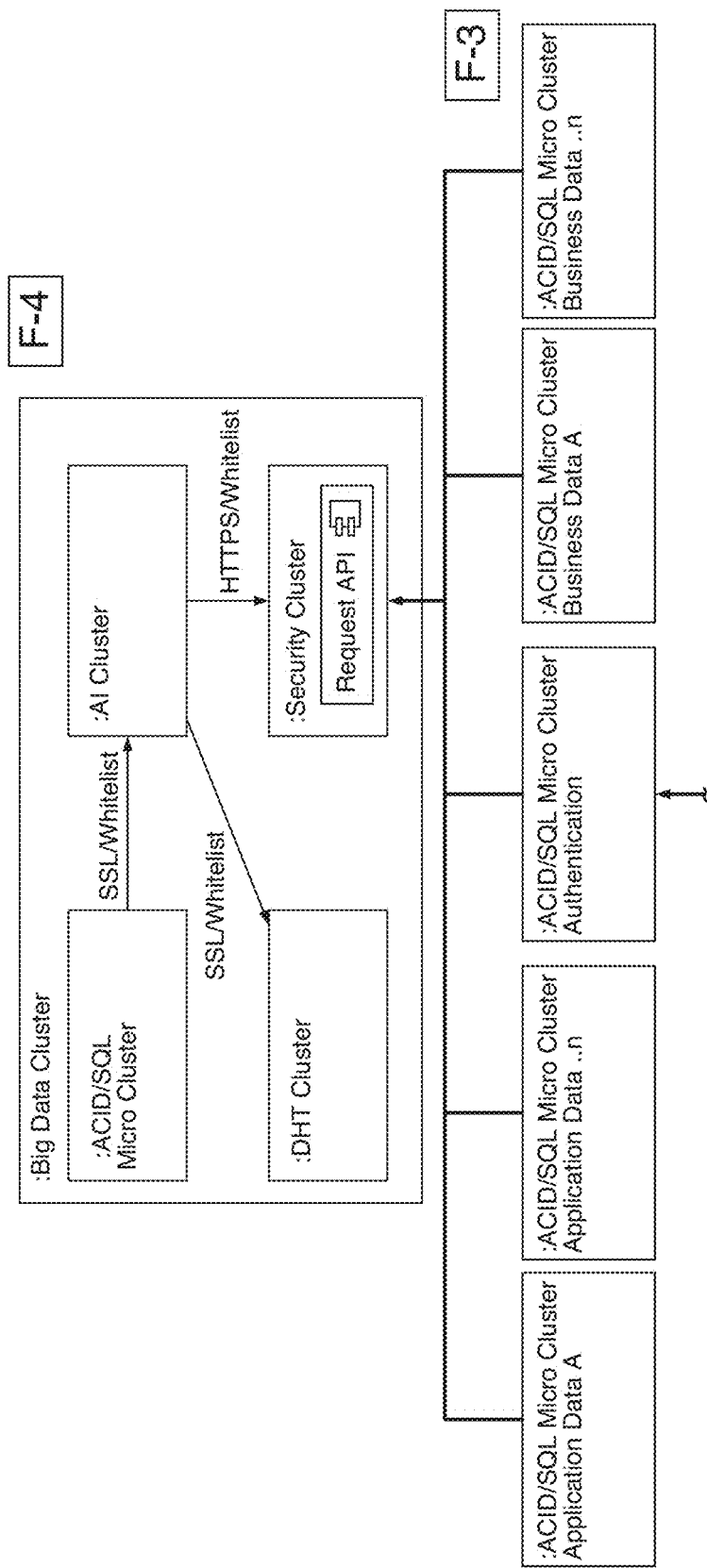
Figure 8B:
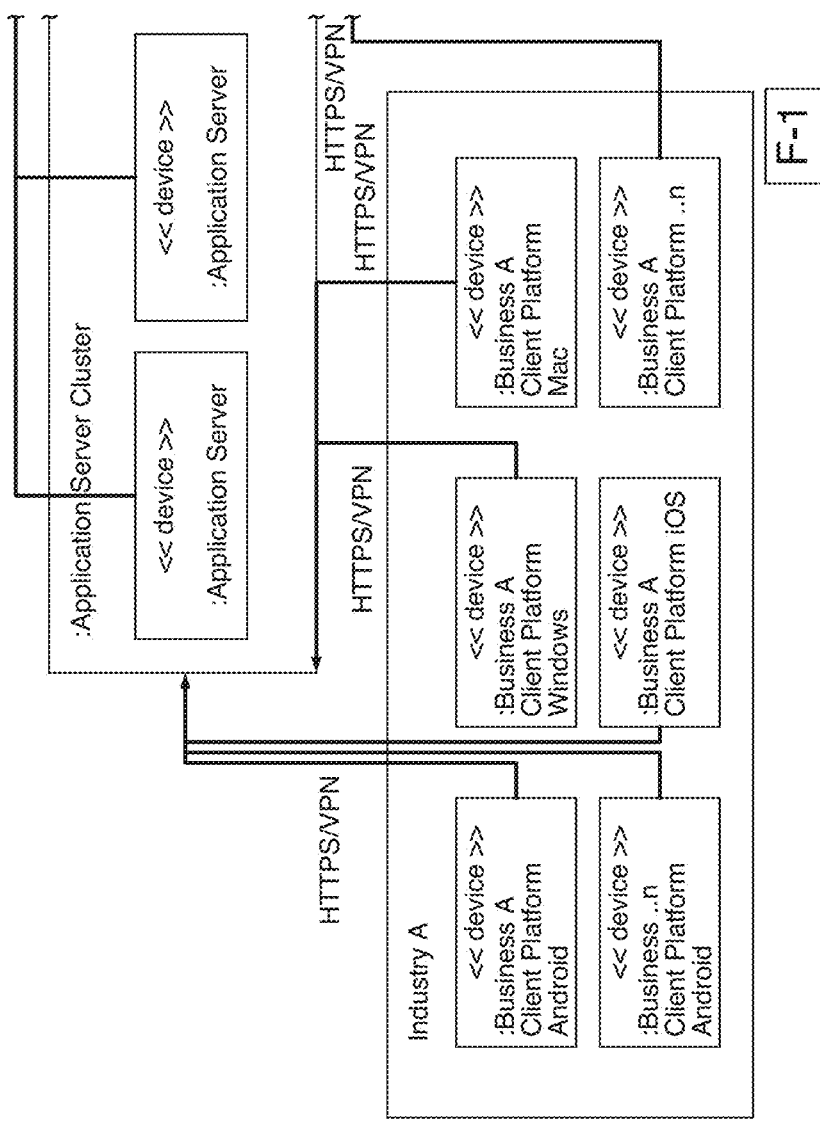
Figure 8C:
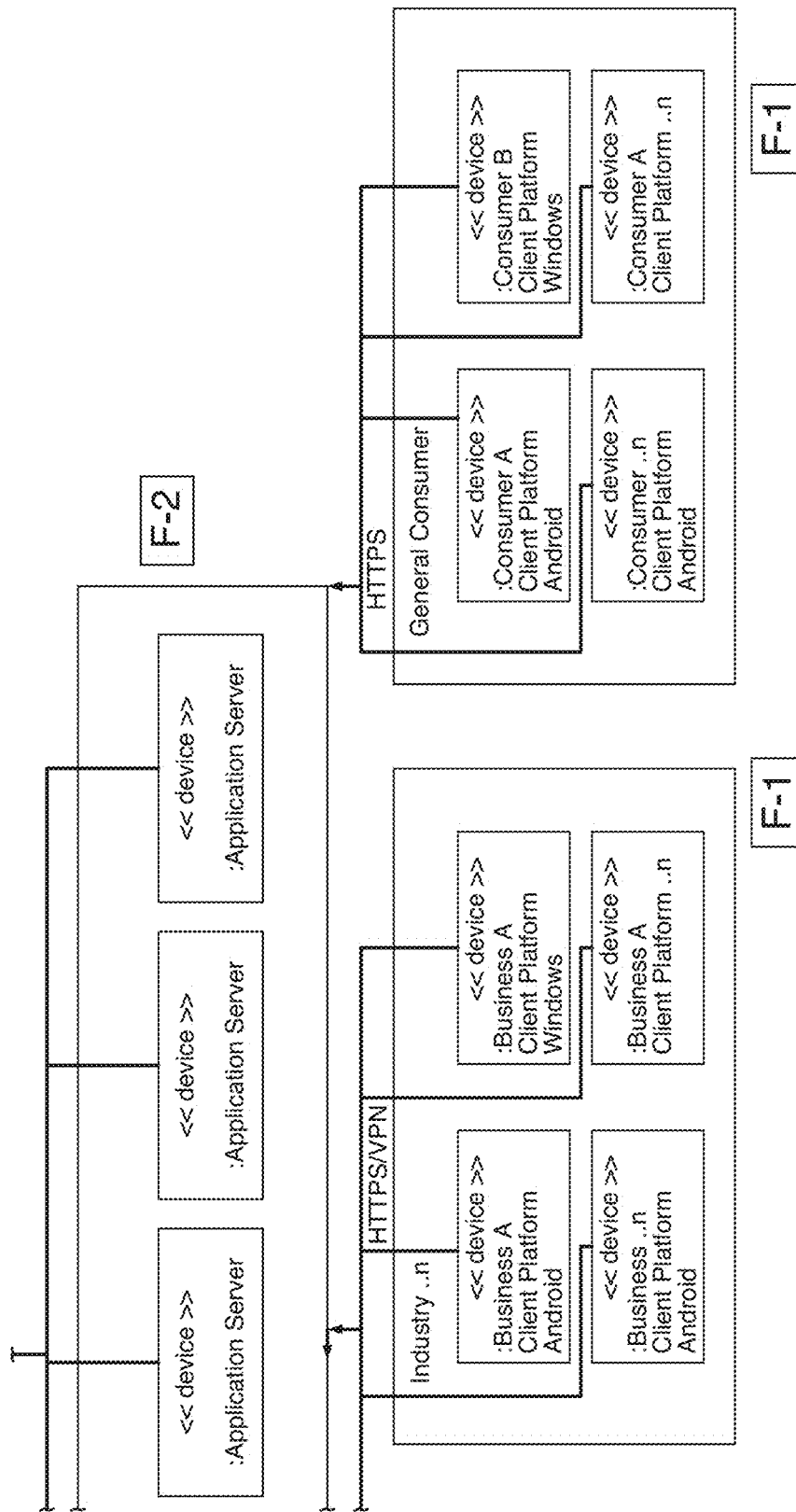
Figure 9:
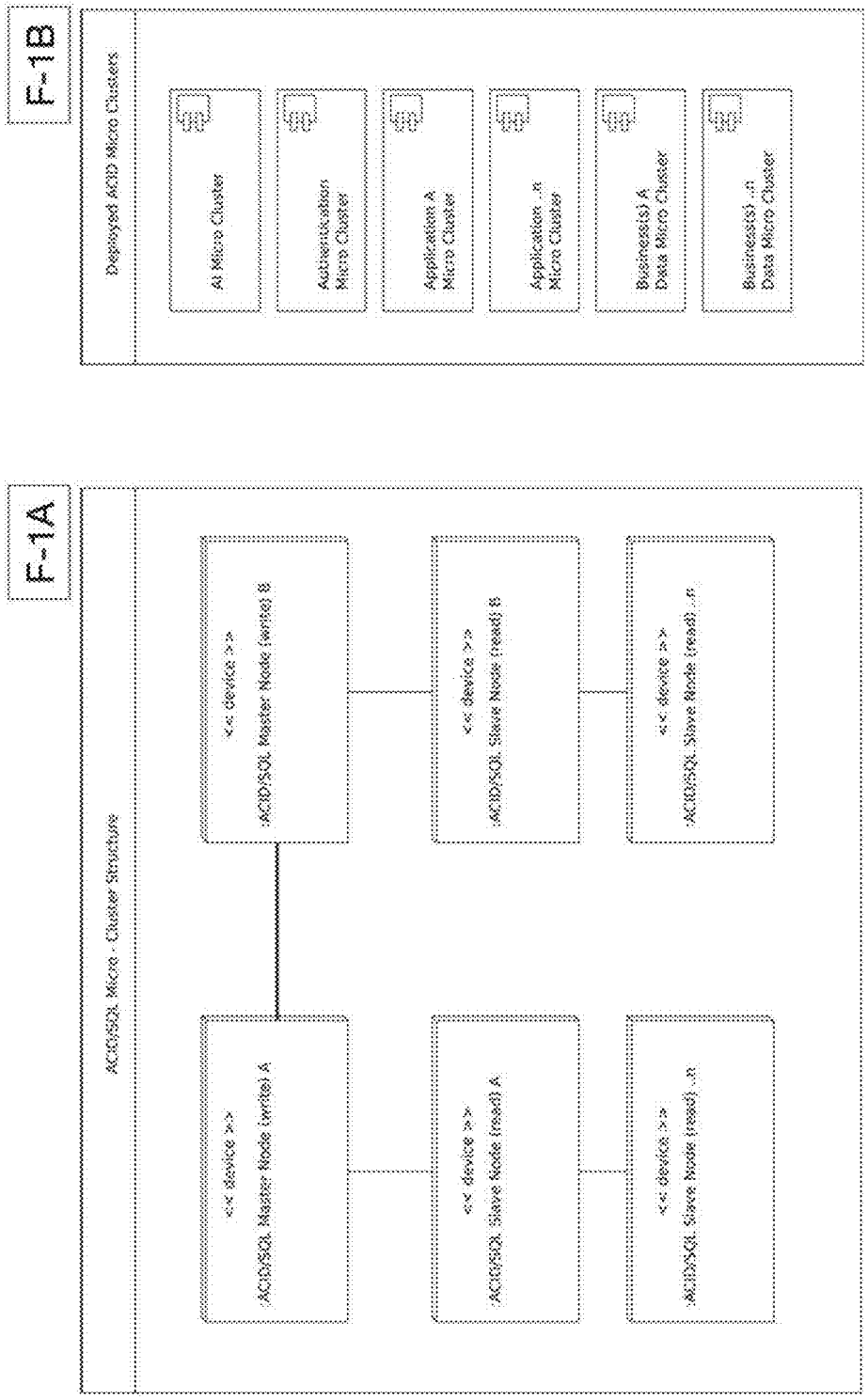
FIG. 9 illustrates another deployment diagram in accordance with an embodiment of the present invention.
Figure 10:
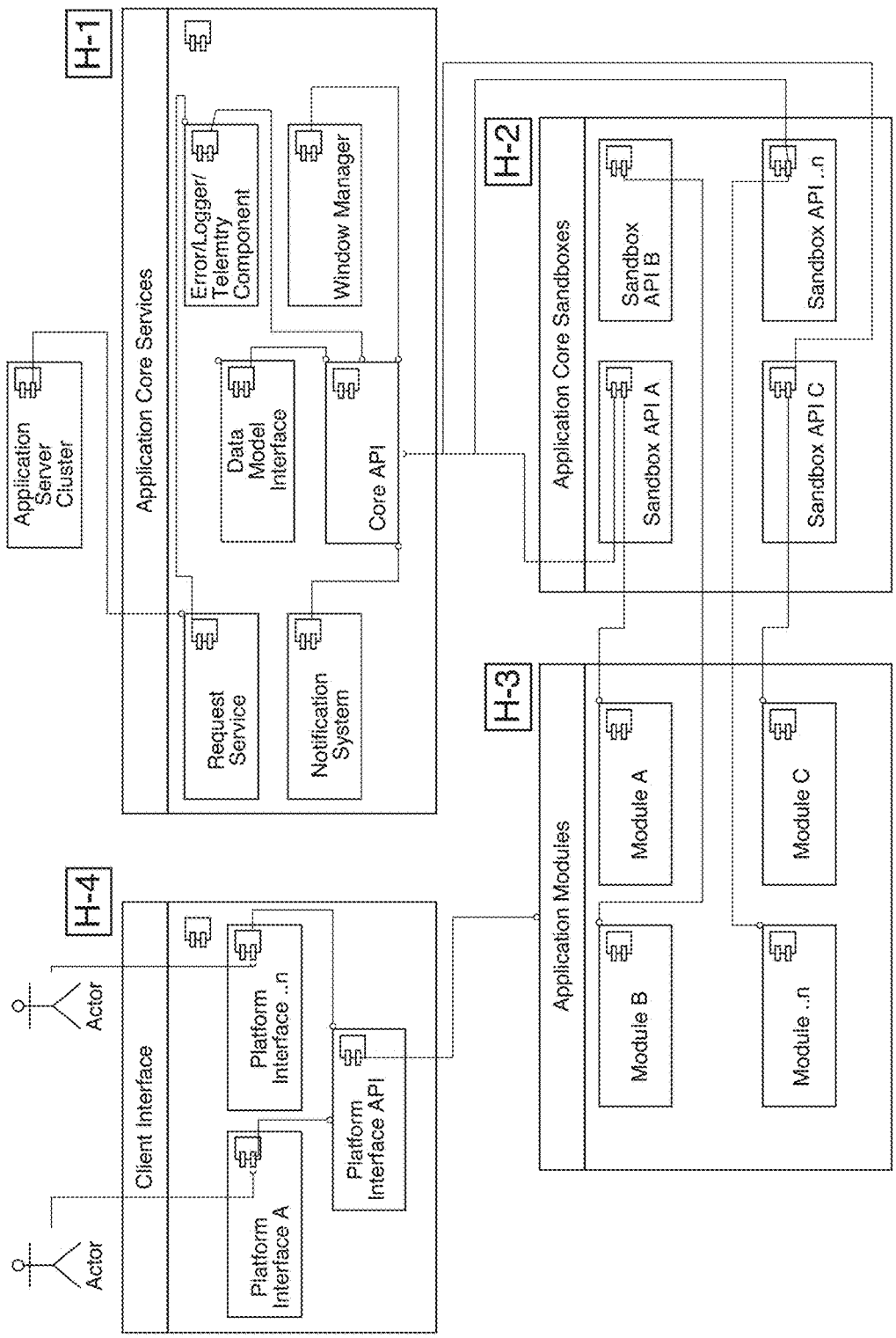
FIG. 10 illustrates a client application diagram showing an interaction of the system of the present invention with clients and application modules, in accordance with an embodiment of the present invention.

FIG. 8 shows the Deployment Diagram (F, FIGS. 8, 8A, 8B, and 8C) which shows the hardware used in system implementations and the execution environments and artifacts deployed on the hardware. The deployment component outlines all the server Architecture for the invention is made up of several Clusters. Client Clusters (F-1, FIG. 9) may include data from various clients across industries gathered on any device with any number of client platforms for different operating systems on the device. Application Server Cluster (F-2) may be a cloud server instance with which the client(s) communicate(s). There may be several instances for different regions, industries, businesses and users, thereby allowing the server cluster to effectively behave as any number of servers with the same basic architecture but running independently to improve speed and performance. The application server instances store and obtain Data from the ACID compliant SQL Servers that contain the client data and any associated application data, thereby becoming ACID/SQL MicroClusters (F-3). The entire compilation of business data gets Copied, sifted and combined to form a giant repository termed Big Data cluster (F-4) as described In Figure E-1. FIG. 9 shows a Deployment ACID Cluster (F-1) and describes the hardware used in system implementations and the execution environments and artifacts deployed on the hardware. The deployment component outlines the SQL data Storage architecture for the invention. F-1A in FIG. 9 shows the ACID/SQL Micro-Cluster Structure. Permanent data may be stored in ACID compliant SQL Databases. There are master nodes to write data. This is data generally supplied by the clients But may come from other locations. The slave nodes read data in small segments for efficiency. These nodes are usually linked to small sets of data in the database. The deployed ACID micro clusters (F-1B) are the front line data that is accessed by the clients, the Applications and the AI processing unit.

The Client Application Diagram (H, FIG. 10) shows an interaction of the system with various clients and application modules. The Application Core Services (H-1) manages platform applications, takes requests, and has a notification System, a window manager, and error notification component. The data model interface and core API form the bulk of the application while the Window manager is important to change views as the client interacts with the invention. When the request for an application (6) is made, the Application core service generates an Application Core Sandbox (H-2) Library that contains all the tools necessary for that client using that particular application. This library of tools is specific to the user and reason why security, simplicity, performance is individually streamlined for the user. The user doesn't need to download or request library tools that are not needed or authorized to use. There are provided user specific tools used to generate the Application Modules (H-3) that the user will interact with. These are the applications for the client. The Client Interface (H-4) is the "face" of the invention that the user interacts with and is critical to performance as well.

The Activity Diagram (I, FIG. 11) outlines business and operational step-by-step workflows of components. Current business management systems (sometimes called ERP, SEMS, CRMs) promise comprehensive control of a client's business from all aspects including but not necessarily limited to inventory, purchasing, sales, finance, labour, product development, marketing, regulatory management, security; namely any aspect of the Business that requires information to be documented either electronically or on paper. In reality they require significant costs to purchase, maintain and provide IT Support. These systems utilize traditional architectures that require a solid understanding of the system in order to optimize its full potential. This is often difficult for the business to supply and requires outsourcing to the original Vendor of the system to provide IT support. In addition, businesses are required to employ system specialists to maintain daily operations of these complex systems.

The business management system of the present invention may only require minimal IT support and no experts to maintain daily operations. The invention is designed to be used with minimal understanding of technology and only requires knowledge of job duties. The invention adapts itself independently to the needs of the business, department and the user. This provides a personalized experience that is specific to the user and does not require vast knowledge of the system outside specific job duties. This may significantly reduce company overhead by not requiring employing and maintaining system experts and by a reduction in IT costs to a minimum. For example, IT savings may be upwards of 70% of traditional system costs while improving efficiency of the current workforce.

Figure 11A:
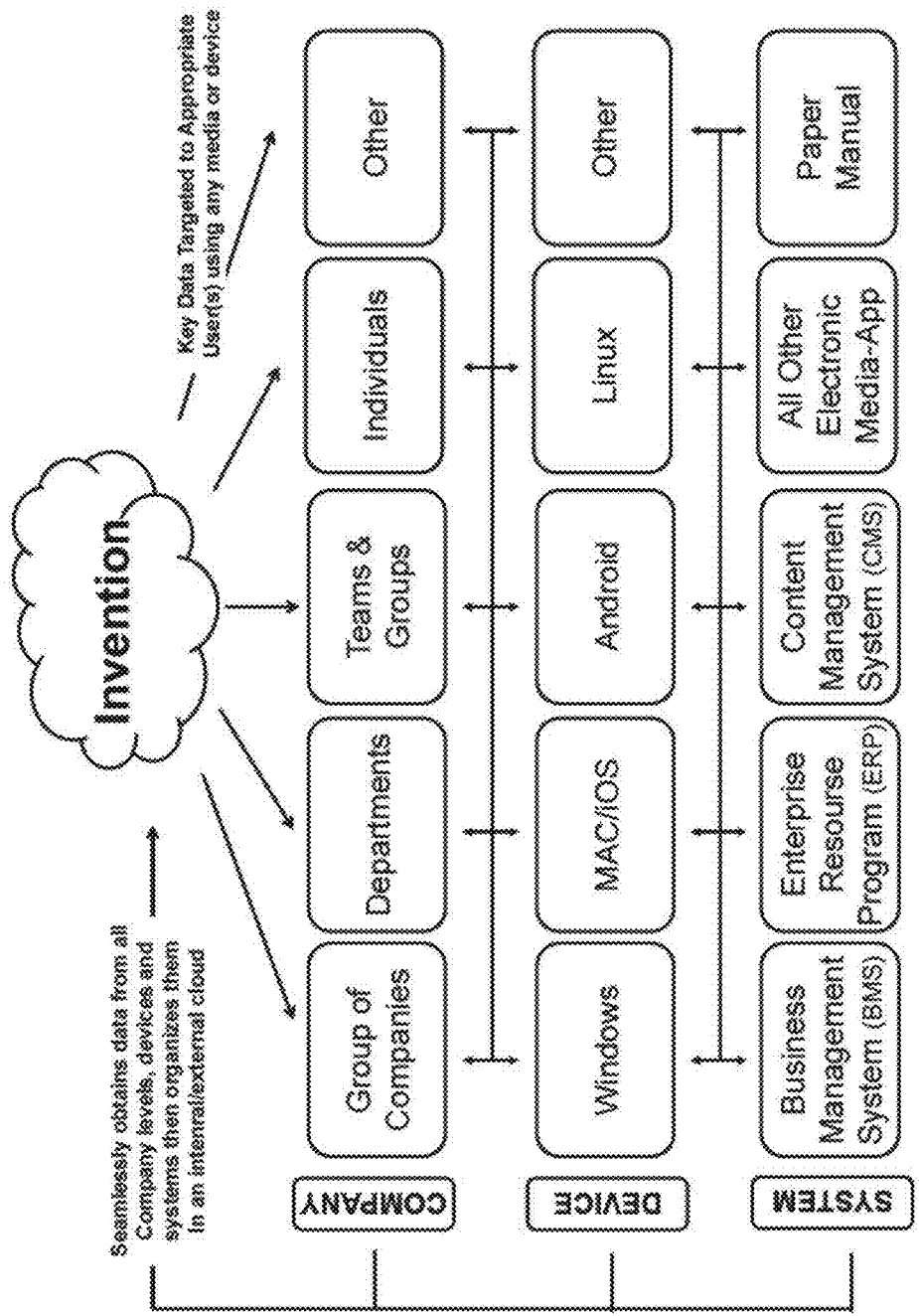

FIG. 11a shows a Business Model Integration Activity Diagram which outlines business and operational step-by-step workflows of components. The invention can obtain data from various data Storage and compiling systems located in different Parts of the organization using any number of devices and applications. Data is seamlessly obtained, organized and Analyzed in the cloud-based ecosystem. Users can continue to input data and receive Results from their original systems. The invention can run without any change to the performance and characteristics of the original system. Users can also access their data through the invention interface as well as enter data if desired. In addition, the invention may replace any original System in the enterprise or provide a system where none exists or where a paper system exists. Thus fragmented business data and information may be accessed, analyzed and used throughout the organization given proper authorization. This may increase the efficiency of an organization while maximizing on the value of the data collected. Team collaboration is improved allowing users to work together in global and local environment without the need to work on similar systems nor the need to work in proximity or in the same language. Security is enhanced as sensitive information will no longer be found on paper documents or in data files stored on a user's computer. Users need to access original systems or the new Invention (an ecosystem) to perform work.

FIG. 11b shows a Business Model Integration Activity Diagram which outlines business and operational step-by-step workflows of components. The present invention may obtain data from various data storage and compiling systems located in different parts of the organization using any number of devices and applications. Data is collected from different business processes. The data may be inputted into the original electronic system or directly into the system of the present invention (if paper was used). In this manner, all of the business processes are captured electronically. This data may be centralized in a repository that essentially scrubs the data, cleaning it from any aberrations (e.g. the invention performs a sanity check on every variable based on industry standards). For example an hourly wage cannot surpass a certain amount for a certain role (e.g. the "sanity" amount is typically magnitudes larger than the max). Data is then merged with other fragmented data using an industry specific algorithm that indexes multiple entries and finds links between indices. A neural Network AI-based algorithm is used to link the threads of data based on key words and phrases derived from business process and Industry specific knowledge. For Example, data from a regulatory clearance of a product may be combined with manufacturing and marketing data based on its USAN name that is specific to the product. This is cross-referenced with dates and times to form a "timeline" of the data improving relevancy to current product status. While this is difficult to perform for one system across an entire business, it is significantly more complex when handled across different systems, devices and business segments.

As noted above, in some embodiments, platform (14) includes a CBDSS with an AI-based database. The AI-based database is implemented in association with a plurality of AI nodes, in manners detailed below.

Figure 11C:
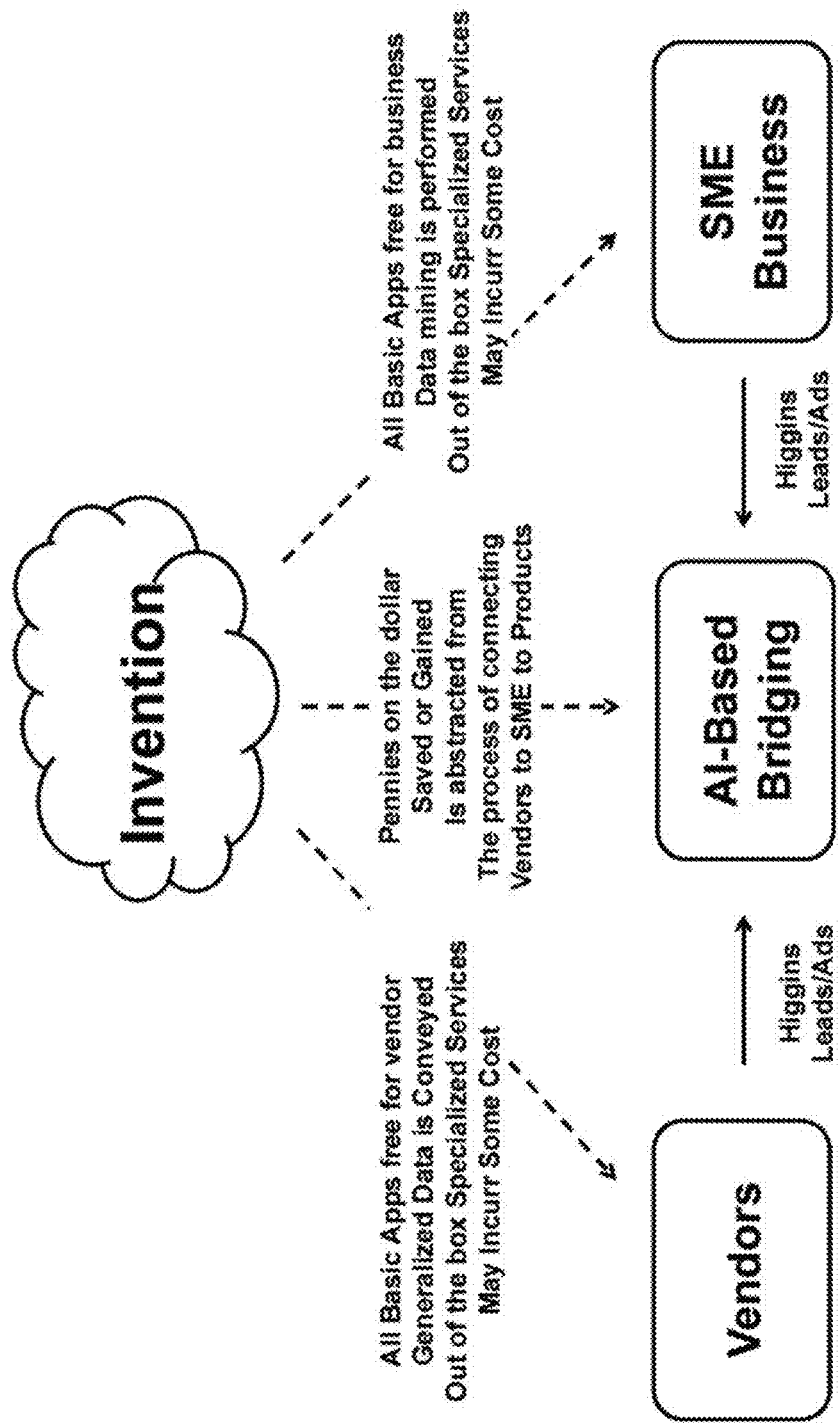
Figure 11D:
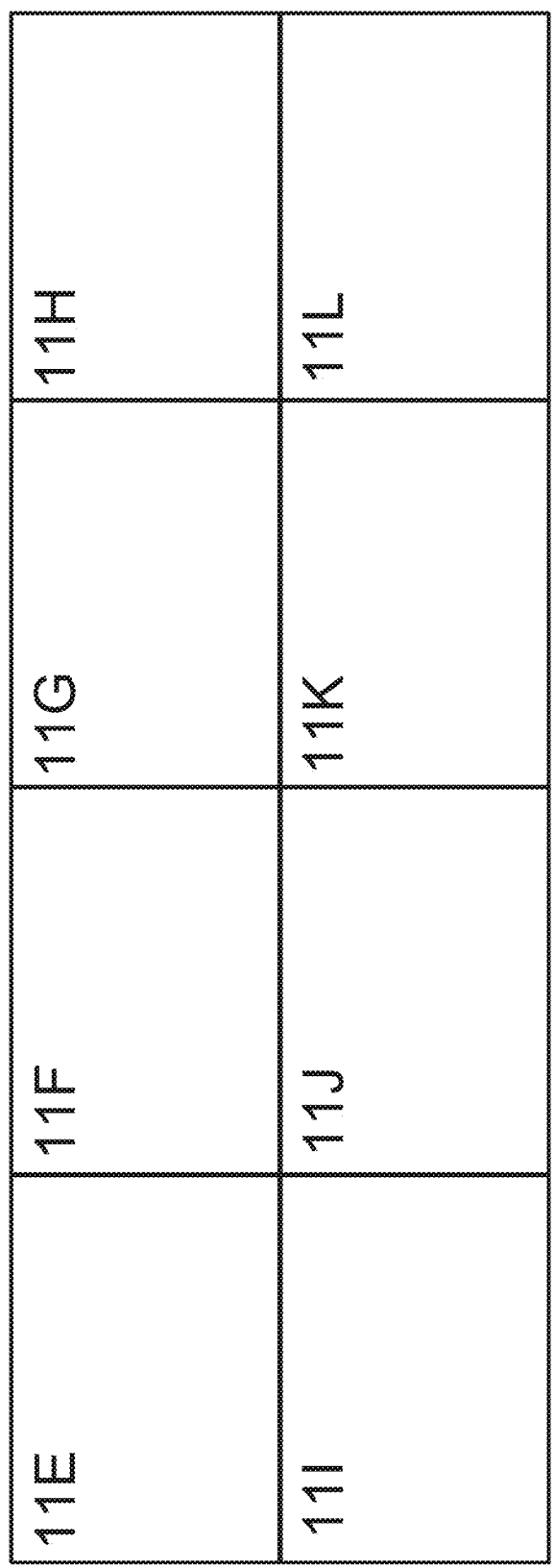
Figure 11F:
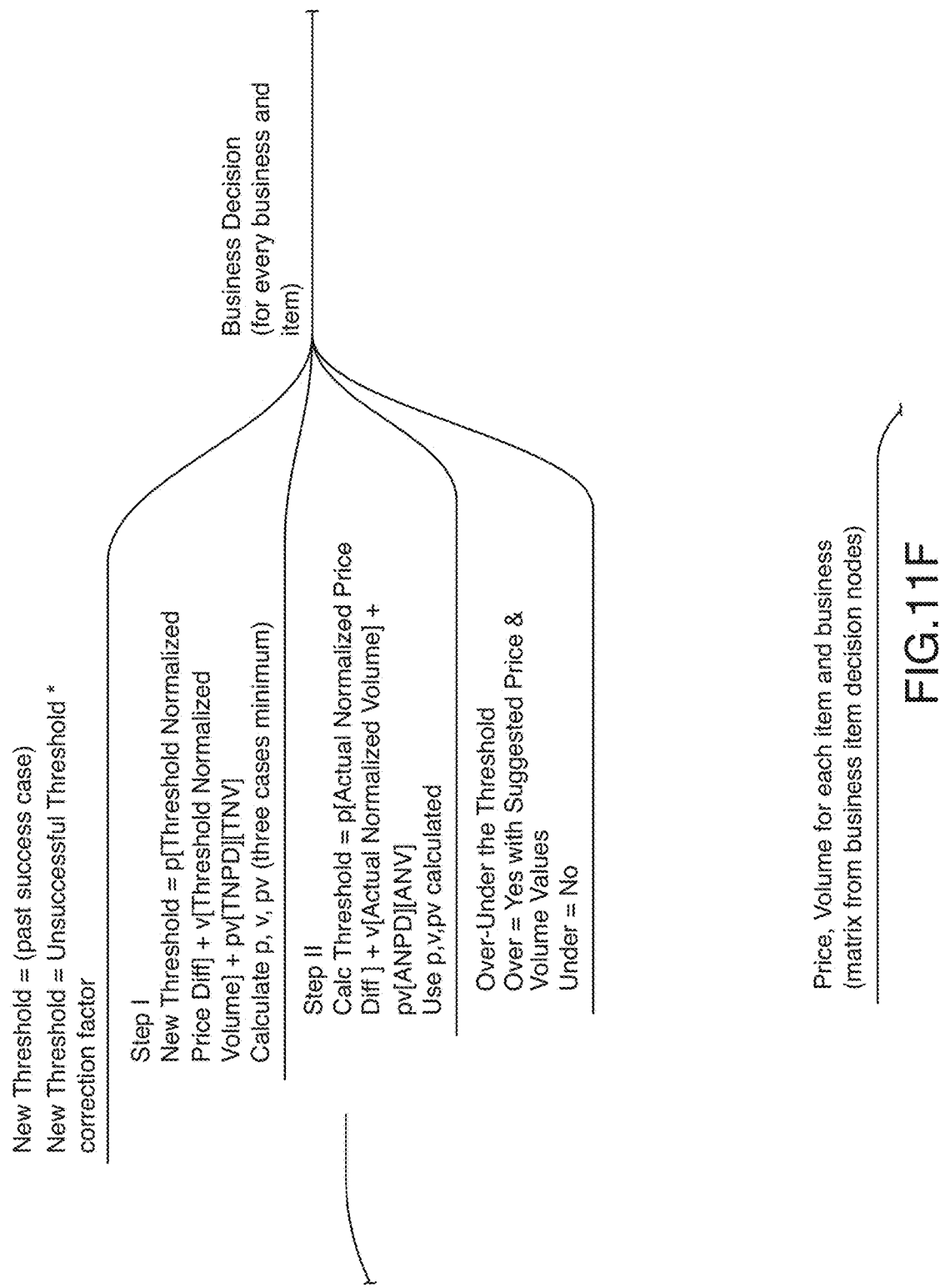
Figure 11G:
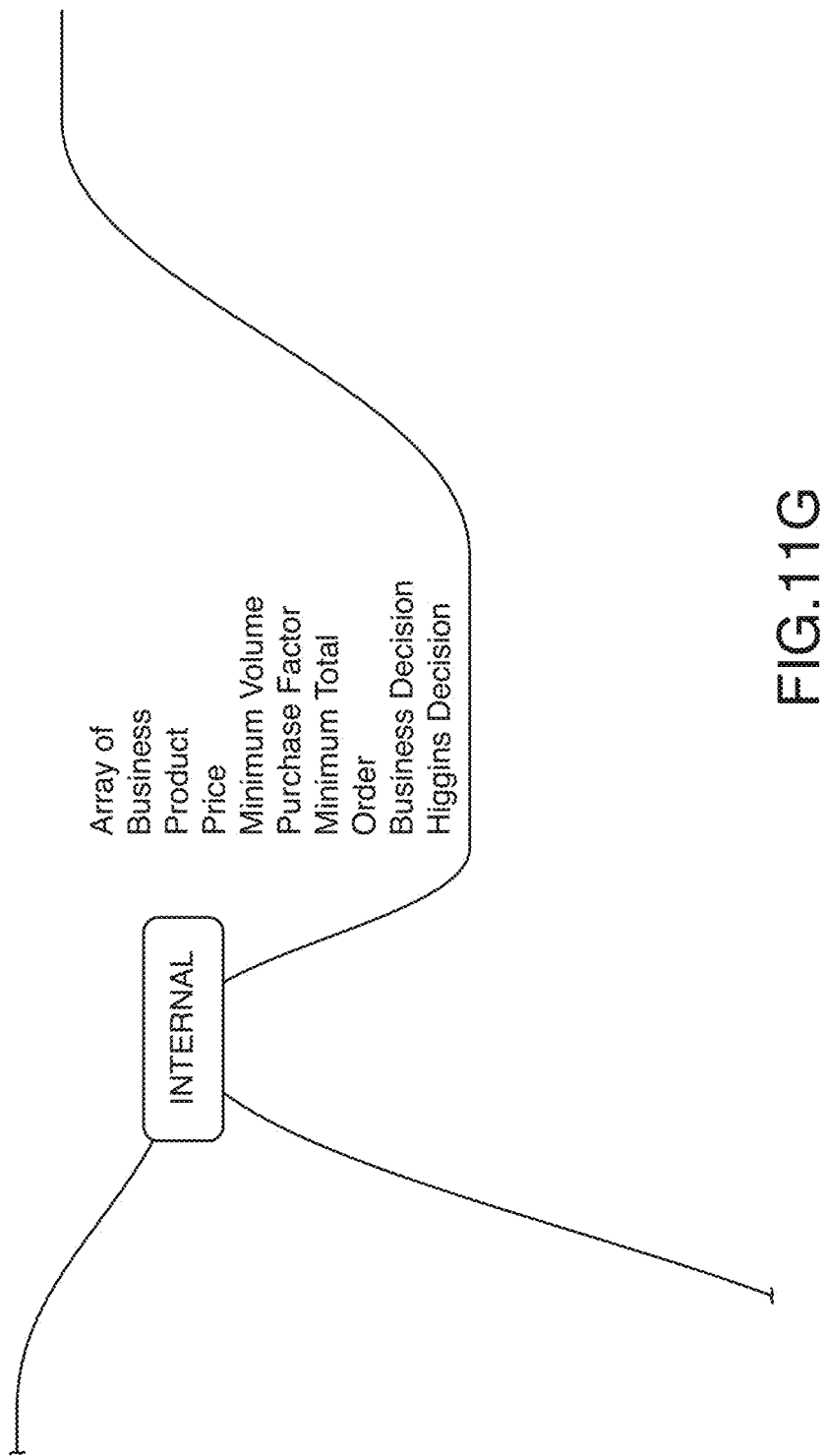
Figure 11H:
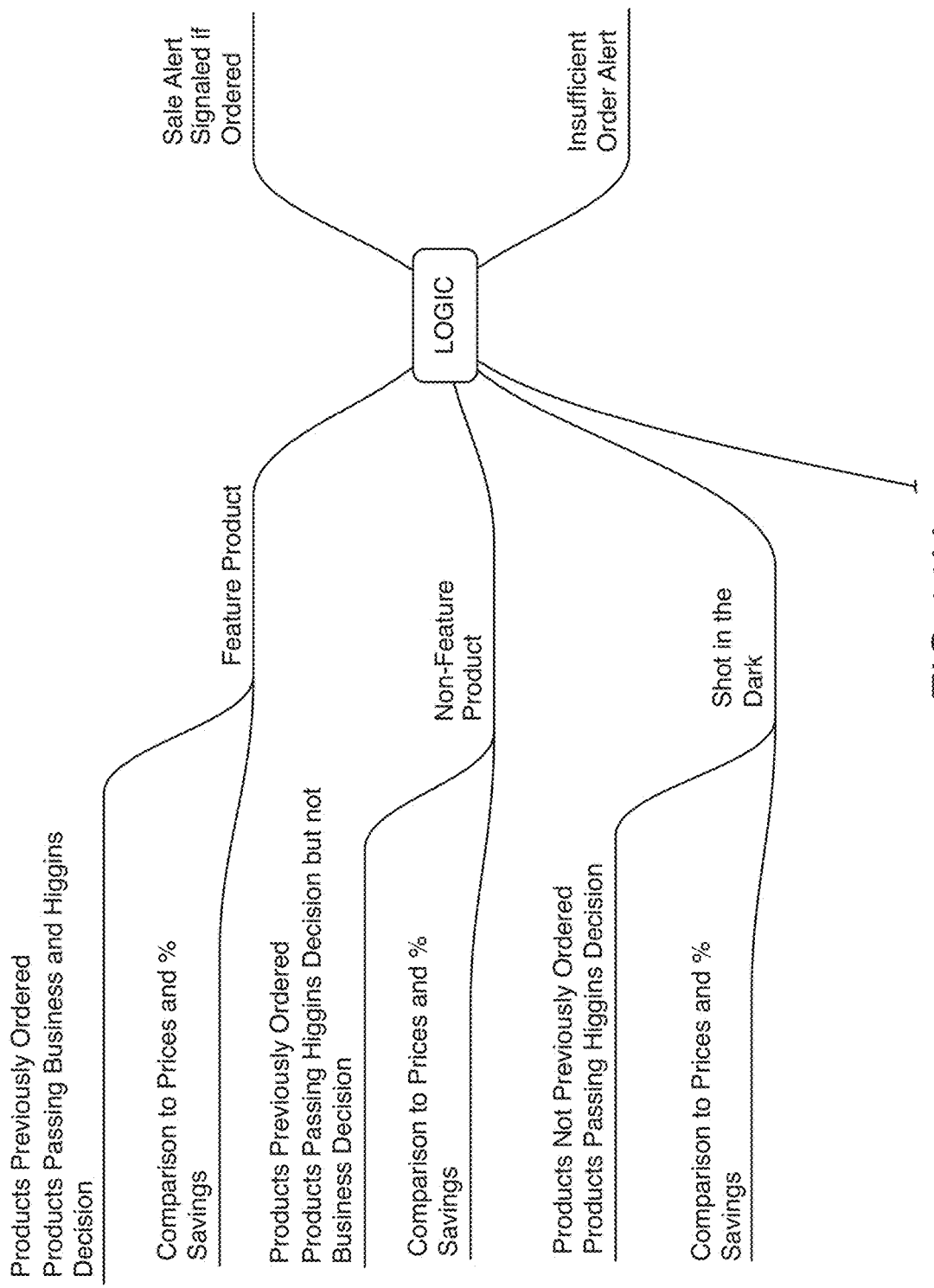
Figure 11J:
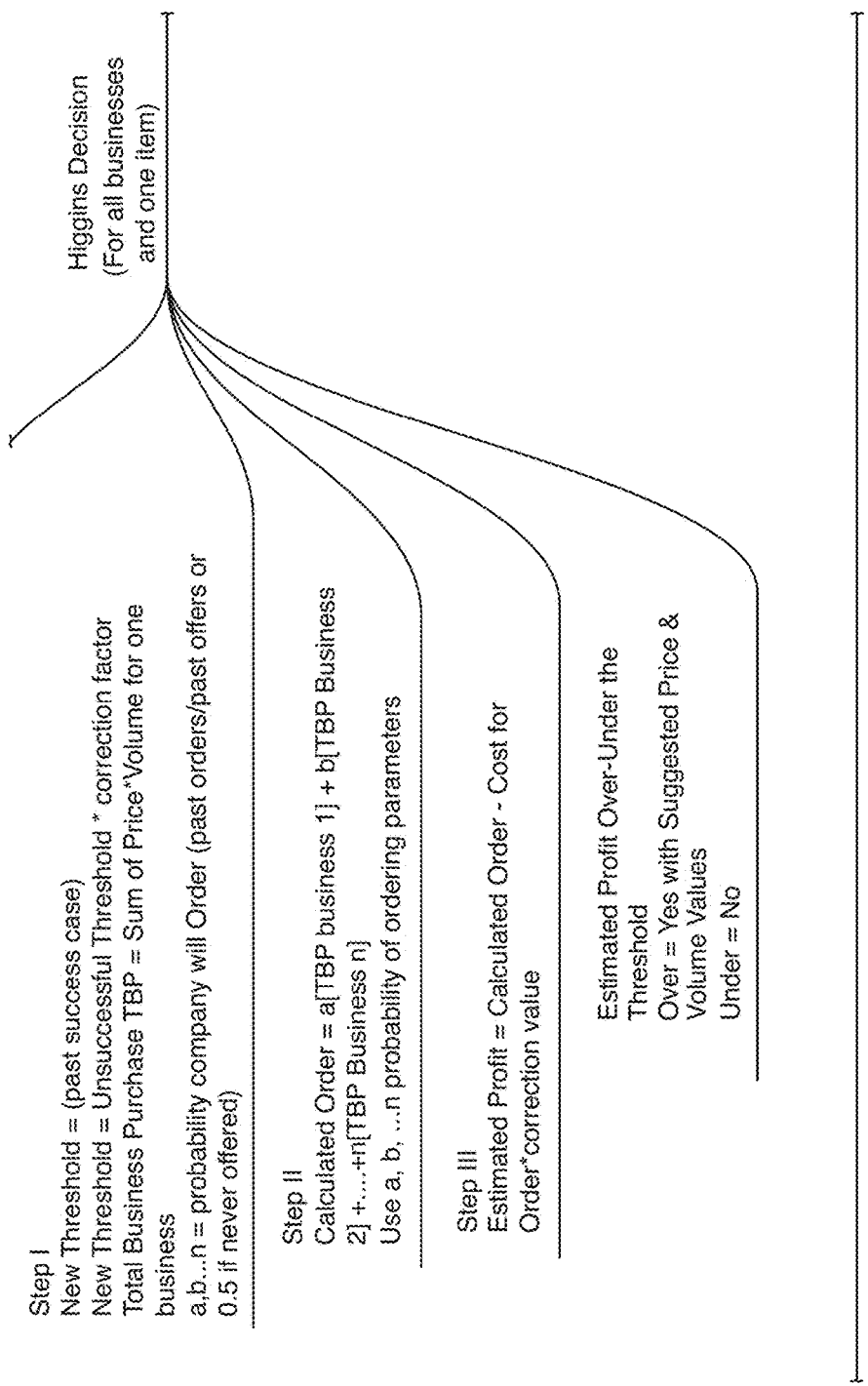
Figure 11M:
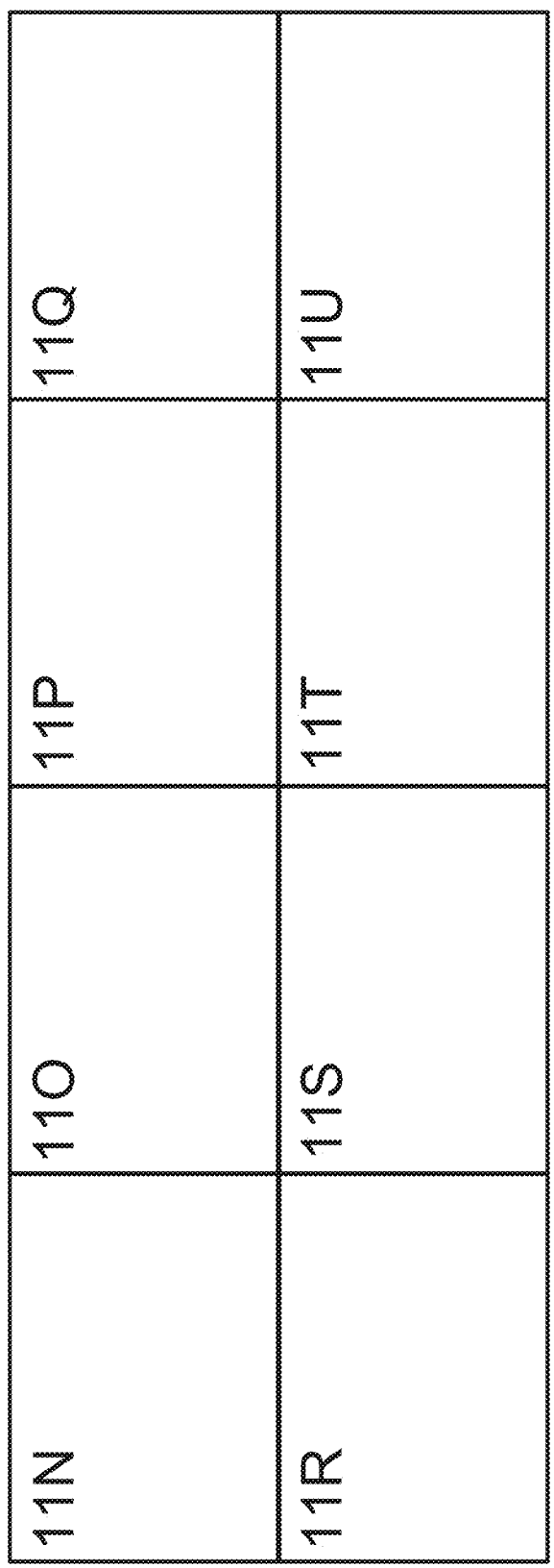
Figure 11O:
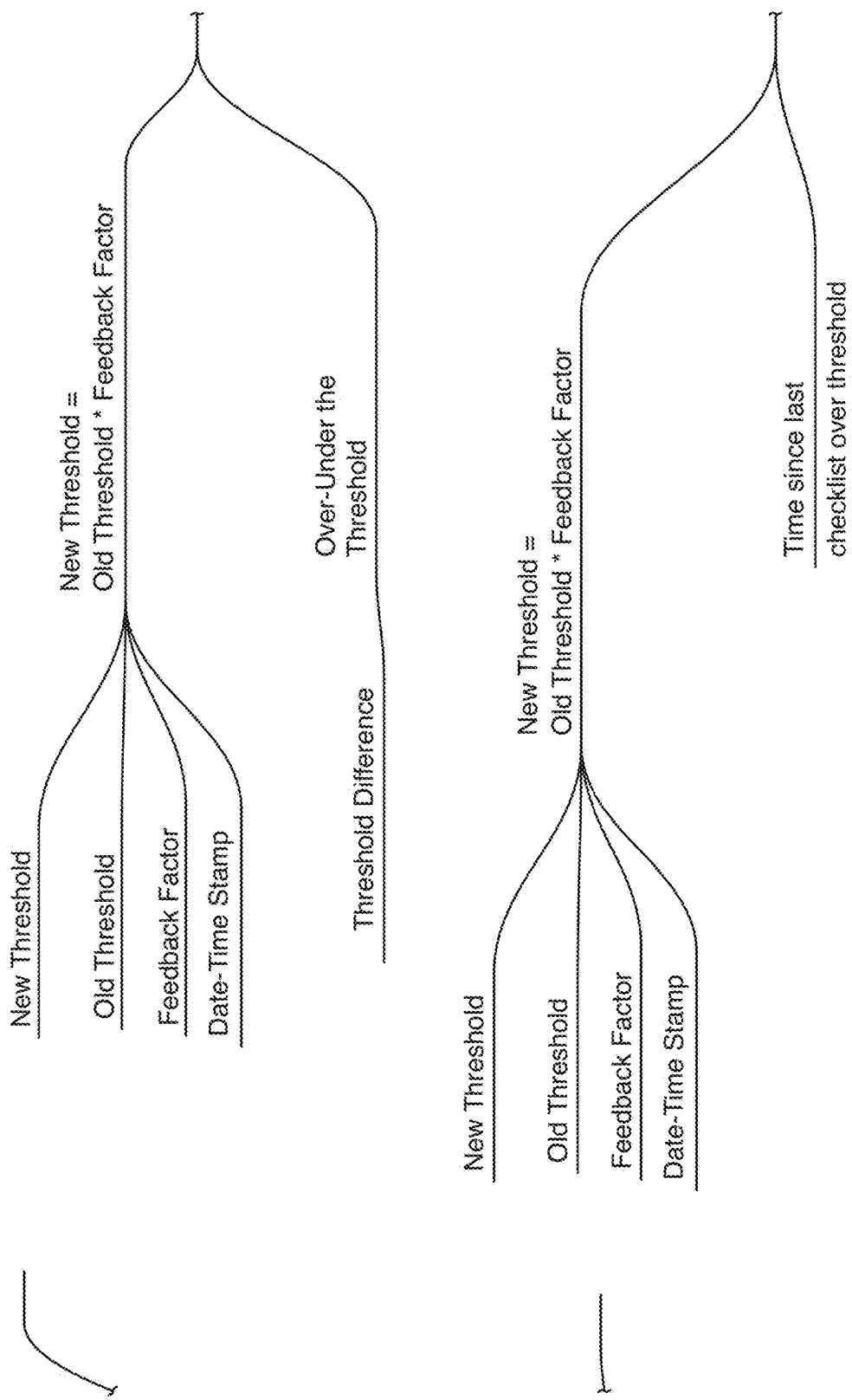
Figure 11P:
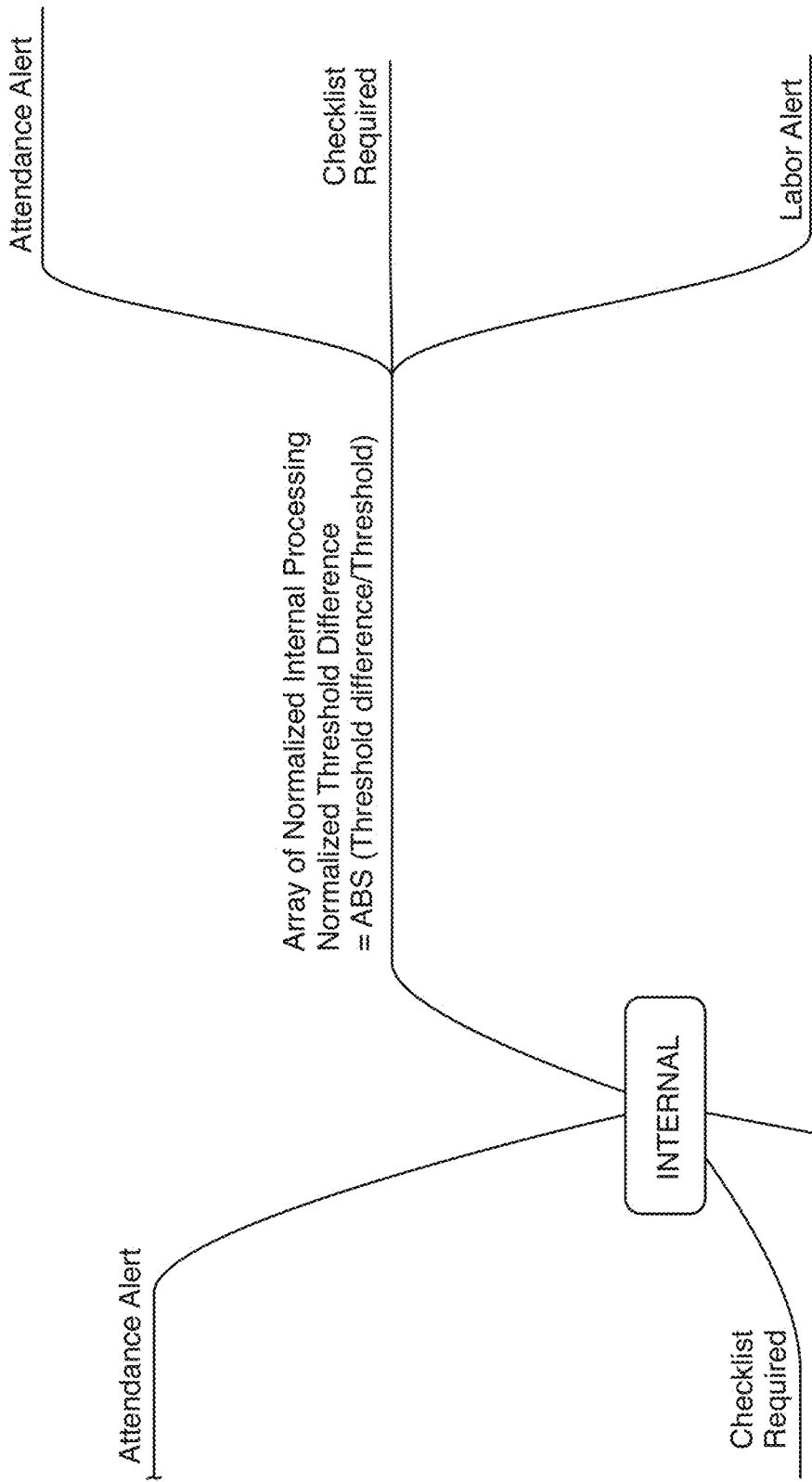
Figure 11Q:
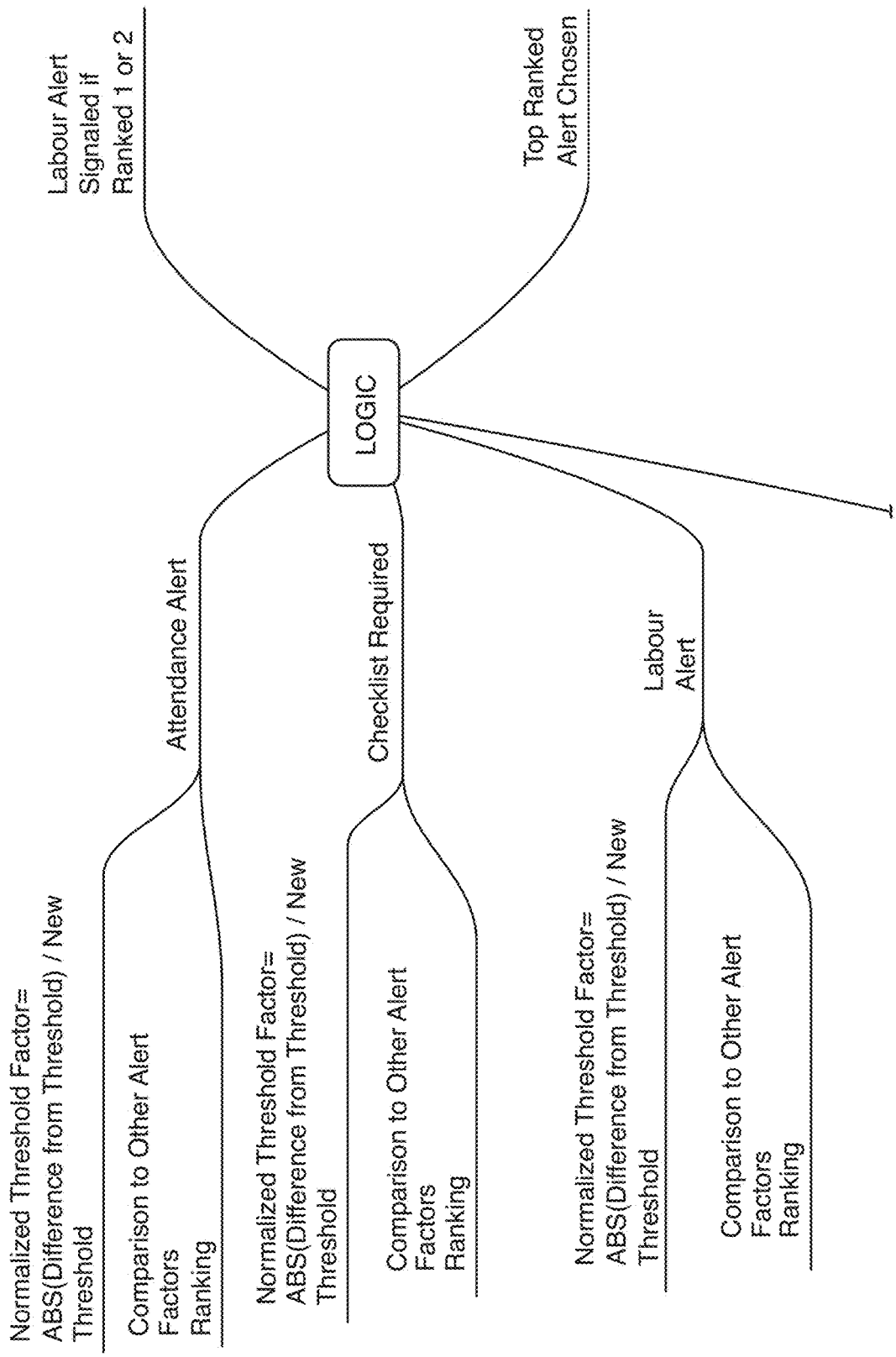
Figure 11R:
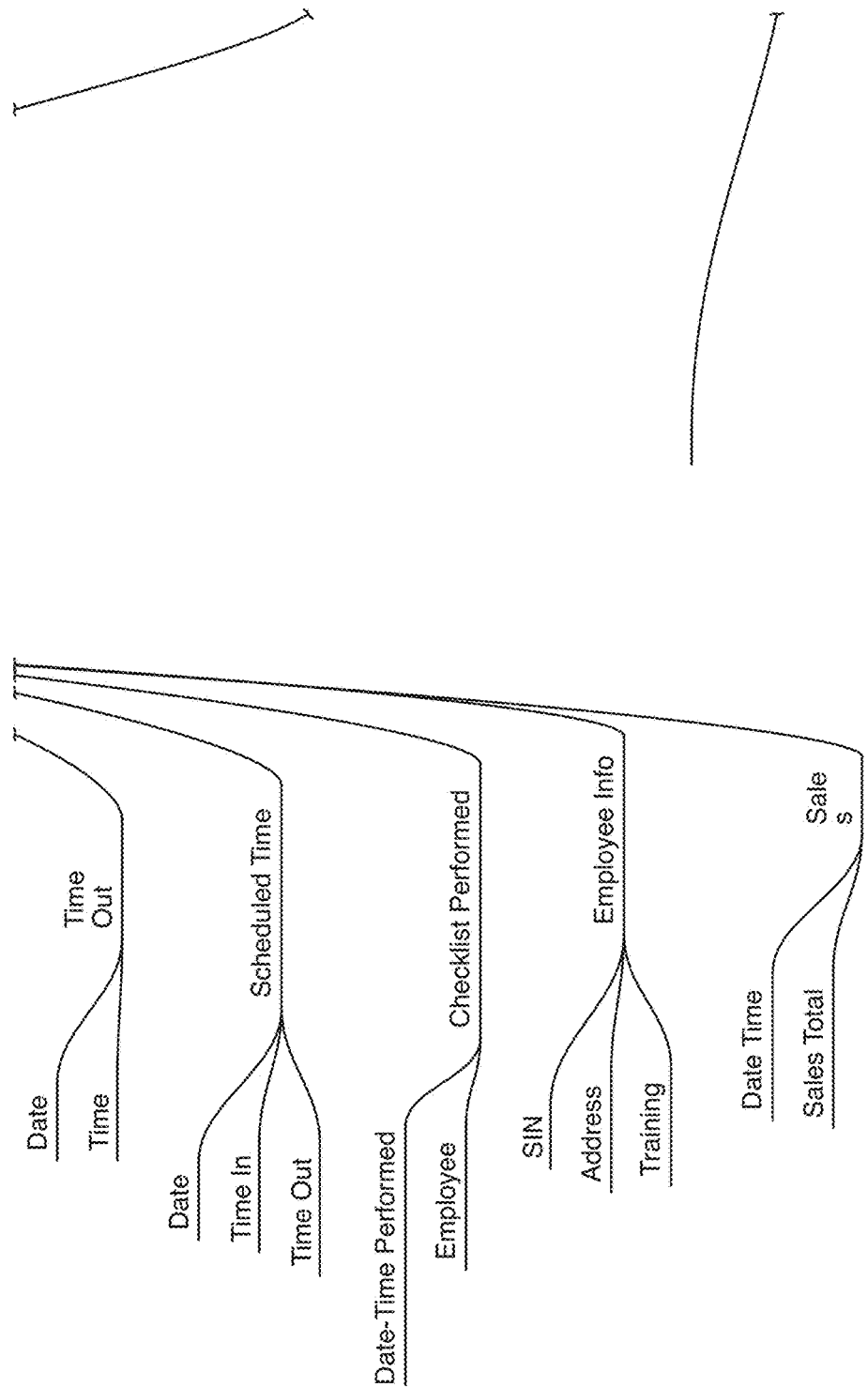
Figure 11S:
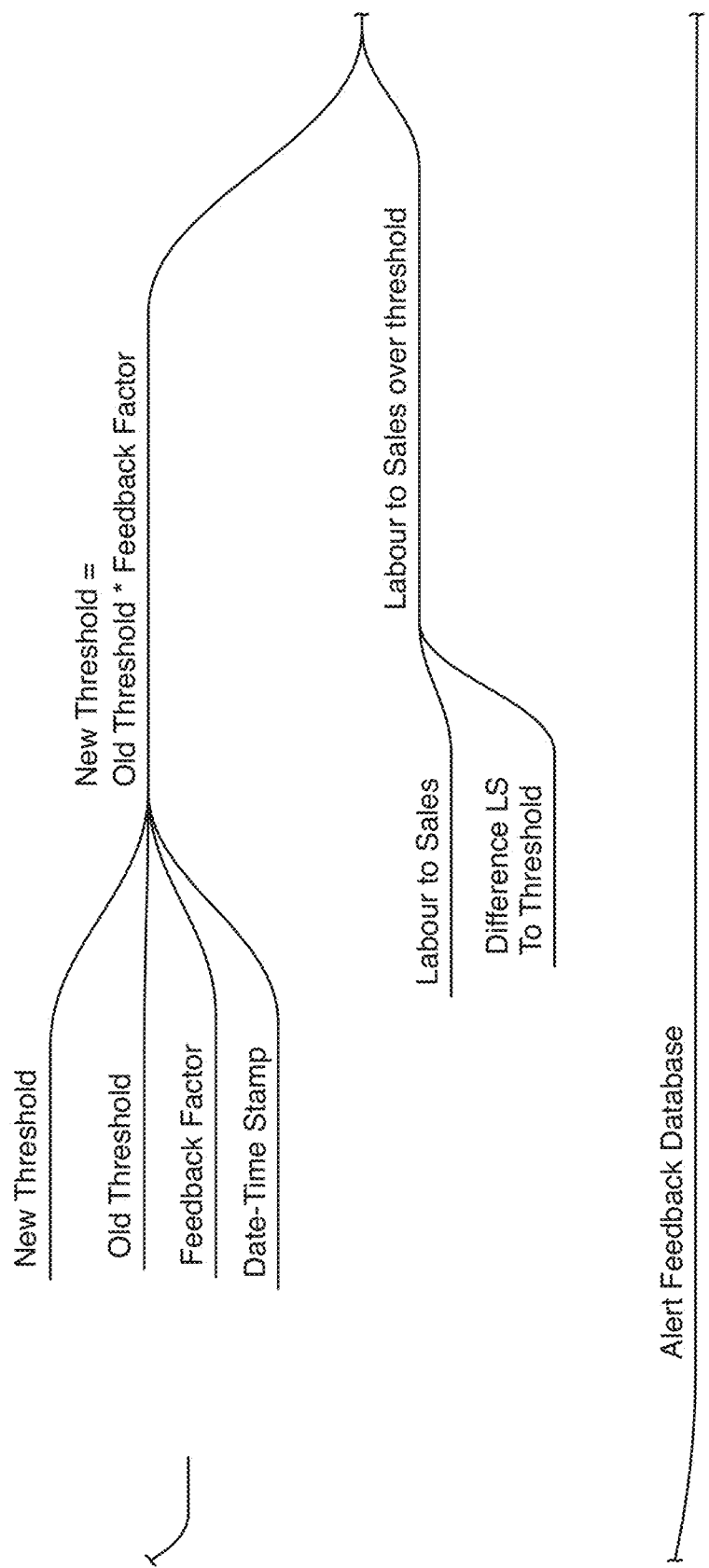
Figure 11T:
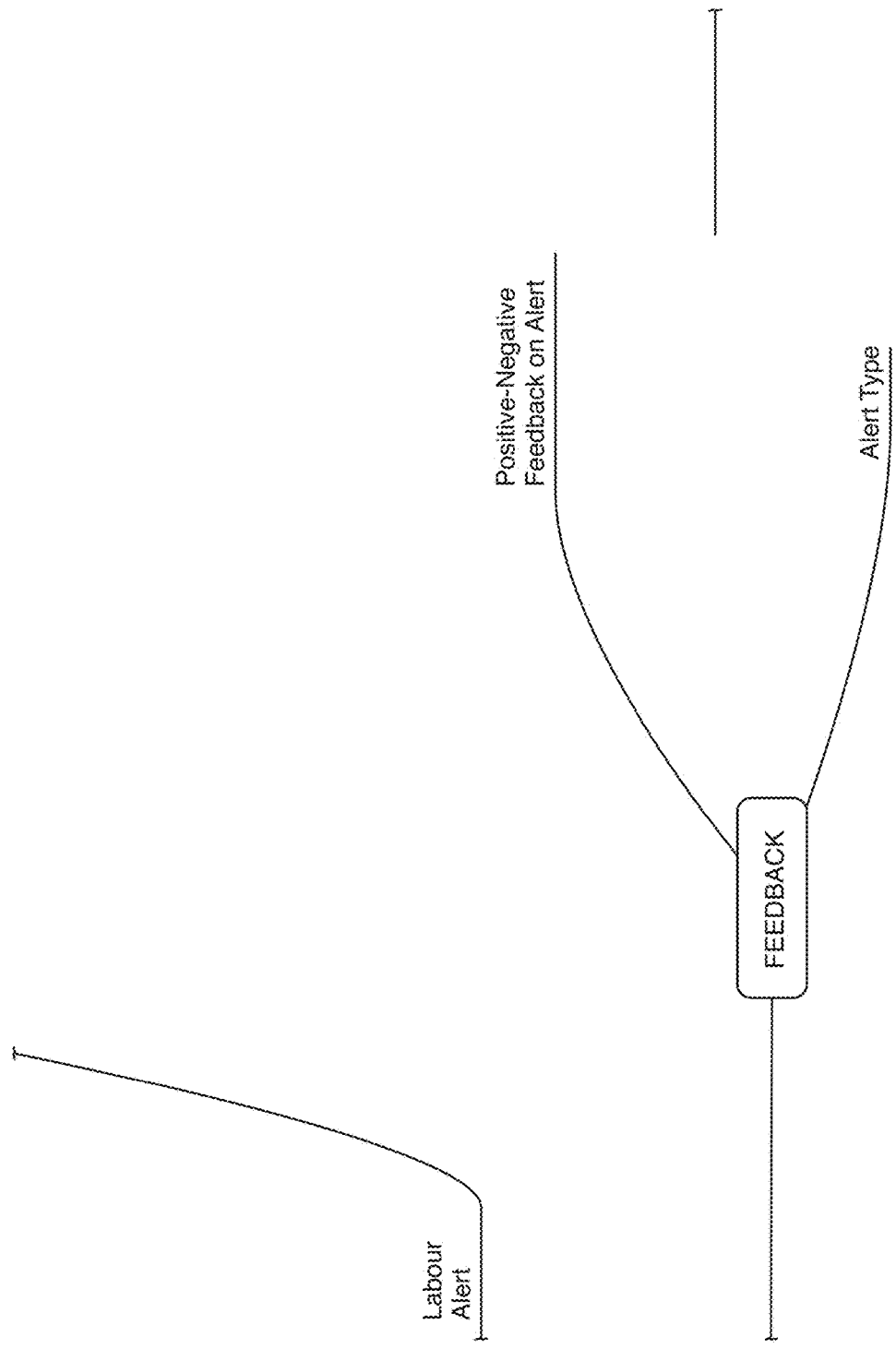
Figure 11U:
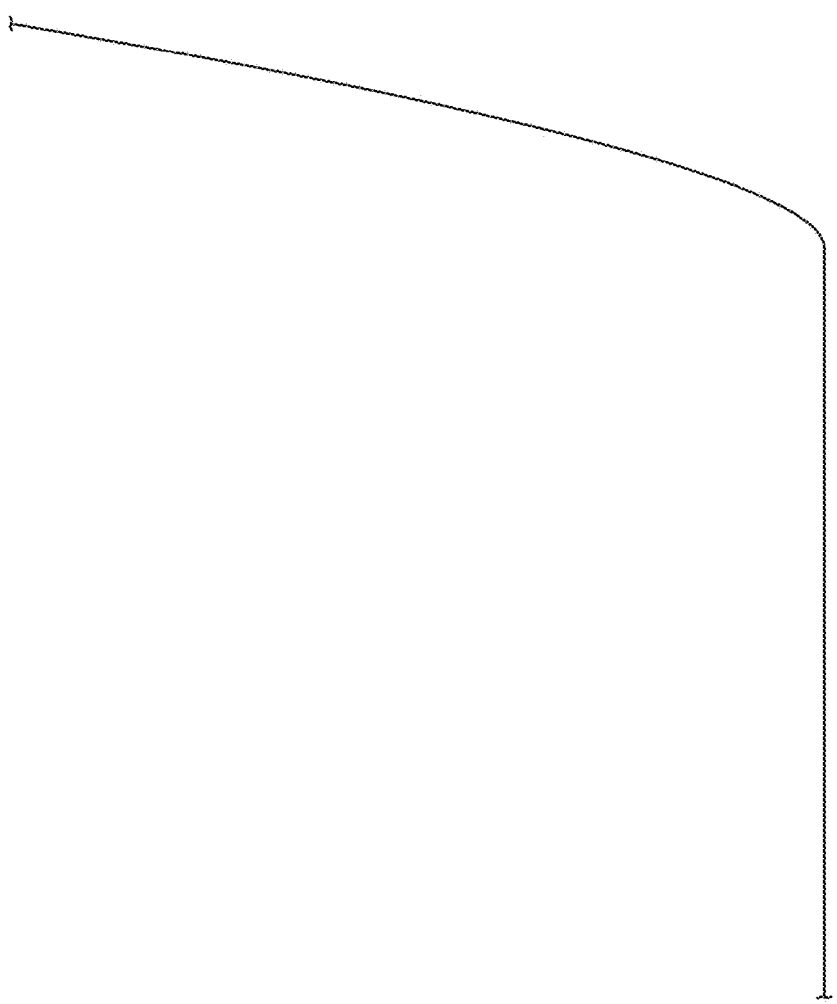

As shown in each of FIG. 11d and FIG. 11e, the plurality of AI nodes includes input nodes, internal nodes, and logic nodes. The input nodes receive data from various sources including user inputs provided by users as they perform business tasks/operations (e.g., represented by user clicks received through an input devices), and various inputs relevant to the business (e.g. attendance data for employees, wage data for employees, etc.). The input nodes generate an array of input data, which is provided to the internal nodes.

The key inputs (critical factors) relevant to the CBDSS are selected by the AI, and this selection adapts to the operations performed by users. This adaptation may be in real-time or near real-time. In particular, data reflective of operations performed by users (e.g., user clicks) are continuously inputted into a dynamic database as feedback data. Using this feedback data, parameters in the dynamic database (e.g., including thresholds) for generating alerts are continuously updated. These parameters are used to select the key inputs for generating alerts. The output of the internal nodes is a set of alerts corresponding to the AI-selected key inputs, and priorities assigned by the AI to those alerts.

The logic nodes receive the alerts and apply logic to adjust the priorities of the alerts based on industry knowledge of which alerts have greater impact on a business or on a user.

Alerts are presented to users in the form of suggestions directly integrated with the particular function/task that they are currently performing or service that they are accessing. For example, the suggestions may be integrated into the user interfaces for the function/task that they are performing or the service that they are accessing. Thus, the suggestions can guide the user without interfering with the user's operations, and the user can action (implement) a suggestion while they are performing an operation.

For example, management alerts may be presented to managers as they check on the status of the business. An alert may be provided in the form of a button allowing a manger to check the status of a particular department. Manager may click on buttons to check on particular alerts that they deem to be important or relevant. Whether or not a manager clicks on an alert button is monitored to create feedback data that is fed back into the input nodes. This feedback data may be provided for every click or every touch that is made on a device operated by a user, allowing the dynamic database to be continually updated, e.g., in real-time or near real-time.

The updated dynamic database is then used to generate the next set of alerts/suggestions.

In some embodiments, the positions of the logic nodes and internal nodes may be interchanged such that the logic nodes come before the internal nodes. In this way, the CBDSS may be configured to filter input data (e.g., using stored industry logic), and the filtered input data is then provided to the internal nodes to apply user feedback.

In some embodiments, the AI nodes described herein may be nested within a larger-scope system. For example, a key input selection algorithm, along with any associated internal and logic nodes, may be nested in a larger staff management algorithm.

FIG. 11c shows a SME AI-Based Business Model Activity Diagram which outlines business and operational step-by-step workflows of components. One use case business model for small to medium-sized businesses (SMEs) effectively decreases operating costs for the SME, improving sales for the vendors while generating revenue for the use of the said invention. A common challenge in most industries is staying on top of prices and availability of key raw materials for the business. Market conditions, the climate and many other factors lead to frequent (sometimes daily) price changes on materials critical for the business (i.e. food for restaurants, beauty products for pharmacy etc.). The invention may essentially bridge the gap between vendor and business by continually scouring the SMEs database for items they need and in turn scour for the best prices. If a price is found that is sufficiently low to provide savings, it is communicated to the SME who approves the invention to communicate with the vendor. The vendor is communicated with for the order using a predefined relationship. This is all performed electronically with the present invention. In addition, the AI component of the invention processes which items the SME order and at what Price to gauge whether offering them or changing priority to items in communication with the SME buyer. The AI also tweaks the decision making process on what constitutes a 3-way-win scenario before engaging in the next transaction.

FIGS. 11D, 11E, 11F, 11G, 11H, 11I, 11J, 11K, and 11L show a SME AI-Based Business Model Activity Diagram which outlines business and operational step-by-step workflows of components. This is the AI algorithm for the use case business model for small to medium sized businesses (SMEs) which may effectively decreases operating costs for the SME, improving sales of tor the vendors while generating revenue for the use of the said invention. The details of the Use Case Model are located in FIGS. 11E, 11F, 11G, 11H, 11I, 11J, 11K, and 11L. The AI algorithm is based a combination of feed forward neural net nodes as well as a logic node for industry specific decision making. Business inputs are accepted by the input nodes and the array is sent to the business decision node that calculates the new threshold based on previous values and user input. Then it conducts an iterative two step regression analysis to recalculate the formulas that link desired price and volumes for an item. Items passing a threshold are sent to internal decision making nodes. The passed results for all businesses are processed by the decision making nodes in a three step regression analysis to determine if enough businesses in that region want the same item and that the costs will be low enough for all businesses. Products passing the threshold are sent to clients based on the priorities for every SME using the logic node. The savings are communicated to the client and the AI monitors each click to determine if the item is interesting to the SME. This factor may be used to recalculate the threshold factors in the internal nodes. Vendors are sent e-requests for orders accepted by SMEs for processing and delivery.

FIGS. 11M, 11N, 11O, 11P, 11Q, 11R, 11S, 11T, and 11U show a SME AI Staff Management Integration Diagram which outlines business and operational step-by-step workflows of components. This is the AI algorithm for the use case business model for any business. The details of the Use Case Model are located in FIGS. 11N, 11O, 11P, 11Q, 11R, 11S, 11T, and 11U. The AI algorithm may be based on a combination of Feed forward neural net nodes as well as a logic Node for industry specific decision making. Inputs are gathered by the AI from one particular business. These inputs are processed in the internal set of nodes. Each node looks at one element of the business. This use case relates to AI-based staff management system. Here, items like attendance alert, checklist required, and labour alerts calculate new thresholds based on inputs and factor that is derived from user feedback. The results are passed out of the internal nodes as an array of normalized threshold to the logic node. There, the signals are assessed and ranked. The top rank is chosen based on score. It is then issued to the client as an alert in this use case. The user feedback is recorded to influence the next threshold factors and AI decision process.

User Interface

In one aspect of the invention, the platform (14) includes an adaptive user interface. The adaptive user interface is designed to present the functions of one application, or more often a series of different applications (6), but using a consistent and cohesive user interface that is intuitive and also reduces learning time involved in learning to use applications or applications that are new to a particular user. This increases productivity and efficiency.

Figure 12:
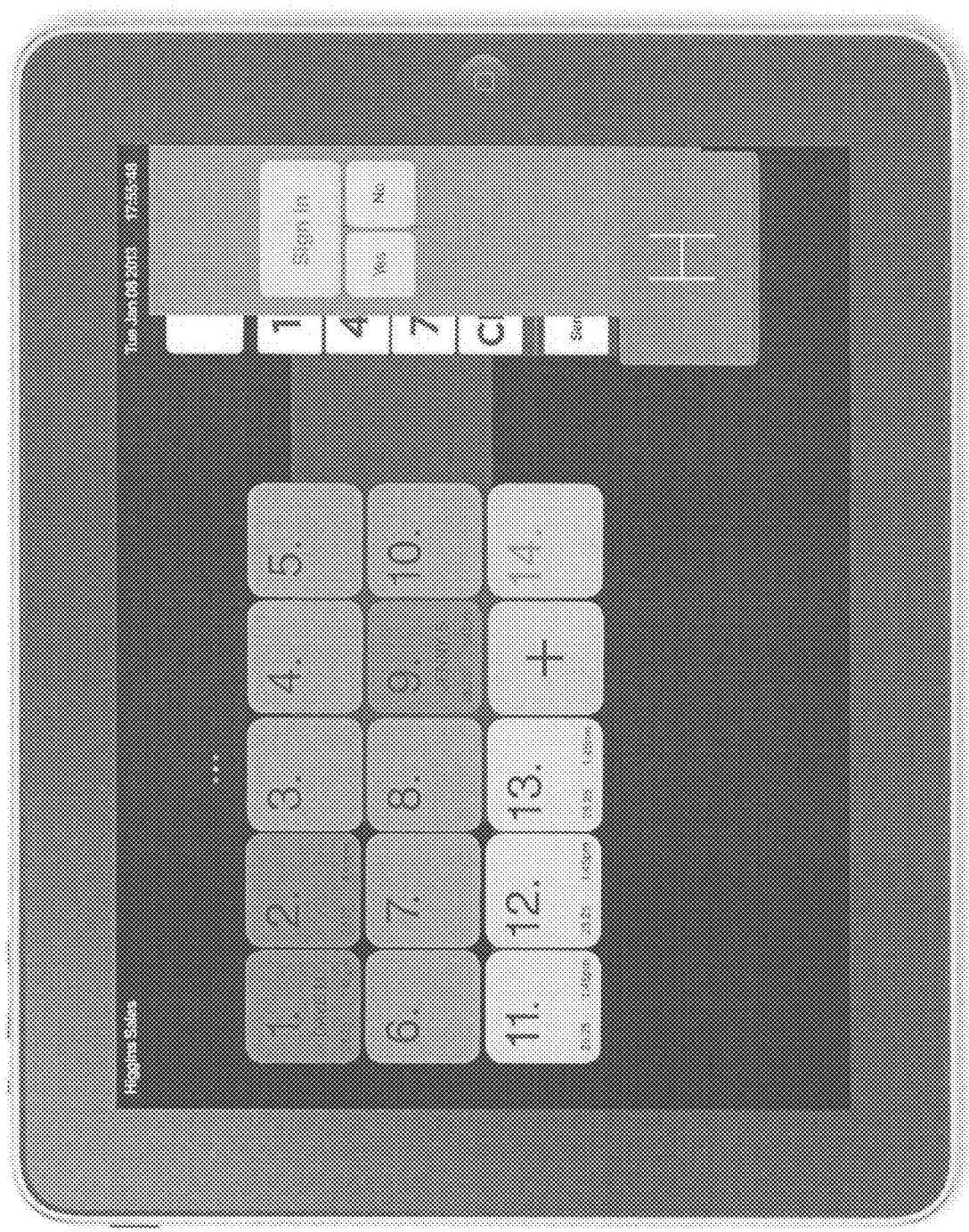
Figure 13:
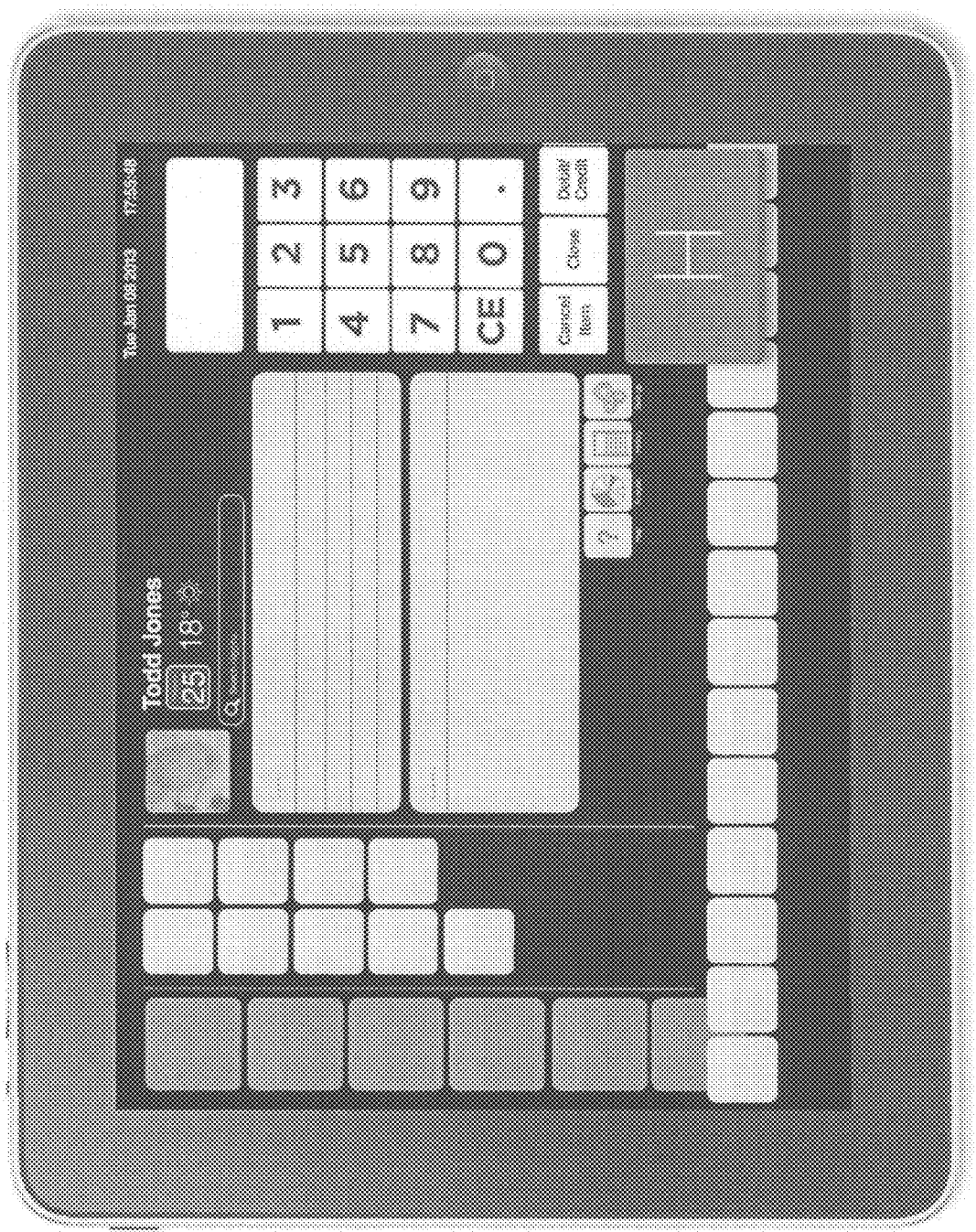
Figure 14:
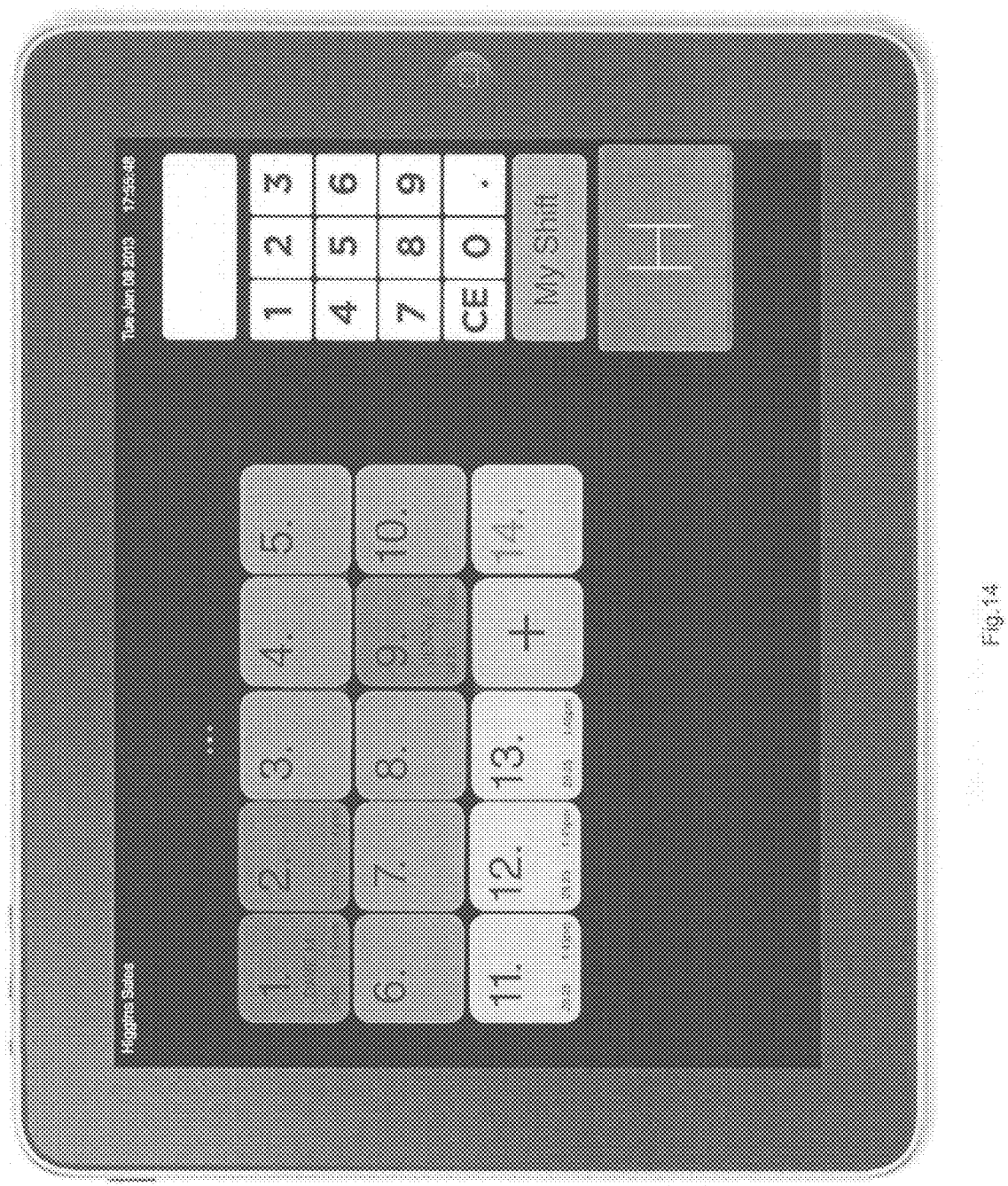
Figure 10:
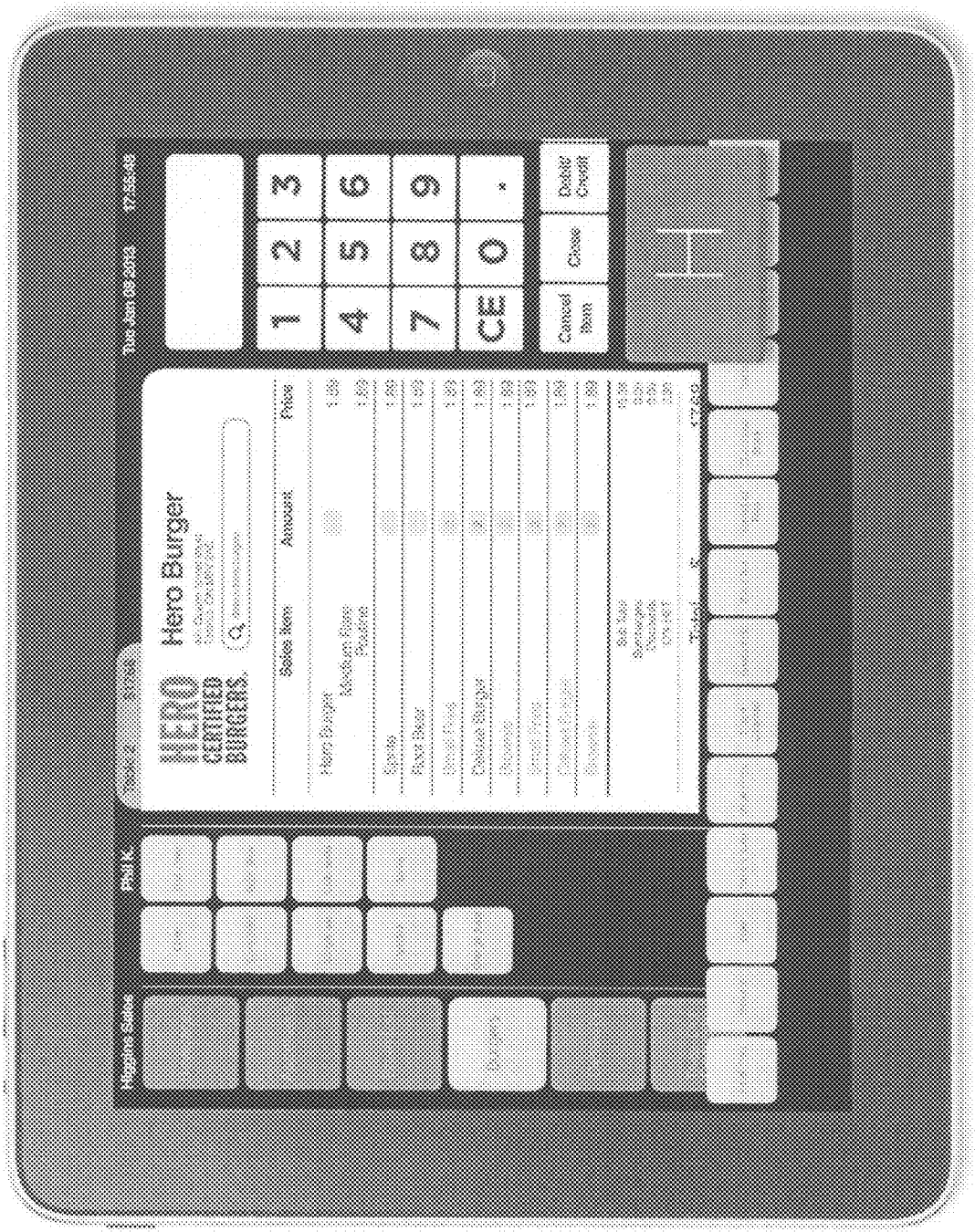

Given the varied features available across the plurality of applications (6) the design of a consistent and cohesive user interface is not trivial. In one aspect of the present invention, the design of the user interface may be based on the metaphor of a computerized cash register with enhanced features. A user interface in accordance with this metaphor is shown in the attached figures, it will be understood however that this is only one possible implementation of an interface to the system of the present invention. Modifications to layout, colour, and other visual elements are possible, such as shown in FIGS. 21 to 27. As depicted in FIGS. 12, 14, and 15, the cash register interface may include a login box, and a representation of a high level view of the operations that uses colours (e.g. green for available, yellow for in progress, and red for transaction complete but still not closed). An A.I. bar at the bottom, shown in FIG. 13 may be used by the system to push messages to a user based on AI algorithm decision-making. A calculator may be provided on a side of the interface to make input fast. Functions provided below the calculator allows for operations to be executed. The H ("Higgins"), or "enter" button, or other button, may be used to send requests to the system, for example, acting as essentially an enter/escape button. The business interface as shown in FIG. 13 may include categories on a left vertical to allow for categorization of items/units. Items in the second to left vertical may be shown or populated when a category is selected. Also, for example, a tab detail view may be presented, as shown in FIG. 16 may include of tab identifier as well as details of the operations. In the interface of FIG. 13 where category-item buttons are blank, properties can be changed from here and executed by pressing the enter button.

Figure 18:
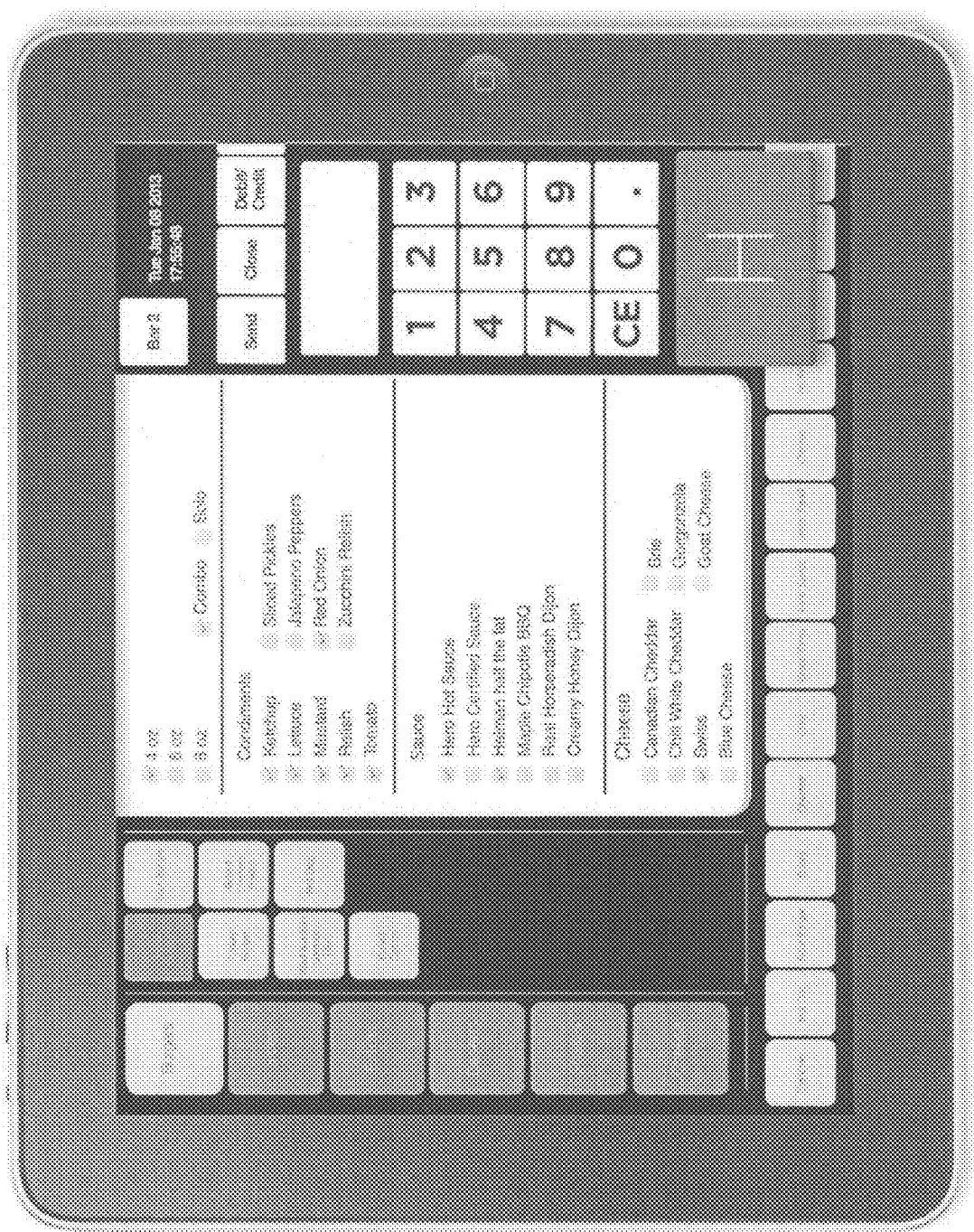

FIGS. 16, 17, and 18 show exemplary interface views for a business/team member. In this example, categories on the left vertical allow for categorization of items/units related to business/team member. Items in second to left vertical come up when category is selected. The tab detail view consists of tab identifier as well as details of the operations. The A.I. bar at the bottom is used by the system to push messages to user based on AI algorithm decision-making. The calculator, functions, and enter button are also provided.

Figure 19:
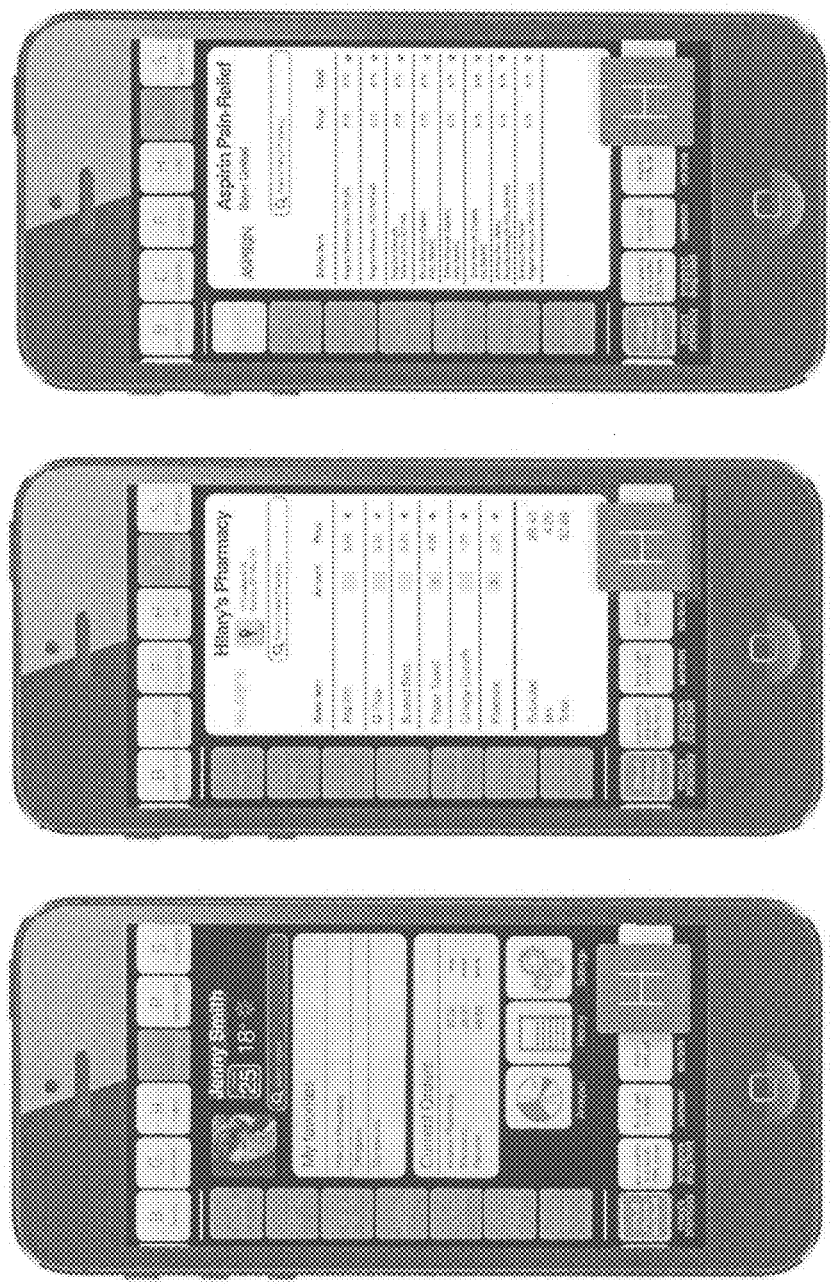
Figure 20:
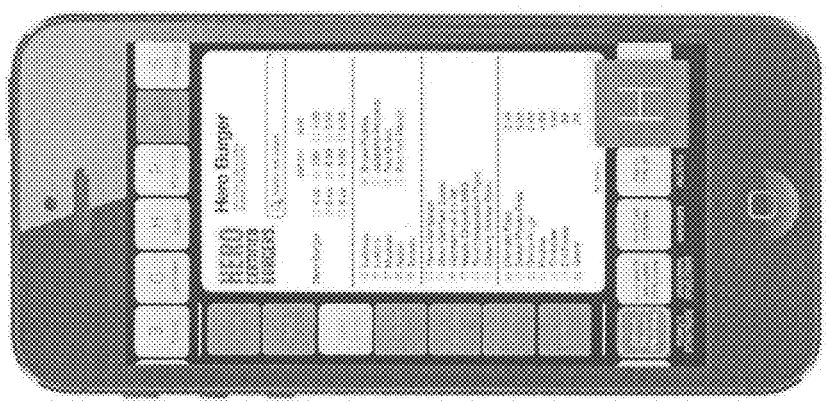
Figure 21:
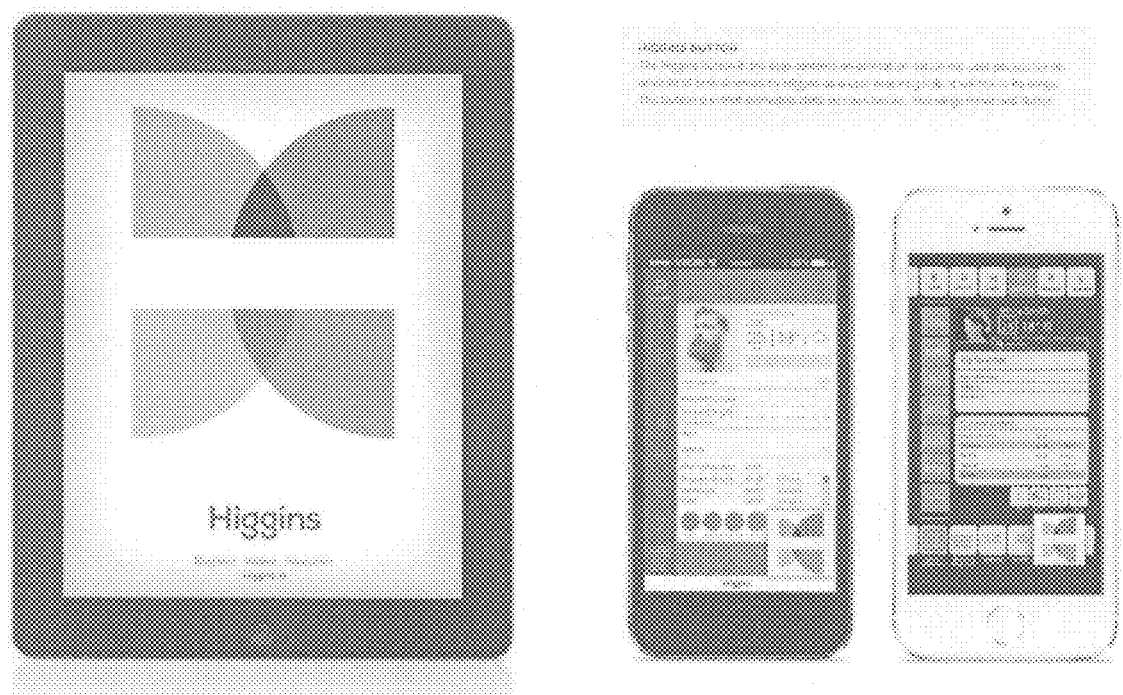
Figure 22:
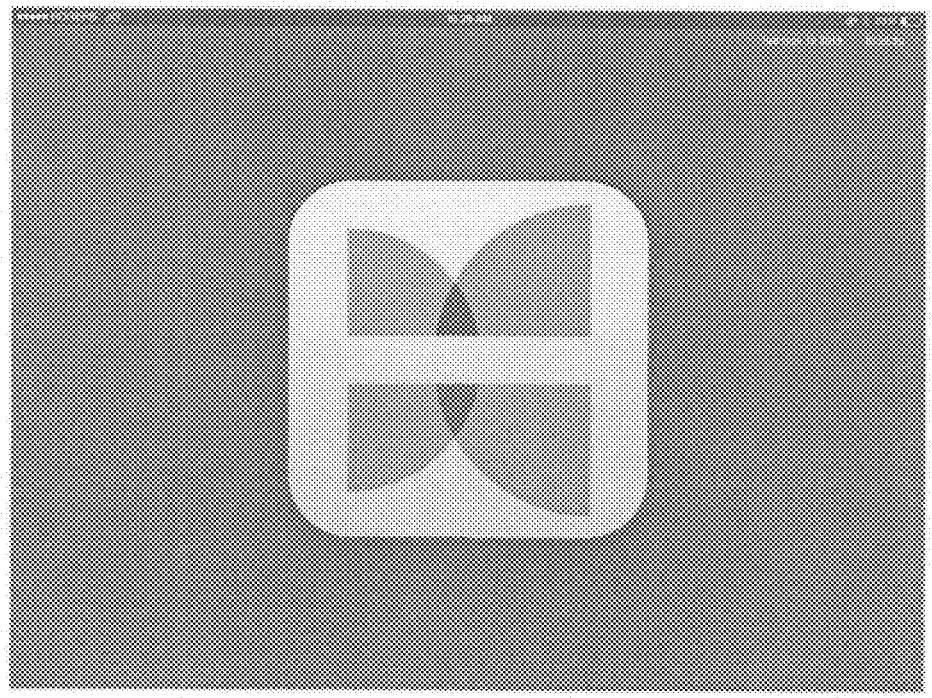
Figure 23:
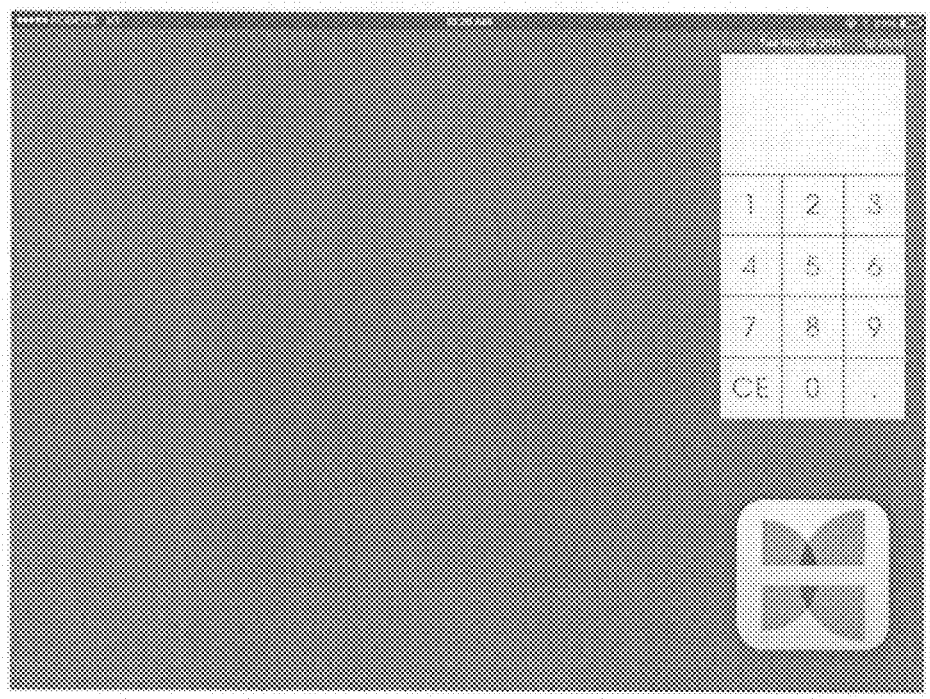
Figure 24:
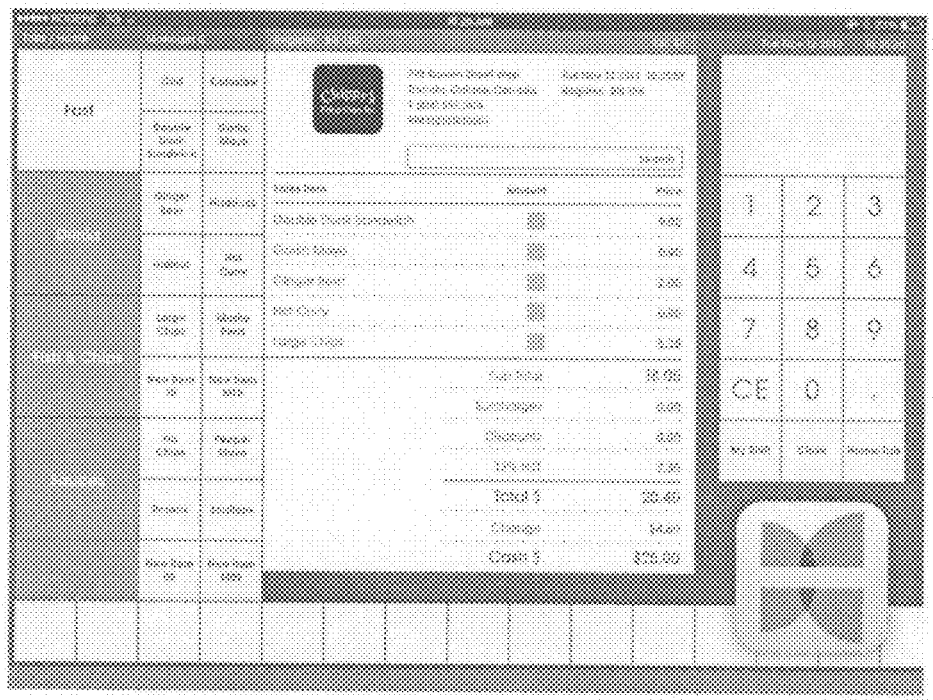
Figure 25:
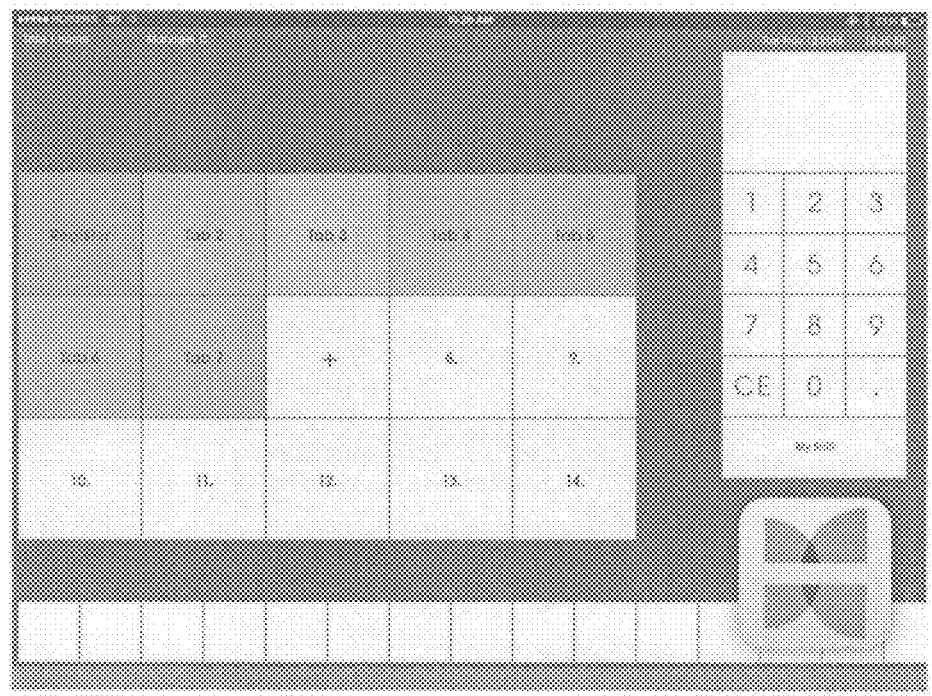
Figure 26:
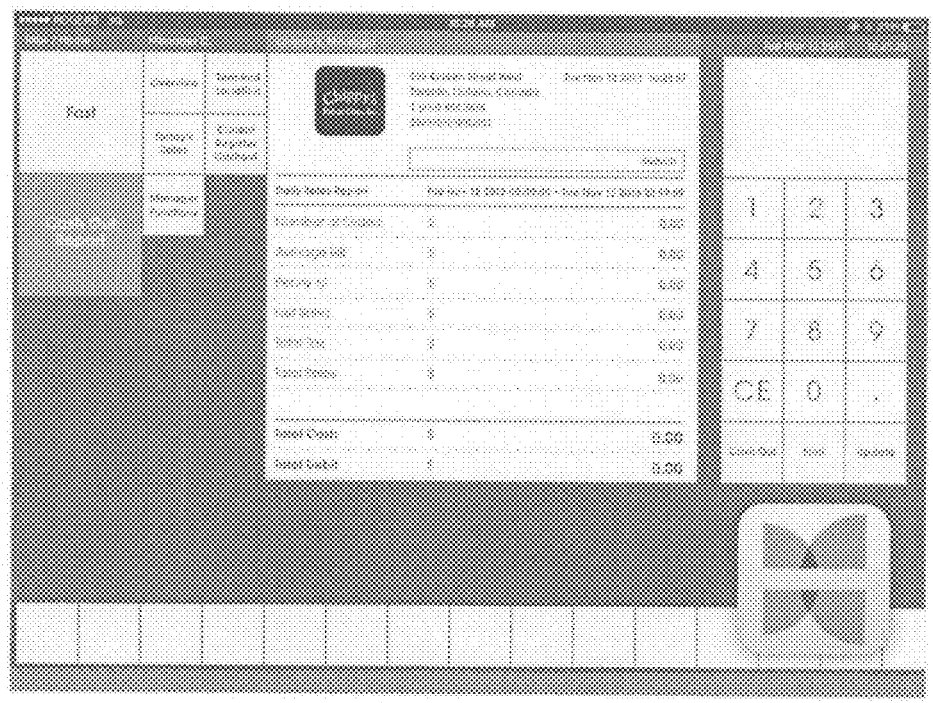
Figure 27:
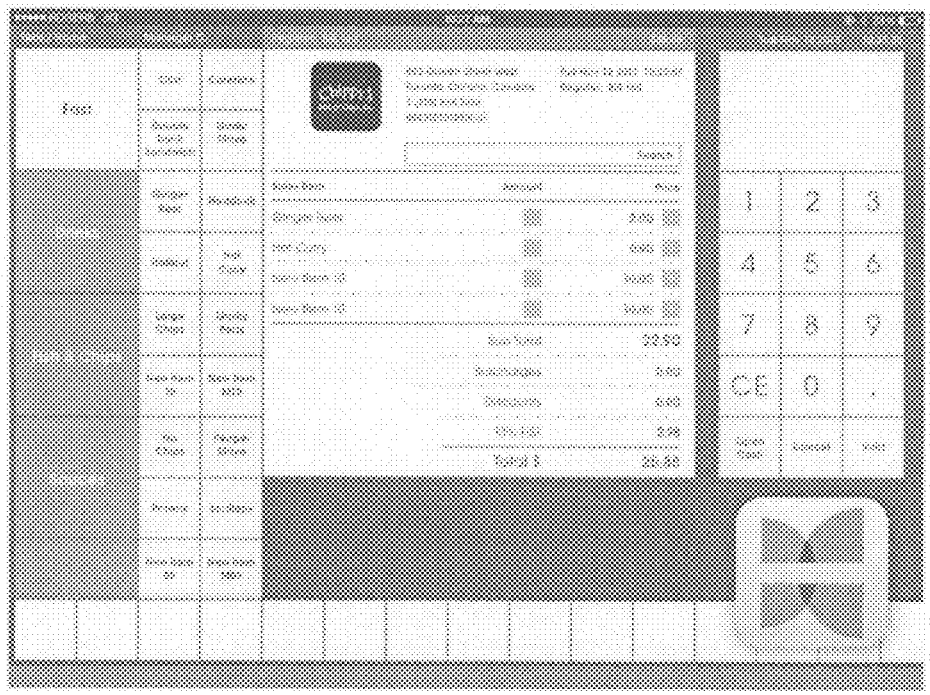

FIGS. 19 and 20 show exemplary interface views for a consumer interface in accordance with the present invention. A top horizontal sliding bar may be provided indicating categories of businesses to access. A left vertical scroll bar may list individual business to access of the selected business category. A high level view of the operations that includes user name and picture, user-specific information such as the weather as well as overview of all orders uses colours may also be provided, as shown in FIG. 21. The interface may also provide a list of favorite businesses or orders as indicated previously by the consumer user, thereby allowing the consumer to access old orders and repeat if desired. The A.I. bar at the bottom may be used by the system to push messages to the user based on AI algorithm decision-making. Functions above the A.I. bar may allow for operations to be executed. The H (Higgins) "enter" button may be used to send requests to the system.

The arrangement of the various user interface areas may be changed, and in fact one or more settings of the administrative utility may allow users to select different arrangements of these features that suit them, and may help them to be more efficient.

One aspect of the user interface is that it is designed to enable the platform to present new functionality to a user, based on the applications (6), in a way that may be intuitive to the user.

Another aspect of the user interface and its various possible configurations, is that features that are related for example with respect to their function, the business process that they relate to or the data that they require, are presented may be presented in a contiguous manner.

One aspect of the present invention is that is designed to operate as a universal interface that provides a consistent appearance and location of functions across different applications (6) based on commonality of functions, or related functions, across applications (6). This makes the platform (14) easier to use, and intuitive to use.

In one aspect of the invention, the platform presents a series of user interfaces, for presenting the platform features, and for enabling users, including across different "applications" that are part of the platform (14) to perform operations related to business processes, such as provide information or files, initiate various operations related to business processes, generate reports, and so on. In this way the one consumer system has limited access to public information about business offerings. Then consumer can execute order from their system to any business system from anywhere.

In one aspect of the present invention, the user interfaces are designed such that even different applications or functions include consistent features across applications or functions. For example: AI Bar, Category scroll, item scrolls, overview (content), details section of operations, item index, and the "execute" button.

Intelligent Layer

In another aspect of the invention, the platform (14) includes an intelligent layer (26), and this intelligent layer (26) implements a series of artificial intelligence functions. One category of intelligent functions as a series of intelligent features such as for example the business process suggestion engine described below.

The intelligent layer (26) in embodiments of the present invention, may be implemented in a way that executes intelligent operations involving other utilities of the platform (14). For example, the intelligent layer (26) may be executed to control the extractor (24) in order to selectively extract data that is relevant to one or more intelligent features or that is likely to be relevant to determining business processes for the platform client.

An important insight of the present invention is that the business processes relevant to a platform client, or one or more users of a platform client, varies with time. The business of a platform client can change over time. For example it may expand into different areas; a new supplier may be engaged that operates very differently; employees may take on new roles; a platform client may change their payment rules, and so on. Configuring or re-configuring a technology solution to reflect these changes can be very time consuming. Yet if this work is not done, the technology solution soon does not fit the business processes, and this can cause friction which may result in lower productivity or refusal of employees to use the technology solution over time. If personnel do not use the technology solutions, this also may result to non-adherence to key business processes, resulting in further implications such as loss of productivity, drop in profitability and so on. Providing technology solutions that are responsive to such changes has been attempted, but designing a platform with specific intelligent features and user interface elements, that drive particular workflows, that promotes effective responsiveness is not trivial, and yet is achieved by the present invention as explained in this disclosure.

The intelligent layer (26) in one aspect is configured to generate a series of insights. One such insight is the derivation of what business processes are relevant to a particular platform client or user. The intelligent layer (26) may iteratively analyze business data, and compare the results of this analysis to a library of business processes, in order to iteratively determine a group of business processes relevant to the platform client, or particular users of the platform client. These business processes, or identifiers for these business processes, are stored to the profile for the platform client, and updated from time to time. The application repository (8) also includes a business process to application map or table, that contains information regarding which applications (6) or features of applications may be relevant to which business processes.

In addition, the application repository (8) may include a rules engine that includes various business rules that may be business sector specific that reflects best practices. Examples of such best practices may include for example: (A) once a restaurant has 5 employees, the manager should consider using an employee comparator component; (B) once a restaurant has 3 suppliers, the manager should consider using a supplier comparator component; (C) once a customer enters an item to purchase they should consider the compatible accessory or side item that is best value for the dollar from the item comparator component; (D) once a staff member suggests a certain item to a client to purchase the comparable low cost items should be displayed using the item comparator component; and (E) once a manager receives a report from the system via e-mail they should review the critical operation parameters using the operations comparator component.

In one aspect of the invention, the intelligent layer (26) iteratively analyzes user behaviour on a user by user basis, and also for users in aggregate across a particular platform client in order to generate business data, and based on this insights regarding such matters as performance of the business of the platform client, different parameters regarding the stage of development of the business of the platform client and so on. For example, the invention may use the intelligent layer to provide suggestions for improving sales by suggesting "upsell" items with an order. It helps find matching wines to food or comparative pants to shirts. The invention may save money by identifying lower cost items at the same quality level. Items may range from sales items to inventory items. The intelligent layer is incorporated into the interface as the AI bar and as such is integrated into the business process. For example, users may readily add suggested items simply by pressing the button presented then continue with the operation. Similarly suggestions may be provided for consumers to find cheaper products or to find comparable items to purchase in order to improve sales as well as improve the user experience. This information may be referred to as "current business/consumer parameters".

The intelligent layer (26) may perform one or more comparisons of the current business parameters to the rules engine to determine best practices that may be relevant to the platform client, at this time, at the current stage of the development of its business. This may result in communication of suggestions regarding the business, which may be presented in a "TIPS" window of the user interface. In one implementation, the platform (14) may include one or more mechanisms for suggesting new applications (6) or new application features that the platform client or particular users of the platform client may not have previously used, however, it would be consistent with best practices, based on the current business parameters, to commence using these applications (6) or application features. As previously described, the rules engine may contain specific rules to this effect, in one implementation.

These mechanisms may be used in order to suggest to the platform client or to the user new functionality that may be relevant to them.

Depending on settings defined using the administrative utility, tips or suggestions for new applications may be first presented for example to a manager, and then the manager may decide whether to forward these or assign these to which of the other personnel, and the manager may also establish settings for such tips or suggestions to be presented to certain personnel for example automatically. Various distribution settings are possible.

Further details regarding possible current business parameters, the library of business processes, and the rules engine, and various tips or suggestions that the intelligent layer (26) may make using them, are explained further in the "Example in Operation" section below.

In another aspect of the present invention, the platform (14) has been configured with certain base principles, and these are reflected for example in the configuration of the rules engine. Some of these base principles reflect default business approaches, which may be altered or overridden using the administrative utility (16). In one aspect, the platform is designed to extract a high volume of business data, based on the principle that insights and trend information can benefit from large volumes of data, and certain business data may not seem to be relevant initially, yet when analyzed for example over time or in aggregate across different platform clients, valuable insights may be derived.

The rules engine in particular is designed and configured to include a series of rules that relate to determining what is costing a platform client money, what is making them money, and what is making them profitable. The rules engine may also include a series of rules related to thresholds or filters to determine when such information is likely to be of interest for example to a platform client associated with specific business data. For example, a smaller change in revenue may be of greater interest to a platform client with a smaller business than for one with a larger business. The rules engine may implement different rules for filters of insights/engines in order to enforce relevance for platform clients or their users. While the platform is designed to present useful and valuable information or insights to platform clients, and also to suggest applications (6) or application features that may add value to their business, one insight of the inventors is maintaining an uncluttered interface, and presenting features, functions or workflow as they are needed and not before is important to maintaining and improving productivity. Using traditional technology solutions, businesses too often are forced to use different computer system or software programs for different but interrelated functions. These have different interfaces or system workflows, even if covering similar functions. Even a larger computer system or software program, addressing a significant number of the requirements of clients in a particular business sector for example, often present to all users more than the particular features, functions, or workflows that they need day to day to do their work. As mentioned before, this can result in increased time and money required to train personnel, and also resistance to use of technology solutions that may be important in ensuring adherence to business processes that are critical to business performance.

The present invention reflects a unique and innovative set of cloud-based features, that interoperate in unique and innovative way, to provide a highly adaptive set of solutions that respond intelligently to the evolving requirements of platform clients.

In another aspect of the invention, the intelligent layer (26) may analyze business data to generate new business processes and also new rules. The intelligent layer (26) in this way analyzes information across different platform clients, but optionally within the same business sector in order to derive useful insights that support enhancement of the platform (14) over time for example by: (A) automatically developing new business processes, (B) automatically creating new rules that reflect best practices.

For example new rules reflecting best practices may be based on: (a) comparing performance of similar platform clients to one another within a business sector; (b) identifying relatively high performing platform clients within the business sector; (c) analyzing their business processes to identify business processes that may be used by the high performing platform clients as compared to one or other groups of platform clients within the business sector that are not in the high performing group of platform clients ("differentiated business processes"); (d) optionally analyzing the differentiated business processes, based on for example a library of best practices, and defining a set of business processes for recommendation to one or more platform clients who are not using these business processes ("recommended business processes").

In one possible application, the intelligent layer (26) adapts the recommended business products for consumers in order to purchase value added add-on products or even substitute products that improve user experience and/or reduce costs.

In another possible aspect, the intelligent layer (26) adapts the recommended business processes based on the business processes and/or usage data for applications or application functions, and automatically generates a set of tips or application suggestions on a platform client by platform client basis, or on the basis of a group of similar platform clients for example.

Further Implementation Details

In one aspect of the present invention, the user interface may include an area or a button that allows a platform client's users to see the applications (6) that they have selected, or have been suggested by the platform (14) for them and accepted by them, or that the platform (14) has currently selected for them automatically. In one possible implementation, the user interface includes an applications menu that shows these different categories of applications (6) under headings indicated for example "CURRENT APPLICATIONS", "SUGGESTED APPLICATIONS" or equivalents.

In one implementation, the platform (8) includes a workflow manager. The workflow manager may be used to design and deploy one or more processes or workflows related to implementing business processes. In one aspect of the workflow manager, it interoperates with the user interface so as to adapt either applications (6) presented to the user, or the presentation of functionality or data within the currently present user interface so as to be adaptive to the platform client, and the user. For example, the intelligent layer (26) and the workflow manager may cooperate in order to anticipate next application (6) or next application features that may be of interest to a user, for example in the context of the work that they are performing using the platform (14).

In another implementation, the platform (8) includes a workflow manager to suggested value added products to consumers or business users in order to improve sales, efficiency and decrease costs. The workflow manager is integrated into the operations portion of the interface to allow users to implement the suggestions from the work flow manager into their operations in a seamless manner that does not interfere with the service or the user experience.

The database may include one or more templates that may include rules and/or In one aspect of the invention, and as shown in FIGS. 12 to 27, the platform presents a series of user interfaces, for presenting the platform features, and for enabling users, including across different "applications" that are part of the platform (10) to perform operations related to business processes, such as provide information or files, initiate various operations related to business processes, generate reports, and so on. Templates may be geared to specific industries in order to improve efficiency by placing relevant items first in the interface and the less relevant items further down the scroll bar. In some cases it is the user that is responsible for ordering items and in other cases, it is the intelligent layer that processes the item sorting.

Register Infrastructure

In one possible aspect of the platform (14), the platform includes a register infrastructure which may be implemented for example as follows. The register may be used to run the operations from service-based businesses. The register may be used to run consumer operations for any purchase from anyone. The register that is the hub of all transactions both online and in the physical world may bridge both consumers and businesses in both worlds with one product.

In one possible implementation, the platform (14) presents in each application (6)—where relevant—one click purchasing, and the platform processes payments.

In some implementations, for example where both a customer and its supplier are using the platform (14), for example through respective applications (6) relevant to each of their business, payments may be processed entirely through the payment infrastructure. Payments through a form of electronic currency, such as a currency that is specific to the present invention, may be implemented by the present invention. The payment platform may allow for any payment processor, band or credit card provider to link to the system of the present invention and provide client payments. In one aspect of the present invention, the user interfaces (x) are designed such that even different applications or functions include consistent features across applications or functions. For example, the AI may make suggestions to the servers of items that may be on special or complement the present order so that upselling may occur. The icons' wording and form can be altered based on what order is typed in. The AI also may make suggestions to consumers about things to buy and items that complement their purchases. The AI allows the user to interact with the buttons in the flow of operations by making them functional. The function is representative of the operation performed. Content may be created for different business sectors. The platform may provide one or more business templates for retail, cafes, bistros, restaurants, medical offices, clubs, hotels, and any other operation requiring a register. Templates may be tuned for highest user/business efficiency. The templates are only a starting point, and the interface may transform based on AI direction to continually adapt and integrate with operations.

CRM

In another aspect of the present invention, the platform (14) may include, or links to, a CRM. The CRM may include a series of features that are used by platform clients to manage their sales/marketing related communications in conjunction with the social web.

In one aspect, the platform (14) may various text analysis tools for filtering business data for supporting the intelligent features of the present invention. For example, a business management platform may be provided that manages all activities and operations.

Additional Intelligent Features

Also, the business or technology environment that produces the need for adoption of new business processes or changes to business processes for a particular platform client can be very fluid. To develop or update business processes in a way that keeps up with normal changes in business processes in businesses can be time consuming. In one aspect of the invention, the platform (14): (A) acquires business process related information for each platform client (including based on platform features accessed by the platform client, and data provided to the platform in connection with accessing platform features, (B) analyzes the business process related information, including based on a series of analysis rules that are established based on a business type or business vertical associated with the platform client (e.g. retail business, restaurant business etc.), (C) determines a set of business processes that are currently used by the platform client, and (D) compares the business processes used by the platform client to the business processes used by other similar platform clients. Based on (D), the platform (14)

may suggest business processes for possible use by the platform client or additional platform features available ("suggestions").

These suggestions may include for example platform features available through the platform but not previously presented to the platform client, or a particular user of a platform client.

The business process or platform feature may be presented as a "tip" or best practice suggestion to the platform client.

A suggestion engine (46) may rely on the steps or features described in order to suggest iteratively to the platform client ways in which they can use the platform (14) to run their business, and possibly improve or streamline their business. The AI may make suggestions to the servers of items that may be on special or complement the present order so that they can upsell. The icons' wording and form can be altered based on what order is typed in. The AI also makes suggestions to consumers about things to buy and items that complement their purchases. The AI allows the user to interact with the buttons in the flow of operations by making them functional. The function is representative of the operation performed.

In one aspect of the invention, the business process related information is gathered across the various platform clients, aggregated, and analyzed in order to provide intelligent insights to platform clients regarding their business operations and/or to extrapolate the business processes for the platform client. In another aspect of the invention, the AI layer is used to generate such insights using advanced artificial intelligence functions.

In yet another aspect of the invention, suggestions are presented in a consistent user interface for a platform client.

In another aspect of the invention, the platform (14) may access external sources in order to provide further underpinning for the analytical features or the artificial intelligence features of the present invention.

The external sources may be used in order to improve the ability of the platform to extract business process related correctly, and also generate business sector relevant business practices accurately, filter these based on relevance to a particular platform client (and a particular user for a platform client), and deliver suggestions The intelligent layer (26) may include an analytics engine that performs for example semantic analysis on business data in order to generate more relevant suggestions. Also, the analytics engine may analyze data entered to the platform including for example platform client communications in order to extrapolate insights as to activities of platform clients or to infer intent of users. This information may be used in order to improve the relevance of suggestions and also particular applications (6) or application features presented to users.

Examples in Operation

Examples of the present invention in operation include: Personal Register; Business Register; Business management system; Ordering and payment system; and Register Platform for other value added services to integrate into operations of businesses or consumers.

As noted, in one aspect of the invention, the platform (14) includes an intelligent layer having an AI that makes multi-staged suggestions as part of a CBDSS. Suggestions are fine-tuned over the course of the multiple stages, e.g., based on AI learning upon processing feedback data. In this way, suggestions become more particularized to a user over time.

In one specific example, the platform (14) provides a CBDSS for a business operator. In this example, the platform (14) AI provide suggestions in the following stages:

Stage A—Selective identification of key data based on industry standards and suggests them to users.

Stage B—Suggests more critical items to users.

Stage C—Data reflective of user taps recorded from Stage A and B (e.g., feedback data) are processed by the platform (14) to further personalize the selection process to suit the specific user.

Stage D—The platform (14) integrates metadata using an ID-categorization generation algorithm to cross-reference seemingly unrelated data to provide additional non-intuitive suggestions to the user.

In another specific example, the platform (14) provides a CBDSS for a personal user (e.g., a member of the general public). In this example, the CBDSS receives and filters relevant input data from businesses about their clients, including data reflective of client purchase habits across various stores. Based on this input data, the platform (14) AI provides suggestions in the following stages:

Stage A—Suggests items that are directly relevant to purchase styles.

Stage B—Suggests items that they should discover—greater incentives provided here Stage C—Suggests surprise and delight items. This is the most advanced form of AI-based decision making that uses personal purchasing habits combined with general habits from consumers in the same demographic group (e.g., age, purchaser type groups). These types of items are meant to thrill users who would see them as great value-adds that they would not consider typically buying.

Feedback data obtained in response to suggestions in Stage A and B provides an opportunity for coarse adjustment by the platform (14) AI. In particular, this feedback data is used by the AI to determine a consumer's purchasing habits and determine his/her responses to the suggestions in Stage A and B. The AI processes this feedback data to fine tune the suggestions for Stage C.

Other Applications

Many other applications of the platform (14) are possible in various embodiments. Some examples embodiments follow: Product Development Application, Stock Market Application, and Real Estate Industry Application.

In one example embodiment, the platform (14) is configured to provide a Product Development Application. This Application may, for example, be configured to strengthen a company's research and development operations and its manufacturing operations.

A major issue in many large corporations is how to make their pipeline of product development more efficient so they can bring them to market more readily. In this setting, the platform (14) allows clients to manage a national or global enterprise remotely, e.g., based on information collectively actively and silently from various aspects of the business. This improves the ability of the client to control the operations of the business. The platform (14) also facilitates collaboration amongst team members who may be separated geographically. For example, team members may be linked by way of the platform (14) with AI to modify screen views customized to team needs in manners disclosed herein. In this way, communication barriers may be broken down.

Further, the platform (14) may gather relevant information and automatically translate some or all of that information into any language(s) required to generate global project reports.

The platform (14) may simultaneously manage hundreds of intelligent virtual assistants (AI-based CBDSS), each of which operate continuously to transparently collect and analyze information from various aspects of the business. Collected information may be encrypted (e.g., using military-grade encryption) for secure storage within the business.

Each AI-based CBDSS may assist in defining business needs, evaluating root causes that obstruct success, understanding user perspectives, and merging the resulting findings to create solutions that are customized for a particular business.

The platform (14) may be configured to perform analytics and data processing to generate customized reports.

In another example embodiment, the platform (14) is configured to provide a Stock Market Application. This Application may read stock ticker data directly from a stock market including data corresponding to bids, asks, sells, and buys. The Application uses one or more AI-based CBDSS(s) to determine which stock market indicator is most applicable for a particular stock (i.e. Advance/Decline Index, Absolute Breadth Index, Arms Index and McClellan Oscillator). Suggestions for time to buy and time to sell may be presented to a trader.

In various aspects, the Application may provide real-time charting of all indicators, AI-based CBDSS selection of key indicators. macro aggregates of indicators dynamically combined by AI-based CBDSS for a particular stock and a particular time period, buy and sell suggestions.

In some embodiments, the Stock Market Application may be directly linked to the market or a trading brokerage platform, and may provide one-touch functionality to complete a suggested transaction. In some embodiments, the Stock Market Application may be implemented to automatically purchase and sell stocks based on a set of user preferences.

Optionally, the Stock Market Application may send alerts to the user in association with suggestions and/or completed transactions. The particular alerts sent to the user may be selected using the AI-based CBDSS, which determines which alerts are relevant and/or assigns priorities to the alerts.

In a further example embodiment, the platform (14) is configured to provide a Real-Estate Application. For example, this Application provides agents with references to individuals who wish to purchase real estate. The Application collects data from external sources (e.g. Multiple Listing Service™ and other real-estate listings). Such data collection may occur through secure SSL feeds to a central cloud network that is protected via a Security Policy dictated by that external source.

The Application performs various analytics to perform, for example, lead generation, searching and selecting homes for clients. market analysis of various neighborhoods, analyzing sales data, preparing individualized market evaluations for prospective sellers, listing procurement, prospective buyer and seller matching. In this way, the Application assists realtors by reducing time spent on administrative tasks, allowing realtors to focus on client service and sale generation. Further, the AI-based CBDSS provides a virtual consultant that adapts to the working style and requirements/preferences of the realtor.

System Implementations

Various computer system implementations are possible. Various client/server, mobile, and cloud computing implementations are possible.

"Cloud computing" includes Internet based computing where shared resources, software and data are provided on demand. A "cloud" therefore can refer to a collection of resources (e.g., hardware, data and/or software) provided and maintained by an off-site party (e.g. third party), wherein the collection of resources can be accessed by an identified user over a network. The resources can include data storage services, word processing services, and many other general purpose computation (e.g., execution of arbitrary code) and information technological services that are conventionally associated with personal computers or local servers.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In general, the concepts of "virtual" and "cloud computing" include the utilization of a set of shared computing resources (e.g. servers) which are typically consolidated in one or more data center locations. For example, cloud computing systems may be implemented as a web service that enables a user to launch and manage computing resources (e.g., virtual server instances) in third party data centers. In a cloud environment, computer resources may be available in different sizes and configurations so that different resource types can be specified to meet specific needs of different users. For example, one user may desire to use small instance as a web server and another larger instance as a database server, or an even larger instance for processor intensive applications. Cloud computing offers this type of outsourced flexibility without having to manage the purchase and operation of additional hardware resources within an organization.

A cloud-based computing resource executes or resides somewhere on the "cloud", which may be an internal corporate network or the public Internet. From the perspective of an application developer or information technology administrator, cloud computing enables the development and deployment of applications that exhibit scalability (e.g., increase or decrease resource utilization as needed), performance (e.g., execute efficiently and fast), and reliability (e.g., never, or at least rarely, fail), all without any regard for the nature or location of the underlying infrastructure.

A number of factors have given rise to an increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce disruption due to an application or hardware failure.

The present system and method may be practiced in various embodiments. In one embodiment, a suitably configured computer device, and associated communications networks, devices, software and firmware may provide a platform for enabling one or more embodiments as described above.

Figure 28:
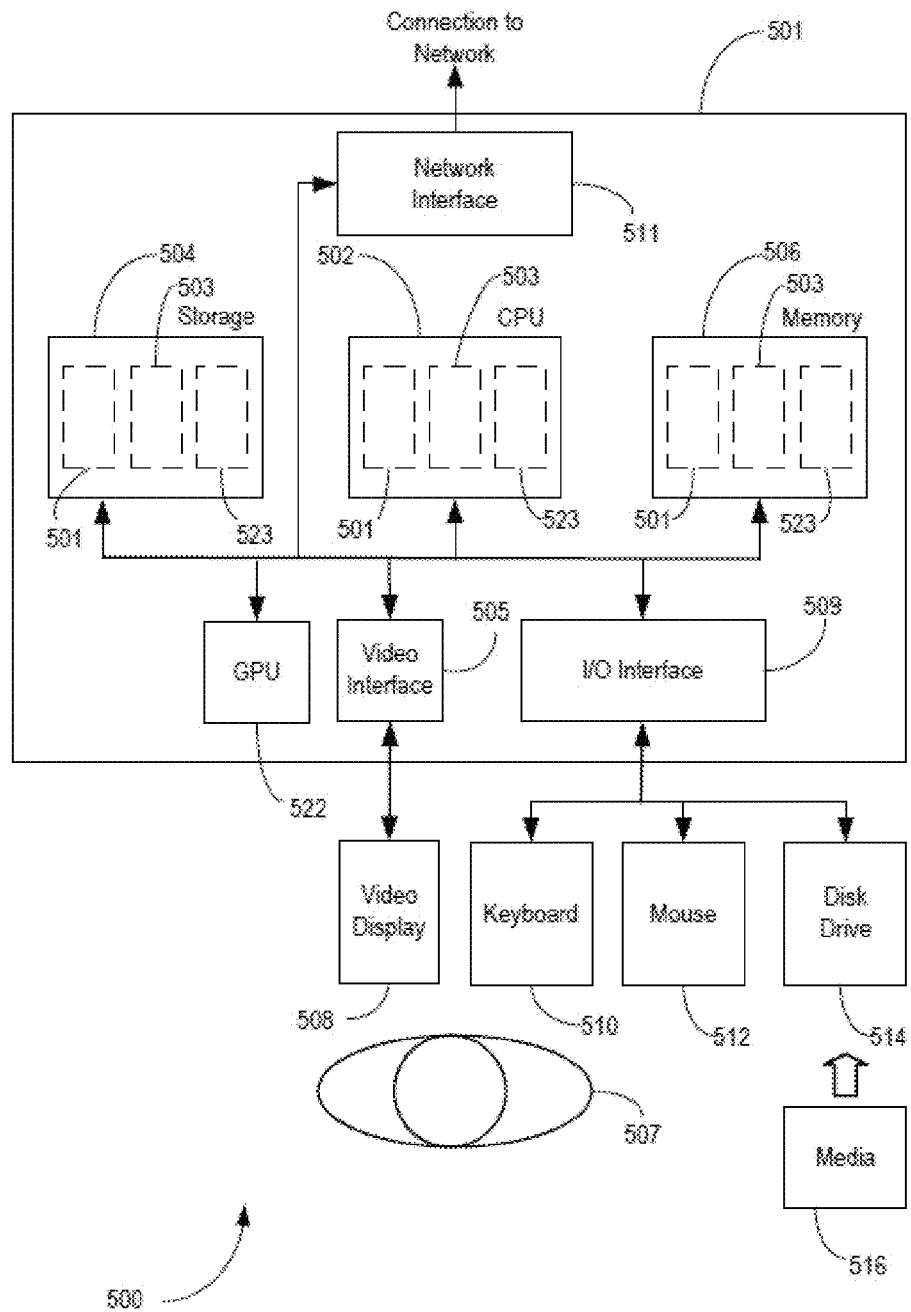
FIG. 28 illustrates a computer implementation of the system of the present invention, in accordance with an embodiment of the present invention.

By way of example, FIG. 28 shows a computer device 500 that may include a central processing unit ("CPU") 502 connected to a storage unit 504 and to a random access memory 506. The CPU 502 may process an operating system 501, application program 503, and data 523. The operating system 501, application program 503, and data 523 may be stored in storage unit 504 and loaded into memory 506, as may be required. Computer device 500 may further include a graphics processing unit (GPU) 522 which is operatively connected to CPU 502 and to memory 506 to offload intensive image processing calculations from CPU 502 and run these calculations in parallel with CPU 502. An operator 507 may interact with the computer device 500 using a video display 508 connected by a video interface 505, and various input/output devices such as a keyboard 510, mouse 512, and disk drive or solid state drive 514 connected by an I/O interface 509. In known manner, the mouse 512 may be configured to control movement of a cursor in the video display 508, and to operate various graphical user interface (GUI) controls appearing in the video display 508 with a mouse button. The disk drive or solid state drive 514 may be configured to accept computer readable media 516. The computer device 500 may form part of a network via a network interface 511, allowing the computer device 500 to communicate with other suitably configured data processing systems (not shown).

While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer (such as the computer(s) illustrated in the architecture described above) typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system of the present invention represents a collection of hardware and software elements that enable a user to manage a variety of device and information objects associated or generated by these devices, leveraging in-the-cloud resources in a new way.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims. Furthermore, to the extent that the term "includes" is used in either the detailed description or the claims, such term is intended to be inclusive in a manner similar to the term "comprising" as "comprising" is interpreted when employed as a transitional word in a claim.

It should be understood that the present invention may be extended by linking the invention with other technologies or processes useful in the monitoring, control or management of a variety of devices, for a variety of purposes.

I claim:

1. A computer system for generating suggestions integrated into business applications, the system comprising:
    an application repository comprising a plurality of business applications;
    a storage device having stored thereon a dynamic database storing parameters for generating suggestions relating to the plurality of business applications;

at least one processor coupled to the application repository and the storage device, the at least one processor configured to:
  generate at least one suggestion relating to a given business application of the plurality of business applications currently being used by a user, the at least one suggestion generated using the parameters stored in the dynamic database;
  integrate the at least one suggestion into a user interface of the given business application;
  monitor input of the user into the given business application, including input reflecting whether the at least one suggestion has been actioned by the user; and
  update the parameters stored in the dynamic database based on the monitored input, the updated parameters used to refine future suggestions when the future suggestions are generated.

2. The system of claim 1, wherein the at least one processor is configured to receive data reflecting a plurality of business inputs.

3. The system of claim 2, wherein the at least one suggestion is generated based on analyzing the business inputs to identify inputs of particular relevance to the user.

4. The system of claim 2, wherein the at least one processor is configured to assign a priority to each of the plurality business inputs.

5. The system of claim 1, wherein the at least one suggestion is integrated into the user interface as a button configured to be responsive to a mouse click by the user to action the suggestion.

6. The system of claim 5, wherein the monitored input comprises input reflecting whether the button was clicked by the user.

7. The system of claim 1, wherein the at least one suggestion is generated using an artificial intelligence layer coupled to the dynamic database.

8. The system of claim 7, wherein the artificial intelligence layer comprises at least one input node, at least one internal node, and at least one logic node.

9. The system of claim 1, wherein the at least one processor is configured to transform a user interface of at least one of the business applications in response to the monitored inputs.

10. The system of claim 1, wherein the parameters stored in the dynamic database are updated in real-time or near real-time in response to the monitored inputs.

11. A computer-implemented method for generating suggestions integrated into business applications, the method comprising:
  storing, in a dynamic database stored on a storage device, parameters for generating suggestions relating to a business application;
  generating at least one suggestion relating to the business application, the at least one suggestion generated using the parameters stored in the dynamic database;
  integrating the at least one suggestion into a user interface of the business application;
  monitoring input of the user into the business application, including input reflecting whether the at least one suggestion has been actioned by the user; and
  updating the parameters stored in the dynamic database based on the monitored input, the updated parameters used to refine future suggestions when the future suggestions are generated.

12. The method of claim 11, further comprising receiving data reflecting a plurality of business inputs.

13. The method of claim 12, wherein the generating is based on analyzing the business inputs to identify inputs of particular relevance to the user.

14. The method of claim 12, further comprising assigning a priority to each of the plurality business inputs.

15. The method of claim 11, wherein the updating comprises updating the parameters in real-time or near real-time.

16. The method of claim 11, wherein the integrating comprises integrating the at least one suggestion into the user interface as a button configured to be responsive to a mouse click by the user to action the suggestion.

17. The method of claim 16, wherein the monitored input comprises input reflecting whether the button was clicked by the user.

18. The method of claim 11, wherein the at least one suggestion is generated using an artificial intelligence layer coupled to the dynamic database.

19. The method of claim 18, wherein the artificial intelligence layer comprises at least one input node, at least one internal node, and at least one logic node.

20. The method of claim 11, further comprising transforming the user interface of the business application in response to the monitored inputs.

* * * * *